(12) United States Patent
Bonnstetter et al.

(10) Patent No.: US 7,184,969 B1
(45) Date of Patent: Feb. 27, 2007

(54) POSITION ANALYSIS SYSTEM AND METHOD

(75) Inventors: Bill J. Bonnstetter, Scottsdale, AZ (US); Susan J. Fronk, Anthem, AZ (US)

(73) Assignee: Performance DNA International, Ltd., Scottsdale, AZ (US)

( * ) Notice: Subject to any disclaimer, the term of this patent is extended or adjusted under 35 U.S.C. 154(b) by 0 days.

(21) Appl. No.: 09/479,646

(22) Filed: Jan. 7, 2000

Related U.S. Application Data

(60) Provisional application No. 60/115,300, filed on Jan. 8, 1999.

(51) Int. Cl.
*G06F 11/34* (2006.01)

(52) U.S. Cl. .......................................... 705/11; 705/7

(58) Field of Classification Search .................. 705/7, 705/8, 11
See application file for complete search history.

(56) References Cited

U.S. PATENT DOCUMENTS

| 5,551,880 | A | | 9/1996 | Bonnstetter et al. | |
|---|---|---|---|---|---|
| 5,574,828 | A | * | 11/1996 | Hayward et al. | 706/45 |
| 5,879,165 | A | * | 3/1999 | Brunkow et al. | 434/322 |
| 6,070,143 | A | * | 5/2000 | Barney et al. | 705/8 |
| 6,341,267 | B1 | * | 1/2002 | Taub | 705/11 |
| 6,556,974 | B1 | * | 4/2003 | D'Alessandro | 705/10 |
| 6,574,621 | B1 | * | 6/2003 | Lautzenheiser et al. | 707/4 |

OTHER PUBLICATIONS

Scott B. Parry, *Just What Is a Competency?(And Why Should You Care?)*, TRAINING Magazine, Jun. 1998 issue, article beginning at p. 58 (5 pages total including magazine cover).

Andrew L. Klein, *Validity and reliability for competency-based systems: Reducing litigation risks*, global computer network download printout, Copyright 1998, Infonautics Corporation, (11 pages total).

Article from USA WEEKEND entitled *Working Smart*, Oct. 2-4, 1998, edition, pp. 4-5.

*LOMA's Competency Dictionary*, cover page, inside cover page with 1998 copyright notice, and table of contents, and three pages therefrom (6 pages total).

Stephen C. Schoonover, *Competencies for the Year 2000, IA professional's Toolkit for Performance Development*, The Schoonover Group, Cover page, inside cover page, page I with copyright notice of 1998, page iii table of contents, back cover page listing The Schnoonover Group as publisher, (5 pages total).

Daniel Goleman, *Emotional Intelligence*, cover page and table of contents (3 pages total).

Daniel Goleman, *Working with Emotional Intelligence*, cover page and table of contents (3 pages total).

(Continued)

*Primary Examiner*—Romain Jeanty
(74) *Attorney, Agent, or Firm*—McKee, Voorhees & Sease, P.L.C.

(57) ABSTRACT

A method and apparatus for deriving key characteristics for superior performance in a job includes deriving a set of behaviorally-related competencies relevant to most jobs, surveying persons knowledgeable about the job based on the set of competencies, and defining the job in terms of the most significant competencies identified by the surveys.

8 Claims, 151 Drawing Sheets

| §2 | | | | | | | | | | | | | | | | | | | | | | | |
|---|---|---|---|---|---|---|---|---|---|---|---|---|---|---|---|---|---|---|---|---|---|---|---|
| Competency # | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| R | 2 | 2 | 2 | 3 | 2 | 2 | 2 | 2 | 2 | 2 | 2 | 2 | 2 | 2 | 2 | 2 | 2 | 2 | 2 | 2 | 2 | 2 | 2 |
| K | 2 | 1 | 1 | 1 | 2 | 1 | 2 | 1 | 1 | 2 | 1 | 1 | 1 | 1 | | 2 | 2 | 2 | 1 | 2 | 2 | 2 |
| P | | 1 | 1 | | 1 | | 1 | 1 | | 1 | 1 | 1 | 1 | 1 | 2 | | | | 1 | | | |

OTHER PUBLICATIONS

Bradford D. Smart, *Top grading—How Leading Companies Win by Hiring, Coaching and Keeping the Best People*, cover page and table of contents (3 pages total).

*Performance Skills Leader, Participant Package*, Human Technology, Inc., HRD Press, 11 pages.

*Factsheet*, DDI Development Dimensions International, *Leadership Development Through Assessment Centers*, copyright MCMXCIII, 2 pages.

*The Leadership Architect® Suite of Integrated Tools*, Lominer Limited, Inc., copyright 1995, Michael M. Lomabrdo & Robert W. Eichinger, cover page, insider cover page, p. 1 table of contents, pp. 7-14 (11 total pages).

*Skillscape, Competency Manager*™, cover page, inside cover page, three additional pages (5 total pages: 3318 Oak Street, Suite 19, Victoria, B.C., Canada V8X 1R1.

*Skillscape, Overview of Skillscape Competency Manager*™, cover page, table of contents, and pp. 1-15 (17 total pages); 3318 Oak Street, Suite 19, Victoria, B.C., Canada V8X 1R1.

\* cited by examiner

Position Survey

Identifying, Prioritizing and Calibrating

Performance Criteria

Fig. 3A

FOR ADMINISTRATIVE PURPOSES ONLY:

Job Code:

Name of Organization:

Title and Department of Position Being Analyzed:

Check One:

☐ Newly Created Position

☐ Existing Position

☐ Significant Changes in an Existing Position

Respondent's relationship to the position being analyzed:

☐ Has this position now (incumbent)

☐ Has had this position or one like it in the past (past incumbent)

☐ Manages this position now

☐ Has managed this position or positions like this in the past

☐ Reports to this position

☐ Is a customer of this position

☐ Works closely with this position

| Name of Respondent: | Response Code: |
|---|---|
| | |

Title and Department of Respondent:

Fig. 3B

INSTRUCTIONS FOR COMPLETING THE QUESTIONNAIRE

REMEMBER, FOCUS ON THE POSITION, NOT PEOPLE!

The questionnaire you will be responding to includes and significantly expands upon the research and emphasis on competence that has been ongoing for over twenty years in both business and education. The objective of the Position Analysis is to identify the competencies required for superior performance in a position. The process analyzes the responses from 1-10 people including past and current incumbents, supervisors and others who understand the position. The responses, including the differences, present unique opportunities for productive dialogue and clarification of issues relevant to employee selection, development, performance management and succession planning.

Let the Job Talk!

Before completing the questionnaire, a word of caution is in order. As tempting as it may be to answer the questions in terms of how you perform in the position or how you would like to perform in it, do not allow yourself to lapse into that mindset. The quality of the data is contingent upon your ability to answer the questions from an objective perspective. The intent of the questionnaire is to focus on the position in terms of what it requires for superior performance not on how people currently perform in the position.

When thinking about this position, there are three voices that you will hear:

1. The voice of how the work is currently being performed.
2. The voice of how you like the work to be performed.
3. The voice of the work telling you how the work should be performed.

Do your very best to listen to the third voice when completing this questionnaire. Only the third voice will speak clearly about how the work should be performed.

A Word About Hard Skills....

As organizations evolve from highly structured hierarchies to flatter more fluid forms, soft skill competencies are becoming at least as important as hard skills. This questionnaire, therefore, has intentionally ignored the analysis of the hard or technical skills required for superior performance. We find that many organizations have an understanding of the technical skills and knowledge necessary to perform in positions specific to functional areas within their industry. The purpose of this questionnaire is to clarify and prioritize the more obscure yet essential soft skill competencies. The technical or hard skills will need to be analyzed by organization utilizing a separate process.

Fig. 3C

SECTION ONE

REMEMBER, FOCUS ON THE POSITION, NOT PEOPLE!

Section one defines various elements of the position. Read each of the statements and check all of the elements that pertain to the position being analyzed.

---

EXAMPLE

1. This position has the authority to: (Check all that apply)
    - \_\_\_\_ hire and/or fire employees
    - \_x\_\_ establish performance objectives for others
    - \_\_\_\_ conduct and sign performance evaluations
    - \_\_\_\_ place employees in a disciplinary process
    - \_\_\_\_ grant salary adjustments and/or increases
    - \_x\_\_ change processes, procedures or schedules with approval
    - \_x\_\_ change processes, procedures or schedules without approval
    - \_\_\_\_ change the objectives of the position

---

As you can see from the example, this position has the authority to establish performance objectives for others and change processes, procedures or schedules with or without approval.

---

1. This position has the authority to: (Check all that apply)
    - \_\_\_\_ hire and/or fire employees  B3, A3
    - \_\_\_\_ establish performance objectives for others  B1, P3, A3
    - \_\_\_\_ Conduct and sign performance evaluations  P3, A3
    - \_\_\_\_ Place employees in a disciplinary process  P3, A3
    - \_\_\_\_ grant salary adjustments and/or increases  B3, P4, A4
    - \_\_\_\_ change processes, procedures or schedules with approval  P2, A2
    - \_\_\_\_ change processes, procedures or schedules without approval  B4, P4, A4
    - \_\_\_\_ change the objectives of the position  P4, A4

2. This position's financial responsibility, authority and control is in: (Check all that apply)
    - \_\_\_\_ Managing personal business expenses
    - \_\_\_\_ participating in the budgeting process
    - \_\_\_\_ preparing the final budget  B3
    - \_\_\_\_ administering funds (signing purchase orders or checks)  B4, A4
    - \_\_\_\_ approving budgets of others  B3, P1, A4
    - \_\_\_\_ meeting profit goals and controlling losses  B4, A4
    - \_\_\_\_ formulating policies  B4, P1, A4

Fig. 3D

SECTION ONE (CONTINUED)

REMEMBER, FOCUS ON THE POSITION, NOT PEOPLE!

3. Decision-making authority in this position is demonstrated by:
(Check all that apply)

_____ providing input or participating in the collection of data
_____ voting or influencing team decisions
_____ making decisions about processes or procedures  A2
_____ making policy decisions  A4

4. This position is held accountable for the following performance objectives:
(Check all that apply)

_____ personal performance objectives only
_____ directing or facilitating the work efforts of a team or shift  P3, A4
_____ meeting a team, shift or business unit objectives  B3, P4, A4
_____ multiple teams, shifts or business units' objectives  B4, P4, A5
_____ the business objectives of the entire organization  B5, P5, A5

5. The consequences for the organization when mistakes are made in this position are: (check all that apply)

_____ lost business opportunities
_____ lost time
_____ lost equipment or resources
_____ lost productivity
_____ lost customers
_____ lost revenue or profits
_____ lost reputation, image or credibility 6. Employees in this position have access to: (Check all that apply)

_____ cash/checks
_____ valuable inventory or merchandise
_____ vital systems and/or equipment
_____ dangerous chemicals
_____ controlled substances (drugs)
_____ customer lists
_____ financial data
_____ trade secrets
_____ negotiable securities
_____ bank accounts

Fig. 3E

SECTION TWO

REMEMBER, FOCUS ON THE POSITION, NOT PEOPLE!

Section two focuses on various behavioral requirements of the position. Read each position requirement and rank its importance to the position by circling a number from 1-6.
1= essential and 6= not necessary.

[VI]     [I]     RANKING SCALE [NI]

| Essential | | | | | Not Necessary |
|---|---|---|---|---|---|
| 1 | 2 | 3 | 4 | 5 | 6 |
| It is essential to demonstrate this behavior for superior performance. | It is important to demonstrate this behavior for superior performance. | It is sometimes important to demonstrate this behavior for superior performance. | It can be helpful but not necessary to demonstrate this behavior for superior performance. | It is not necessary to demonstrate this behavior for superior performance. | Demonstrating this behavior can undermine superior performance. |

EXAMPLE
1. Anticipating events, taking initiative and acting rather than waiting for direction:

Essential        Not Necessary
     1   2   3   4   (5)   6

As you can see from the example, anticipating events, taking initiative and acting rather than waiting for direction is ranked as a 5, or relatively insignificant in the position.

1. Anticipating events, taking initiative and acting rather than waiting for direction:

14, 23

| Essential | | | | Not Necessary | |
|---|---|---|---|---|---|
| 1 | 2 | 3 | 4 | 5 | 6 |

DI

2. Reacting to events and waiting for direction before acting:

| Essential | | | | Not Necessary | |
|---|---|---|---|---|---|
| 1 | 2 | 3 | 4 | 5 | 6 |

SC

3. Taking personal responsibility for actions and/or results:

11,14,23

| Essential | | | | Not Necessary | |
|---|---|---|---|---|---|
| 1 | 2 | 3 | 4 | 5 | 6 |

DSC                                                            I

Fig. 3F

SECTION TWO (CONTINUED)

REMEMBER, FOCUS ON THE POSITION, NOT PEOPLE!

4. Being accountable for producing results:
   11,14,23

| Essential | | | | Not Necessary | |
|---|---|---|---|---|---|
| 1 | 2 | 3 | 4 | 5 | 6 |

DI                   U I

5. Treating all people fairly and with respect:
   5,13,19

| Essential | | | | Not Necessary | |
|---|---|---|---|---|---|
| 1 | 2 | 3 | 4 | 5 | 6 |

SC                 Soc

6. Being sensitive to different races, nationalities, cultures, sexes, disabilities:
   5,13,19

| Essential | | | | Not Necessary | |
|---|---|---|---|---|---|
| 1 | 2 | 3 | 4 | 5 | 6 |

S                  Soc

7. Establishing and maintaining key alliances or partnerships within the organization:
   3,8,13,15,17

| Essential | | | | Not Necessary | |
|---|---|---|---|---|---|
| 1 | 2 | 3 | 4 | 5 | 6 |

DI

8. Establishing and maintaining key alliances or partnerships outside the organization:
   8,13,15,17

| Essential | | | | Not Necessary | |
|---|---|---|---|---|---|
| 1 | 2 | 3 | 4 | 5 | 6 |

DI

9. Continuously learning for career advancement:
   20

| Essential | | | | Not Necessary | |
|---|---|---|---|---|---|
| 1 | 2 | 3 | 4 | 5 | 6 |

T

10. Continuously learning to keep current or ahead of technology:
    20

| Essential | | | | Not Necessary | |
|---|---|---|---|---|---|
| 1 | 2 | 3 | 4 | 5 | 6 |

TUI

Fig.3G

SECTION TWO (Continued)

REMEMBER, FOCUS ON THE POSITION, NOT PEOPLE!

11. Inspiring others with a compelling vision, purpose or goal:
    1,8,5,18,21

| Essential | | | | Not Necessary | |
    |---|---|---|---|---|---|
    | 1 | 2 | 3 | 4 | 5 | 6 |

V I Tr

12. Coaching and counseling:
    2,4,19

| Essential | | | | Not Necessary | |
    |---|---|---|---|---|---|
    | 1 | 2 | 3 | 4 | 5 | 6 |

IS                                                       Soc

13. Recognizing and appreciating the contributions of others:
    2,5

| Essential | | | | Not Necessary | |
    |---|---|---|---|---|---|
    | 1 | 2 | 3 | 4 | 5 | 6 |

I                                                        Soc

14. Encouraging, supporting and mentoring the development of others:
    2

| Essential | | | | Not Necessary | |
    |---|---|---|---|---|---|
    | 1 | 2 | 3 | 4 | 5 | 6 |

IS                                                    Soc

15. Understanding and adapting to the needs of different people:
    3,4,5,19

| Essential | | | | Not Necessary | |
    |---|---|---|---|---|---|
    | 1 | 2 | 3 | 4 | 5 | 6 |

Soc

16. Commanding and exercising authority in decisions affecting people:
    1,22

| Essential | | | | Not Necessary | |
    |---|---|---|---|---|---|
    | 1 | 2 | 3 | 4 | 5 | 6 |

DI                                                     VI

17. Commanding and exercising authority in decisions on how to spend money and allocate resources:
    16,17,22

| Essential | | | | Not Necessary | |
    |---|---|---|---|---|---|
    | 1 | 2 | 3 | 4 | 5 | 6 |

SECTION TWO (Continued)

REMEMBER, FOCUS ON THE POSITION, NOT PEOPLE!

18. Commanding and exercising authority in strategic decisions:

1,12,15,16,17,21,22

| Essential | | | | Not Necessary | |
    |---|---|---|---|---|---|
    | 1 | 2 | 3 | 4 | 5 | 6 |

VI

19. Commanding and exercising authority in making policy:

1,15,16,17,21,22

| Essential | | | | Not Necessary | |
    |---|---|---|---|---|---|
    | 1 | 2 | 3 | 4 | 5 | 6 |

VI

20. Referring important decisions to someone in authority:

| Essential | | | | Not Necessary | |
    |---|---|---|---|---|---|
    | 1 | 2 | 3 | 4 | 5 | 6 |

S                                                                        Soc

21. Effectively handling sensitive issues within the organization:

13

| Essential | | | | Not Necessary | |
    |---|---|---|---|---|---|
    | 1 | 2 | 3 | 4 | 5 | 6 |

22. Effectively utilizing people:

3,10,12

| Essential | | | | Not Necessary | |
    |---|---|---|---|---|---|
    | 1 | 2 | 3 | 4 | 5 | 6 |

V

23. Building effective teams:

2,3,4

| Essential | | | | Not Necessary | |
    |---|---|---|---|---|---|
    | 1 | 2 | 3 | 4 | 5 | 6 |

24. Holding people accountable:

1,2,14,16

| Essential | | | | Not Necessary | |
    |---|---|---|---|---|---|
    | 1 | 2 | 3 | 4 | 5 | 6 | u I Tr

Fig. 3I

SECTION TWO (Continued)

REMEMBER, FOCUS ON THE POSITION, NOT PEOPLE!

25. Delegating responsibility and empowering others:

2

| Essential | | | | Not Necessary | |
|---|---|---|---|---|---|
| 1 | 2 | 3 | 4 | 5 | 6 |

26. Striving for continuous improvement:

20,23

| Essential | | | | Not Necessary | |
|---|---|---|---|---|---|
| 1 | 2 | 3 | 4 | 5 | 6 |

TA

27. Demonstrating genuine concern, caring and compassion for others:

5,19

| Essential | | | | Not Necessary | |
|---|---|---|---|---|---|
| 1 | 2 | 3 | 4 | 5 | 6 |

IS                                                                Soc

28. Meeting deadlines:

11,12,23

| Essential | | | | Not Necessary | |
|---|---|---|---|---|---|
| 1 | 2 | 3 | 4 | 5 | 6 |

29. Effectively handing sensitive issues outside the organization:

13

| Essential | | | | Not Necessary | |
|---|---|---|---|---|---|
| 1 | 2 | 3 | 4 | 5 | 6 |

30. Effectively utilizing funds:

6,16,22

| Essential | | | | Not Necessary | |
|---|---|---|---|---|---|
| 1 | 2 | 3 | 4 | 5 | 6 |

U

31. Effectively utilizing material equipment, etc:

6,16

| Essential | | | | Not Necessary | |
|---|---|---|---|---|---|
| 1 | 2 | 3 | 4 | 5 | 6 |

SECTION TWO (Continued)

REMEMBER, FOCUS ON THE POSITION, NOT PEOPLE!

32. Seeing unique or unusual perspectives:

7,10,21

| Essential | | | | Not Necessary | |
|---|---|---|---|---|---|
| 1 | 2 | 3 | 4 | 5 | 6 |

UAI

33. Identifying patterns, themes or connections not noticed by others:

7,10,21

| Essential | | | | Not Necessary | |
|---|---|---|---|---|---|
| 1 | 2 | 3 | 4 | 5 | 6 |

UA

34. Trying new methods, techniques and processes:

7,10

| Essential | | | | Not Necessary | |
|---|---|---|---|---|---|
| 1 | 2 | 3 | 4 | 5 | 6 |

DI                              UA

35. Increasing quantity, output or yield:

3,6,7,11,22

| Essential | | | | Not Necessary | |
|---|---|---|---|---|---|
| 1 | 2 | 3 | 4 | 5 | 6 |

D                              U

36. Working quickly or reducing the time needed to perform work:

3,6,7,11,22

| Essential | | | | Not Necessary | |
|---|---|---|---|---|---|
| 1 | 2 | 3 | 4 | 5 | 6 |

D                              U

37. Improving quality or processes:

3,6,7,11

| Essential | | | | Not Necessary | |
|---|---|---|---|---|---|
| 1 | 2 | 3 | 4 | 5 | 6 |

C

38. Reducing or eliminating costs:

6,7,11,17,22

| Essential | | | | Not Necessary | |
|---|---|---|---|---|---|
| 1 | 2 | 3 | 4 | 5 | 6 |

| SECTION TWO (Continued) |
|---|

REMEMBER, FOCUS ON THE POSITION, NOT PEOPLE!

39. Serving customers face to face:

9,18

| Essential | | | | Not Necessary | |
   |---|---|---|---|---|---|
   | 1 | 2 | 3 | 4 | 5 | 6 |

IS                                                                                     Soc

40. Making presentations to customers:

9,15,18

| Essential | | | | Not Necessary | |
   |---|---|---|---|---|---|
   | 1 | 2 | 3 | 4 | 5 | 6 |

I

41. Serving customers on the telephone:

9

| Essential | | | | Not Necessary | |
   |---|---|---|---|---|---|
   | 1 | 2 | 3 | 4 | 5 | 6 |

S                                                                                  Soc

42. Communicating with customers in writing:

8,9

| Essential | | | | Not Necessary | |
   |---|---|---|---|---|---|
   | 1 | 2 | 3 | 4 | 5 | 6 |

43. Communicating with customers on the Internet:

8,9

| Essential | | | | Not Necessary | |
   |---|---|---|---|---|---|
   | 1 | 2 | 3 | 4 | 5 | 6 |

Fig. 3L

SECTION THREE

REMEMBER, FOCUS ON THE POSITION, NOT PEOPLE!

Section three focuses on the measurement of some typical aspects of the position. The statements refer to normal circumstances, not just an occasional situation that may arise in the position. Circle a number from 1-6. 1= extensive and 6 = very little.

RANKING SCALE

| Extensive | | | | | Very Little |
|---|---|---|---|---|---|
| 1 | 2 | 3 | 4 | 5 | 6 |

EXAMPLE

The typical:
1. Speed at which change occurs in areas such as tasks, priorities, job responsibilities, processes or procedures:

| Extensive | | | Very Little | | |
|---|---|---|---|---|---|
| 1 | ②  | 3 | 4 | 5 | 6 |

As you can see from the example, the typical speed at which change is occurring in areas such as tasks, priorities, job responsibilities, processes or procedures is ranked a 2, or fairly extensive.

The typical:
1. Speed at which occurs in areas such as tasks, priorities, job responsibilities, processes or procedures:

10,20

| Extensive | | | | | Very Little |
|---|---|---|---|---|---|
| 1 | 2 | 3 | 4 | 5 | 6 |

DI

2. Level of activity on given day is:

| Extensive | | | | | Very Little |
|---|---|---|---|---|---|
| 1 | 2 | 3 | 4 | 5 | 6 |

DI

3. Opportunity for training or learning is:

20

| Extensive | | | | | Very Little |
|---|---|---|---|---|---|
| 1 | 2 | 3 | 4 | 5 | 6 |

T

4. Amount of change occurring in areas such as tasks, priorities, job responsibilities, processes or procedures is:

10,20

| Extensive | | | | | Very Little |
|---|---|---|---|---|---|
| 1 | 2 | 3 | 4 | 5 | 6 |

SECTION THREE (Continued)

REMEMBER, FOCUS ON THE POSITION, NOT PEOPLE!

The typical:

5. Extent to which tasks vary is:

10

| Extensive | | | | Very Little | |
   |---|---|---|---|---|---|
   | 1 | 2 | 3 | 4 | 5 | 6 |

DI

6. Amount of freedom to act without checking with someone in authority is:

23

| Extensive | | | | Very Little | |
   |---|---|---|---|---|---|
   | 1 | 2 | 3 | 4 | 5 | 6 |

DI

7. Amount of freedom to move around and set personal schedules is:

23

| Extensive | | | | Very Little | |
   |---|---|---|---|---|---|
   | 1 | 2 | 3 | 4 | 5 | 6 |

DI

8. Necessity for repeating tasks is:

| Extensive | | | | Very Little | |
   |---|---|---|---|---|---|
   | 1 | 2 | 3 | 4 | 5 | 6 |

SC

9. Necessity for influencing others is:

15

| Extensive | | | | Very Little | |
   |---|---|---|---|---|---|
   | 1 | 2 | 3 | 4 | 5 | 6 |

DI

10. Necessity for supervising others is:

4

| Extensive | | | | Very Little | |
    |---|---|---|---|---|---|
    | 1 | 2 | 3 | 4 | 5 | 6 |

11. Necessity for dealing with customers is:

9,18

| Extensive | | | | Very Little | |
    |---|---|---|---|---|---|
    | 1 | 2 | 3 | 4 | 5 | 6 |

IS                                                                Soc

Fig.3N

SECTION THREE (Continued)

REMEMBER, FOCUS ON THE POSITION, NOT PEOPLE!

The typical:

12. Necessity for resolving interpersonal conflict is:

4,5,17,18,19

| Extensive | | | | Very Little | |
    |---|---|---|---|---|---|
    | 1 | 2 | 3 | 4 | 5 | 6 |

D

13. Necessity for critical thinking is:

6

| Extensive | | | | Very Little | |
    |---|---|---|---|---|---|
    | 1 | 2 | 3 | 4 | 5 | 6 |

DC

14. Necessity for employee discipline is:

4

| Extensive | | | | Very Little | |
    |---|---|---|---|---|---|
    | 1 | 2 | 3 | 4 | 5 | 6 |

DC                                       T

15. Necessity for resolving fairly simple problems is:

6

| Extensive | | | | Very Little | |
    |---|---|---|---|---|---|
    | 1 | 2 | 3 | 4 | 5 | 6 |

16. Necessity for resolving complex problems is:

6

| Extensive | | | | Very Little | |
    |---|---|---|---|---|---|
    | 1 | 2 | 3 | 4 | 5 | 6 |

DC                                       T

17. Necessity for decision making is:

22

| Extensive | | | | Very Little | |
    |---|---|---|---|---|---|
    | 1 | 2 | 3 | 4 | 5 | 6 |

18. Amount of authority is:

1,14,16

| Extensive | | | | Very Little | |
    |---|---|---|---|---|---|
    | 1 | 2 | 3 | 4 | 5 | 6 |

D                                       TUI

Fig.3O

| SECTION THREE (Continued) |
|---|

REMEMBER, FOCUS ON THE POSITION, NOT PEOPLE!

The typical:

19. Necessity for dealing with competition in the marketplace is:

7,11,14,18,20,21

| Extensive | | | | Very Little | |
    |---|---|---|---|---|---|
    | 1 | 2 | 3 | 4 | 5 | 6 |

TUI

20. Necessity for developing a plan of action to meet goals (strategic planning) is:

1,8,10,11,12,16,21

| Extensive | | | | Very Little | |
    |---|---|---|---|---|---|
    | 1 | 2 | 3 | 4 | 5 | 6 |

DC                                                              U

21. Necessity for developing detailed long-range plans is:

12,21

| Extensive | | | | Very Little | |
    |---|---|---|---|---|---|
    | 1 | 2 | 3 | 4 | 5 | 6 |

22. Necessity for detailed organizing is:

12

| Extensive | | | | Very Little | |
    |---|---|---|---|---|---|
    | 1 | 2 | 3 | 4 | 5 | 6 |

C

23. Necessity for developing detailed short-range plans is:

12

| Extensive | | | | Very Little | |
    |---|---|---|---|---|---|
    | 1 | 2 | 3 | 4 | 5 | 6 |

U

24. Necessity for comprehensive time-management is:

12,23

| Extensive | | | | Very Little | |
    |---|---|---|---|---|---|
    | 1 | 2 | 3 | 4 | 5 | 6 |

Fig.3P

| SECTION THREE (Continued) |
|---|

REMEMBER, FOCUS ON THE POSITION, NOT PEOPLE!

The typical:

25. Necessity for maintaining composure is:

23

| Extensive | | | | Very Little | |
    |---|---|---|---|---|---|
    | 1 | 2 | 3 | 4 | 5 | 6 |

SC

26. Necessity for optimism is:

| Extensive | | | | Very Little | |
    |---|---|---|---|---|---|
    | 1 | 2 | 3 | 4 | 5 | 6 |

DI

27. Necessity for using caution is:

| Extensive | | | | Very Little | |
    |---|---|---|---|---|---|
    | 1 | 2 | 3 | 4 | 5 | 6 |

C

28. Level of decision-making risk is:

1,14

| Extensive | | | | Very Little | |
    |---|---|---|---|---|---|
    | 1 | 2 | 3 | 4 | 5 | 6 |

29. Necessity for creativity or innovation is:

7,10,21

| Extensive | | | | Very Little | |
    |---|---|---|---|---|---|
    | 1 | 2 | 3 | 4 | 5 | 6 |

UA

30. Extent to which difficult decisions need to be made is:

14

| Extensive | | | | Very Little | |
    |---|---|---|---|---|---|
    | 1 | 2 | 3 | 4 | 5 | 6 |

Fig.3Q

SECTION THREE (Continued)

REMEMBER, FOCUS ON THE POSITION, NOT PEOPLE!

The typical:

31. Extent to which unpopular decisions need to be made is:

4,13,14

| Extensive | | | | Very Little | |
    |---|---|---|---|---|---|
    | 1 | 2 | 3 | 4 | 5 | 6 |

DC

32. Amount of uncertainty about goals, direction, job tasks or expectations is:

| Extensive | | | | Very Little | |
    |---|---|---|---|---|---|
    | 1 | 2 | 3 | 4 | 5 | 6 |

33. Necessity for continued learning is:

20

| Extensive | | | | Very Little | |
    |---|---|---|---|---|---|
    | 1 | 2 | 3 | 4 | 5 | 6 |

T

34. Necessity for working closely with others is:

3

| Extensive | | | | Very Little | |
    |---|---|---|---|---|---|
    | 1 | 2 | 3 | 4 | 5 | 6 |

IS                                                          Soc

35. Necessity for effective listening is:

5

| Extensive | | | | Very Little | |
    |---|---|---|---|---|---|
    | 1 | 2 | 3 | 4 | 5 | 6 |

S

36. Necessity for counseling others is:

2,4,19

| Extensive | | | | Very Little | |
    |---|---|---|---|---|---|
    | 1 | 2 | 3 | 4 | 5 | 6 |

IS                                                          Soc

Fig.3R

SECTION THREE (Continued)

REMEMBER, FOCUS ON THE POSITION, NOT PEOPLE!

The typical:

37. Necessity to delegate work to others is:

| Extensive | | | | Very Little | |
|---|---|---|---|---|---|
| 1 | 2 | 3 | 4 | 5 | 6 |

38. Necessity for measuring the performance of others is:

1,12,16

| Extensive | | | | Very Little | |
|---|---|---|---|---|---|
| 1 | 2 | 3 | 4 | 5 | 6 |

39. Necessity for coaching or mentoring others is:

2,3,4,19

| Extensive | | | | Very Little | |
|---|---|---|---|---|---|
| 1 | 2 | 3 | 4 | 5 | 6 |

IS                                                        SOC

40. Amount of paperwork is:

| Extensive | | | | Very Little | |
|---|---|---|---|---|---|
| 1 | 2 | 3 | 4 | 5 | 6 |

C

41. Necessity for adhering to standard procedures is:

| Extensive | | | | Very Little | |
|---|---|---|---|---|---|
| 1 | 2 | 3 | 4 | 5 | 6 |

C                                                      Tr

42. Necessity for following policies is:

| Extensive | | | | Very Little | |
|---|---|---|---|---|---|
| 1 | 2 | 3 | 4 | 5 | 6 |

| SECTION THREE (Continued) |

REMEMBER, FOCUS ON THE POSITION, NOT PEOPLE!

The typical:

43. Necessity for persistence is:

| Extensive | | | | Very Little | |
|---|---|---|---|---|---|
| 1 | 2 | 3 | 4 | 5 | 6 |

SC

44. Impact on product quality is:

12

| Extensive | | | | Very Little | |
|---|---|---|---|---|---|
| 1 | 2 | 3 | 4 | 5 | 6 |

C

45. Necessity for considering the needs of others is:

5,19

| Extensive | | | | Very Little | |
|---|---|---|---|---|---|
| 1 | 2 | 3 | 4 | 5 | 6 |

IS           Soc

46. Necessity for negotiating is:

17,19

| Extensive | | | | Very Little | |
|---|---|---|---|---|---|
| 1 | 2 | 3 | 4 | 5 | 6 |

DI           U

47. Impact on quality service is:

9

| Extensive | | | | Very Little | |
|---|---|---|---|---|---|
| 1 | 2 | 3 | 4 | 5 | 6 |

Soc

48. Impact on the organization's image is:

9

| Extensive | | | | Very Little | |
|---|---|---|---|---|---|
| 1 | 2 | 3 | 4 | 5 | 6 |

SECTION THREE (Continued)

REMEMBER, FOCUS ON THE POSITION, NOT PEOPLE!

The typical:

49. Amount of contact with external customers, vendors and community is:

9,13,15,17,18

| Extensive | | | | Very Little | |
   |---|---|---|---|---|---|
   | 1 | 2 | 3 | 4 | 5 | 6 |

DIS

50. Amount of face-to-face communication/conversation is:

5

| Extensive | | | | Very Little | |
   |---|---|---|---|---|---|
   | 1 | 2 | 3 | 4 | 5 | 6 |

DI

51. Amount of telephone communication is:

| Extensive | | | | Very Little | |
   |---|---|---|---|---|---|
   | 1 | 2 | 3 | 4 | 5 | 6 |

52. Amount of electronic (computer) communication is:

8

| Extensive | | | | Very Little | |
   |---|---|---|---|---|---|
   | 1 | 2 | 3 | 4 | 5 | 6 |

53. Amount of written communication is:

8

| Extensive | | | | Very Little | |
   |---|---|---|---|---|---|
   | 1 | 2 | 3 | 4 | 5 | 6 |

54. Amount of presentations and public speaking is:

13,15,18

| Extensive | | | | Very Little | |
   |---|---|---|---|---|---|
   | 1 | 2 | 3 | 4 | 5 | 6 |

DI

55. Necessity for writing proposals, reports, newsletters or other business documents is:

8,20

| Extensive | | | | Very Little | |
   |---|---|---|---|---|---|
   | 1 | 2 | 3 | 4 | 5 | 6 |

Fig.3U

Scoring Key for Section 1 of POSITION SURVEY

12 B's
13 P's
18 A's

If no _____ by _____ A

| | | |
|---|---|---|
| No B | = | No |
| B1 | = | Slight |
| B2 | = | Moderate |
| B3 | = | Moderate |
| B4 | = | Significant |
| B5 | = | Major |
| | | |
| No P | = | _____ |
| P1 | = | _____ |
| P2 | = | _____ |
| P3 | = | _____ |
| P4 | = | _____ |
| P5 | = | _____ |
| | | |
| No A | = | _____ |
| A1 | = | _____ |
| A2 | = | _____ |
| A3 | = | _____ |
| A4 | = | _____ |
| A5 | = | _____ |

Fig. 4A

Classification of Position Issues from Section 1 of POSITION SURVEY

Responsibility for Results

| No | Slight | Moderate | Significant | Major |
|---|---|---|---|---|

Responsibility for Results Through People

| No | Slight | Moderate | Significant | Major |
|---|---|---|---|---|

Authority

| No | Slight | Moderate | Significant | Major |
|---|---|---|---|---|

Organizational Risks

| No | Slight | Moderate | Significant | Major |
|---|---|---|---|---|

Fig. 4B

| Competency | § II Q's | + | §III Q's | =Total Q's |
|---|---|---|---|---|
| 1 | 5 | + | 4 | 9 |
| 2 | 6 | + | 3 | 9 |
| 3 | 7 | + | 2 | 9 |
| 4 | 3 | + | 6 | 9 |
| 5 | 5 | + | 4 | 9 |
| 6 | 6 | + | 3 | 9 |
| 7 | 7 | + | 2 | 9 |
| 8 | 5 | + | 4 | 9 |
| 9 | 5 | + | 4 | 9 |
| 10 | 2 | + | 7 | 9 |
| 11 | 7 | + | 2 | 9 |
| 12 | 3 | + | 6 | 9 |
| 13 | 6 | + | 3 | 9 |
| 14 | 4 | + | 5 | 9 |
| 15 | 6 | + | 3 | 9 |
| 16 | 6 | + | 3 | 9 |
| 17 | 6 | + | 3 | 9 |
| 18 | 3 | + | 6 | 9 |
| 19 | 5 | + | 4 | 9 |
| 20 | 3 | + | 6 | 9 |
| 21 | 5 | + | 4 | 9 |
| 22 | 8 | + | 1 | 9 |
| 23 | 5 | + | 4 | 9 |

Scoring Key

Behavior

|   | §II Q's | + | §III Q's | = | Total Q's |
|---|---------|---|----------|---|-----------|
| D | 9 | + | 19 | = | 28 |
| I | 12 | + | 18 | = | 30 |
| S | 10 | + | 11 | = | 21 |
| C | 4 | + | 15 | = | 19 |

Values

|     | §II Q's | + | §III Q's | = | Total Q's |
|-----|---------|---|----------|---|-----------|
| +   | 3 | + | 5 | = | 8 |
| u   | 17 | + | 6 | = | 23 |
| a   | 4 | + | 2 | = | 6 |
|     | 10 | + | 6 | = | 16 |
| Soc | 10 | + | 3 | = | 13 |
| I   | 2 | + | 2 | = | 4 |
| tr  |   |   |   |   |   |

Fig. 5B

> Performance DNA International, Ltd.
> Position Report

A complete evaluation of the competencies necessary
to achieve superior performance in the position Output of all DNA Text

12/20/1999

Prepared by Performance DNA International, Ltd.

Fig. 6A

INTRODUCTION

The purpose of this report is to provide insight into the most important performance criteria for the position. Managers or leaders are encouraged to discuss the result of the report with new hires and incumbents to enhance their understanding of performance expectations. The information in this report is particularly valuable to organizations in the following Human Resource activities:

- BUILDING COMPETENCY PROFILES OR MODELS
- DESIGNING PERFORMANCE EVALUATION PROCESSES
- ASSESSING TRAINING AND DEVELOPMENT NEEDS
- DEVELOPING COMPENSATION AND REWARD SYSTEMS
- DESIGNING SUCCESSION PLANNING PROCESSES
- DEVELOPING SELECTION SYSTEMS

Information in the report is based on an objective analysis of data collected from specially selected individuals who understand the position well. Report results reflect a summary of their responses to the Position Survey questionnaire. The report results are generated by a computer analysis of all responses. Hundreds of calculations are performed to determine the key performance criteria of the position. Where there were multiple respondent data, an average composite of all responses is provided.

Each section of the report is designed to address important aspects of the position. Clarity, understanding and consensus on what competencies are required for superior performance is essential to optimize selection, training and development, performance evaluation, rewards, recognition and succession planning programs. Read each section of the report carefully to gain insight into the most important position requirements.

Research indicates that a specific group of competencies are required to produce superior performance in most positions. This report provides detailed descriptions on seven (7) of the most important competencies required for superior performance in the position. Significant differences in respondent rankings of the competencies indicate a need for clarification. It is recommended that the results of the report be discussed with incumbents and management to obtain consensus before integrating the information into Human Resource processes.

The last section of the report provides samples of behavioral interview questions designed to assist hiring authorities to plan structured selection interviews. The questions provide a frame work for comparing candidate competency strengths with the competency requirements of the position. Selection the questions that seem most appropriate to the position being analyzed.

Fig. 6B

HIERARCHY OF COMPETENCIES

*The competencies required for superior performance have been prioritized based on the analysis of responses to the questionnaire. Where there were multiple respondents to the questionnaire, the list represents a composite average of all responses. The hierarchical order of the competencies represents their relative importance to each other in producing superior performance in the position.*

|     | HIERARCHY OF COMPETENCIES |
| --- | --- |
| 1.  | Leadership |
| 2.  | Employee Development/Coaching |
| 3.  | Teamwork |
| 4.  | Conflict Management |
| 5.  | Interpersonal Skills |
| 6.  | Problem Solving |
| 7.  | Creativity/Innovation |
| 8.  | Written Communication |
| 9.  | Customer Service |
| 10. | Flexibility |
| 11. | Goal Orientation |
| 12. | Planning/Organizing |
| 13. | Diplomacy |
| 14. | Personal Effectiveness |
| 15. | Presenting |
| 16. | Management |
| 17. | Negotiation |
| 18. | Persuasion |
| 19. | Empathy |
| 20. | Continuous Learning |
| 21. | Futuristic Thinking |
| 22. | Decision Making |
| 23. | Self Management |

 Very Important      Important      Not Important

Fig. 6C

SUGGESTIONS FOR IMPLEMENTING REPORT RESULTS

Before implementing the information in this report, it is recommended that the respondents meet to verify the results of the report. The hierarchy of competencies should not be accepted at face value as a competency model for the position. The hierarchical order of the competencies represents the relative importance of competencies in relationship to each other. Although competencies are shown in a hierarchy, several competencies may be relatively equal in importance.

Position reports on hundreds of positions confirms that it is more practical to eliminate the competencies that are not important for superior performance than to debate the precise order of the most important competencies. Based on the analysis of the responses to the questionnaire, the competencies noted as not important should not be emphasized in selection, training and development, performance evaluation, rewards, recognition or succession planning processes aimed at this position.

The data on hundreds of positions also confirms that differences in respondent rankings of competencies are common. The information in this report is designed to highlight both the differences as well as the similarities between respondent rankings of competencies.

Differences in competency rankings can be attributed to a number of factors. Some respondents may be high performing incumbents with a thorough understanding of the position, while others may be new to the position.

In some cases, respondents will have a different perspective of the importance of competencies by virtue of their unique relationship to the position. For example, a customer of the position may have a tendency to weight the customer service competency over others.

In cases where a position is being impacted by significant change, the difference in perspectives provides a valuable framework for respondents to create the new behavioral blueprint for success together. Working through the results of the report together, respondents can achieve a new level of understanding about how the demonstration of specific behaviors contributes to the fulfillment of the most important accountabilities and responsibilities in the position.

Fig. 6D

Distribution of Competency Rankings

*The distribution of competency rankings illustrates individual differences in responses from multiple respondents to the questionnaire. The hierarchical listing of competencies on the left side of the chart represents the composite ranking of all respondents on each competency. The right side of the chart lists the competency rankings of each individual respondent.*

|    | HIERARCHY OF COMPETENCIES      | R1 |
|----|--------------------------------|----|
| 1  | Leadership                     | 1  |
| 2  | Employee Development/Coaching  | 2  |
| 3  | Teamwork                       | 3  |
| 4  | Conflict Management            | 4  |
| 5  | Interpersonal Skills           | 5  |
| 6  | Problem Solving                | 6  |
| 7  | Creativity/Innovation          | 7  |
| 8  | Written Communication          | 8  |
| 9  | Customer Service               | 9  |
| 10 | Flexibility                    | 10 |
| 11 | Goal Orientation               | 11 |
| 12 | Planning/Organizing            | 12 |
| 13 | Diplomacy                      | 13 |
| 14 | Personal Effectiveness         | 14 |
| 15 | Presenting                     | 15 |
| 16 | Management                     | 16 |
| 17 | Negotiation                    | 17 |
| 18 | Persuasion                     | 18 |
| 19 | Empathy                        | 19 |
| 20 | Continuous Learning            | 20 |
| 21 | Futuristic Thinking            | 21 |
| 22 | Decision Making                | 22 |
| 23 | Self Management                | 23 |

 Very Important   Important   Not Important

Note: Based on the analysis of the responses to the questionnaire, the order of the competencies indicates three levels of importance shown by the average of the group as well as individual rankings. Competencies that are not important should not be emphasized in selection, training and development, performance evaluation, rewards, recognition or succession planning processes aimed at this position. Significant differences between respondents' rankings may indicate a need for clarification.

Fig. 6E

Key Characteristics of the Position

*The position has been analyzed relative to four key characteristics. These characteristics are accountability for results, result through people, authority and risk. Based on the responses to the questionnaire, these characteristics have been measured on a sliding scale and are illustrated by a bar graph. The scale range includes none, slight, moderate, significant and major.*

Accountability for Results: This characteristic addresses the accountability for producing measurable results in the position. This includes accountability for meeting financial, operations and/or system objectives.

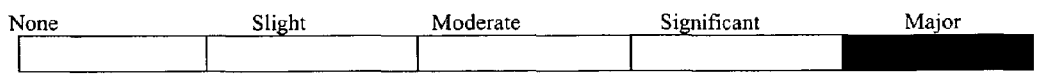

Results through People: This characteristic addresses the emphasis on producing results through the efforts and cooperation of people. This characteristic is not limited to management or leadership positions. Many non-management or leadership positions in team-based organizational structures depend heavily upon the efforts and cooperation of people to produce results.

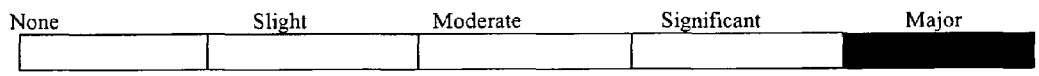

Authority: This characteristic addresses the level of authority that exists in the position. Evidence of authority can be found in the ability to make decisions or changes without prior approval from upper management. This characteristic is not limited to management or leadership positions. In their efforts to become more responsive, many large organizations are finding it necessary to drive decision-making downward. In these organizations, many positions can be characterized by a moderate to significant amount of authority but are not considered management or leadership.

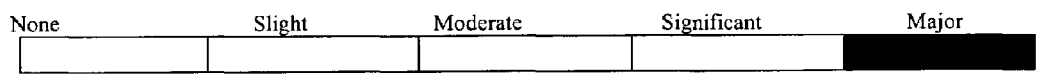

Risks: This characteristic addresses the inherent level of business risk or liability to the organization that exists in the position. Position with indications of moderate, significant or major levels of inherent risk or liability to the organization may warrant the use of drug, alcohol and/or other appropriate assessments in their selection and management systems.

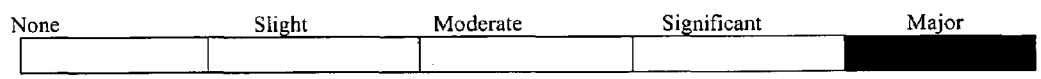

Fig. 6F

SUMMARY OF TOP COMPETENCIES

*This report focuses on soft skill competencies because they are usually more difficult to identify or assess than technical competencies or experience. Observing the behaviors people use to produce superior performance can provide insight into the demonstration of competencies. Seven (7) of the most important competencies required to produce superior performance are described below in terms of observable behaviors. The behaviors listed below each competency provide examples of some of the ways the competency is demonstrated. Read each behavior and check the ones that must be demonstrated to produce superior performance in the position. More importance is typically placed on those behaviors that must be demonstrated consistently on a daily, weekly or monthly basis.*

1. LEADERSHIP: Achieving extraordinary business results through people.

- Inspires others with compelling visions.
   - Takes risks for the sake of principles, values or mission.
   - Builds trust and demonstrates integrity with a noticeable congruence between words and actions (walks their talk).
   - Demonstrates optimism and positive expectations of others.
   - Delegates appropriate responsibilities and authority.
   - Involves people in decision that affect them.
   - Addresses performance issues promptly, fairly and consistently.
   - Adapts methods and approaches to the needs and motivations of others.
   - Makes decisions to avoid or mitigate the negative consequences for people.
   - Demonstrates loyalty to constituents.

2. EMPLOYEE DEVELOPMENT/COACHING: Facilitating and supporting the professional growth of others.

- Expresses confidence in others' ability to perform.
   - Identifies developmental needs.
   - Encourages initiative and improvement.
   - Provides opportunities for training.
   - Gives new, difficult and/or challenging work assignments.
   - Acknowledges and praises improvements.
   - Trains, coaches and mentors others to develop.
   - Views mistakes as opportunities for learning.
   - Promotes learning and growth.

Fig. 6G

SUMMARY OF TOP COMPETENCIES

3. Teamwork: Working effectively and productively with others.

- Respects team members and their individual perspectives.
   - Makes team mission and objectives a priority.
   - Works toward consensus when team decisions are required.
   - Meets agreed-upon deadlines on team assignments and commitments.
   - Shares responsibility with team members for successes and failures.
   - Keeps team members informed regarding projects.
   - Supports team decisions.
   - Recognizes and appreciates the contributions of team members.
   - Behaves in a manner consistent with team values and mission.
   - Provides constructive feedback to team and its members.
   - Responds positively to feedback from team members.
   - Raises and/or confronts issues limiting team effectiveness.

4. CONFLICT MANAGEMENT: Addressing and resolving conflict constructively.

- Readily identifies and addresses issues, concerns or conflicts.
   - Recognizes opportunities for positive outcomes in conflict situations.
   - Reads situations quickly and accurately to pinpoint critical issues.
   - Listens to gain understanding of an issue from different perspectives.
   - Diffuses tension and effectively handles emotional situations.
   - Assists people in adversarial positions to identify common interests.
   - Strives to settle differences equitably.
   - Settles differences without damaging relationships.

5. INTERPERSONAL SKILLS: Effectively communicating, building rapport and relating well to all kinds of people.

- Strives for self-awareness.
   - Demonstrates sincere interest in others.
   - Treats all people with respect, courtesy and consideration.
   - Respects differences in the attitudes and perspectives of others.
   - Listens, observes and strives to gain understanding of others.
   - Communicates effectively.
   - Sensitive to diversity issues.
   - Develops and maintains relationship with many different kinds of people regardless of cultural differences.

Fig. 6H

| SUMMARY OF TOP COMPETENCIES |
|---|

6. PROBLEM SOLVING: Anticipating, analyzing, diagnosing and resolving problems.

- Anticipates, identifies and resolves problems or obstacles.
- Utilizes logic and systematic processes to analyze and solve problems.
- Defines the causes, effects, impact and scope of problems.
- Identifies the multiple components of problems and their relationships.
- Prioritizes steps to solution.
- Develops criteria for optimum solutions.
- Evaluates the potential impact of possible solutions and selects the best one.

7. CREATIVITY/INNOVATION: Adapting traditional or devising new approaches, concepts, methods, models, designs, processes, technologies and/or systems.

- Notices unique patterns, variables, processes, systems or relationships.
- Expresses non-traditional perspectives and/or novel approaches.
- Synthesizes and/or simplifies data, ideas, models, processes or systems.
- Challenges established theories, methods and/or protocols.
- Encourages and promotes creativity and innovation.
- Modifies existing concepts, methods, models, designs, processes, technologies and systems.
- Develops and tests new theories to explain or resolve complex issues.
- Applies unorthodox theories and/ or methods.
- Imagines new or revolutionary concepts, methods, models, designs, processes, technology, systems, products, services or industries.

8. WRITTEN COMMUNICATION: Writing clearly, succinctly and understandably.

- Writes in ways that make abstract concepts, issues and information clear and understandable.
- Utilizes a wide range of appropriate writing techniques and methods.
- Succinctly presents objective or subjective viewpoints and arguments.
- Achieves communication objectives by organizing information in logical sequences that lead readers to come to natural conclusions.
- Determines what information needs to be communicated.
- Deftly utilizes written language to convey key messages and meaning.
- Effectively involves readers in the material.
- Adjusts writing style to specific audiences as needed.

Fig.6I

SUMMARY OF TOP COMPETENCIES

9. CUSTOMER SERVICES: Anticipating, meeting and/or exceeding customer needs, wants and expectations.

- Strives to anticipate, identify and understand customers' wants, needs and concerns.
   - Responds to customers with a sense of urgency.
   - Follows through on customer requests.
   - Is patient and courteous with customers.
   - Resolves issues and complaints to the satisfaction of customers.
   - Expends extraordinary efforts to satisfy customers.
   - Develops relationships with customers.
   - Partners with customers to assist them in achieving their objectives.
   - Acts as an advocate for customers' needs.
   - Takes professional risks for the sake of customers' needs.

10. FLEXIBILITY: Agility in adapting to change.

- Responds promptly to shifts in direction, priorities and schedules.
    - Demonstrates agility in accepting new ideas, approaches and/or methods.
    - Effective in juggling multiple priorities and tasks.
    - Modifies methods or strategies to fit changing circumstances.
    - Adapts personal style to work with different people.
    - Maintains productivity during transitions, even in the midst of chaos.
    - Embraces and/or champions change.

11. GOAL ORIENTATION: Energetically focusing efforts on meeting a goal, mission or objective.

- Acts independently to achieve objectives without supervision.
    - Expends the necessary time and effort to achieve goals.
    - Recognizes and acts on opportunities to advance progress towards meeting goals.
    - Establishes and works towards ambitious and challenging goals.
    - Develops and implements strategies to meet objectives.
    - Measures effectiveness and performance to ensure results are attained.
    - Acts with a sense of urgency to achieve goals.
    - Demonstrates persistence in overcoming obstacles to meet objectives.
    - Takes calculated risks to achieve results.

Fig. 6J

SUMMARY OF TOP COMPETENCIES

12. PLANNING/ORGANIZING: Utilizing logical, systematic and orderly procedures to meet objectives.

- Works effectively within established time frames and priorities.
    - Utilizes logical, practical and efficient approaches.
    - Prioritizes tasks for optimum productivity.
    - Develops procedures, process and systems for order, accuracy, efficiency and productivity.
    - Anticipates probable effects, outcomes and risks.
    - Develops contingency plans to minimize waste, error and risk.
    - Allocates, adjusts and manages resources according to priorities.
    - Monitors implementation of plans and makes adjustments as needed.

13. DIPLOMACY: Effectively handling difficult or sensitive issues by utilizing tact, diplomacy and an understanding of organization culture, climate and/or politics.

- Effectively utilizes tact and diplomacy in working with people across hierarchical, functional and/or cultural borders.
    - Understands cultural, climate and organizational issues.
    - Adapts conduct and communications to "politically correct" standards.
    - Effectively leverages networks of influence to get things done.
    - Is sensitive to the needs of "special interest" groups within organizations.
    - Builds relationships and networks with key people of influence.
    - Provides advice, counsel and mentoring on organizational issues.
    - Utilizes both formal and informal networks internally to obtain support and achieve results.
    - Utilizes both formal and informal networks externally to obtain support and achieve results.

14. PERSONAL EFFECTIVENESS: Demonstrating initiative, self confidence, resiliency and a willingness to take responsibility for personal actions.

- Possesses unwavering confidence and belief in personal capabilities.
    - Takes initiatives and does what ever it takes to achieve goals.
    - Projects confidence and self-assurance.
    - Bounces back after setbacks.
    - Asserts self in personal and professional life.
    - Admits mistakes and works to avoid repeating them.
    - Accept personal responsibility for achieving personal and professional goals.
    - Functions effectively and achieves results even in adverse circumstances.

Fig. 6K

SUMMARY OF TOP COMPETENCIES

15. PRESENTING: Communicating effectively to groups.
    - Organizes information to be presented in succinct, logical sequence.
    - Presents information in ways that makes abstract or complex concepts clear and understandable.
    - Effectively utilizes language, word-pictures, stories, metaphors and humor.
    - Utilizes a wide range of non-verbal communication or body language such as speech inflection, voice modulation, eye contact, facial expression and gestures.
    - Implements a variety of visual and auditory devices to capture and invoke the audience's senses, participation and interest.
    - Project authenticity, confidence, conviction and passion.
    - Appeals to and engages the heart and mind of the audience.
    - Tailors presentation to the interests, needs and wants of audiences.
    - Establishes and delivers content objectives.
    - Communicates in ways that elevate audience awareness and understanding.
    - Communicates in ways that enlighten, educate, challenge and persuade the audience to think, believe or behave in a specific way.
    - Is recognized and relied upon as an effective spokesperson.

16. MANAGEMENT: Achieving extraordinary results through effective management of resources, systems and processes.

- Takes risks for the sake of goals, objectives or results.
    - Demonstrates optimism and positive expectations of others.
    - Establishes high performance standards.
    - Holds people accountable and focused on goals and priorities.
    - Identifies barriers to objectives and removes them.
    - Delegates appropriate responsibilities and authority.
    - Ensures adequate resources are available to achieve objectives.
    - Makes decisions that benefit the bottom line or return on investment.

17. NEGOTIATION: Facilitating agreements between two or more parties.

- Understands both parties must get something they want before agreement is feasible.
    - Listens to identify and understand what each party wants.
    - Determines what each party is willing to accept in an agreement.
    - Establishes a non-threatening environment, conducive to open communication for discussing possible terms of agreement.
    - Develops the terms for an agreement.
    - Ensures each party understands the terms of agreement.
    - Binds agreements between parties with verbal and/or written contracts.

Fig. 6L

SUMMARY OF TOP COMPETENCIES

18. PERSUASION: Convincing others to change the way they think, believe or behave.

- Utilizes the knowledge of other's needs, wants, beliefs, attitudes and behavior to promote a concept, product or service.
- Builds trust and credibility before attempting to promote concepts, products or services.
- Understands and utilizes compliance-producing behaviors to influence others such as authority, being likable, proof of the prior compliance of others, limited availability, sampling or giving something away to create a sense of obligation.
- Uses logic and reason to develop rational arguments that challenge current assumptions, attitudes, beliefs and behavior.
- Identifies and addresses the social, emotional, economic and practical barriers that prevent people from complying.
- Adapts techniques and approaches to the needs and wants of those being influenced.

19. EMPATHY: Identifying with and caring about others.

- Demonstrates genuine concern for others.
- Respects and values people.
- Perceives and is sensitive to the emotions people experience.
- Expends considerable effort to understand the real needs, concerns and feelings of others.
- Advocates for the interests, needs and wants of others.
- Demonstrates cross-cultural sensitivity and understanding.
- Takes personal and/or professional risks for the sake of others.

20. CONTINUOUS LEARNING: Taking initiative in learning and implementing new concepts, technologies and/or methods.

- Demonstrates curiosity and enthusiasm for learning.
- Takes initiatives in acquiring and mastering the skills and knowledge requirements of a position.
- Keeps abreast of current or new information through reading and other learning methods.
- Actively interested in new technologies, processes and methods.
- Welcomes or seeks assignments requiring new skills and knowledge.
- Expends considerable effort and/or expense on learning.
- Genuinely enjoys learning.
- Identifies applications for knowledge.
- Is considered a knowledgeable resource by others.

Fig. 6M

SUMMARY OF TOP COMPETENCIES

21. FUTURISTIC THINKING: Imagining, envisioning, projecting and/or predicting what has not yet been realized.

- Demonstrates an ability to connect the dots and see the big-picture.
   - Observes and analyzes the forces driving current reality that may have long term-effects.
   - Utilizes foresight and intuitive perception as well as factual events to draw inferences.
   - Recognizes, supports and/or champions progressive ideas.
   - Anticipates future trends or events.
   - Envisions possibilities others may not.
   - Imagines and/or predicts changes in current reality based on deductive and conceptual reasoning.

22. DECISION MAKING: Utilizing effective processes to make decisions.

- Demonstrates an ability to make difficult decisions in a timely manner.
   - Gathers relevant input and develops a rational for making decisions.
   - Evaluates the impact or consequences of decision before making them.
   - Acts decisively despite obstacles, resistance or opposition.
   - Accepts consequences of decisions.
   - Willing to correct erroneous decisions when necessary.
   - Defends rational for decisions when necessary.

23. SELF MANAGEMENT: Demonstrating self control and an ability to manage time and priorities.

- Effectively manages emotions and impulses.
   - Effectively manages time and priorities to meet deadlines.
   - Presents self assertively.
   - Demonstrates an ability to maintain composure in the midst of crisis.
   - Strives for continuous improvement.
   - Balances personal and professional life.
   - Takes initiative and acts without waiting for direction.
   - Accepts responsibilities for actions and results.

Fig. 6N

BEHAVIORAL INTERVIEW QUESTIONS

Studies show that traditional interviewing methods are less than 14% accurate in predicting performance. Properly conducted structured interviewing techniques focused on assessing the competencies most important for superior performance in a position can significantly improve accuracy over traditional interviewing methods.

Behavioral interviewing is a disciplined approach that has been used effectively by corporate America since the 1970s. Behavioral interviewing is based on the premise that past behavior is the best predictor of future behavior. Behavioral interview questions ask for specific examples and experiences from the candidate's past. Interviewers can determine whether or not candidates have actually demonstrated the required competencies by the examples they use.

To plan a structured or behavioral interview, start by reviewing the job description to clarify the most important accountabilities of the position. Then review the list of top seven competencies and determine their relative importance as selection criteria according to which ones are necessary to produce the most important results of the position. Next, review the suggestions for behavioral interview questions and select the ones that seem most appropriate for the position.

The suggested behavioral interview questions relate specifically to the top seven (7) competencies. For most positions, additional questions will need to be developed. Since technical competencies are not a part of the Position Survey, questions relative to technical competencies are not provided in this report. The technical competencies required for superior performance in positions will need to be identified and addressed in selection interviews. A complete interview plan includes the development of appropriate behavioral interview questions relating to both soft skill and technical competencies.

The manual provides a suggested methodology for evaluating candidates by weighting the competencies according to their importance, developing benchmarks for evaluating competency levels and a standardized candidate rating scale. Regardless of the interviewing, evaluation and selection methodologies an organization uses, the same process should be consistently applied with each and every candidate.

Fig. 60

BEHAVIORAL INTERVIEW QUESTIONS

1. LEADERSHIP: Achieving extraordinary business results through people.

Listen for an ability to obtain the trust, commitment and motivation of others to achieve goals and objectives. Be sure to probe for as many details and specifics as possible such as names, dates and other verifiable information. Skilled interviewers will also ask candidates for their thoughts or feelings about a situation to gain further insight.

- If you have held a leadership position in the past, draw the organizational chart above and below your position to illustrate the scope of your leadership responsibilities.
   - Give me an example of when you inspired people with a vision.
   - Tell me about a time when you significantly improved the performance of a group of people who reported directly to you.
   - How did you motivate the top performers?
   - Did you use the same techniques with the poor performance?
   - If not, what did you do differently?
   - What actions did you take to improve poor performance?
   - Describe your leadership style.
   - Tell me about a situation when you were able to maintain the trust and commitment of people after making or implementing a decision that negatively impacted them.
   - Give me an example of when you took a significant risk for the sake of a principle, a value or a mission?
   - Describe a situation when you failed to obtain the commitment, dedication and trust of others.
   - What, if anything, would you do differently?

2. EMPLOYEE DEVELOPMENT/COACHING: Facilitating and supporting the professional growth of others.

Listen for a belief in the potential of others and promoting of learning and development. Be sure to probe for as many details and specifics as possible such as names, dates and other verifiable information. Skilled interviewers will also ask candidates for their thoughts or feelings about a situation to gain further insight.

- Describe your personal experience with a mentor or coach.
   - What role have they played in your career development?
   - What training or development activities have you participated in over the last three years?
   - Give me an example of when your mentoring or coaching helped someone develop.
   - What process or approach did you take?
   - What, if any obstacles did you encounter?
   - How did you overcome them?
   - Describe a situation when you gave someone an assignment you knew would be a stretch for them.

Fig. 6P

| BEHAVIORAL INTERVIEW QUESTIONS |
|---|

- What was the outcome?
- What influence or role have you had in advancing individual and organizational learning?
- Describe a situation when your personal learning and development objectives conflicted with business objectives?
- How did you resolve it?

3. TEAMWORK: Working effectively and productively with others.

Listen for strong commitment and contributions to team members working towards a specific goal. Be sure to probe for as many details and specifics as possible such as names, dates and other verifiable information. Skilled interviewers will also ask candidates for their thoughts or feelings about a situation to gain future insight.

- Give me an example of one of the most significant contributions you made as a member of a high performing team.
- What, in your opinion, made it a high performing team?
- Describe how you felt about the contributions of the others on the team.
- Give me an example of a situation where you had difficulties with a team member.
- What, if anything, did you do to resolve the difficulties?
- Describe how you felt about a decision the team wanted to make that you didn't agree with.
- Describe a situation where the team was having trouble agreeing on a decision and what you did to facilitate consensus.
- Give me an example of when you were on a team that failed to meet its objectives.
- What could the team have done differently?

4. CONFLICT MANAGEMENT: Addressing and resolving conflict constructively.

Listen for proactive identification and resolution of concerns and issues. Be sure to probe for as many details and specifics as possible such as names, dates and other verifiable information. Skilled interviewers will also ask candidates for their thoughts or feelings about a situation to gain further insight.

- Describe the most difficult conflict you've ever had to manage.
- How did you handle the emotional component?
- What, if anything, did you do to resolve the conflict?
- Describe a situation where two people who reported to you had a conflict.
- What did you do to help them resolve it?
- What happened to their relationship going forward?
- Give me an example of when you identified the most important issues or concerns in a conflict situation.

Fig. 6Q

BEHAVIORAL INTERVIEW QUESTIONS

- Describe a situation when you were confronted directly by someone who reported to you.
- What was your response?
- What is your relationship with that individual today?
- What have you done to improve your ability to deal with conflict?
- Describe a situation when you were given special recognition or acknowledgment for resolving a conflict at work.
- Tell me about a time when you were able to calm someone who was upset at work.

5. INTERPERSONAL SKILLS: Effectively communicating, building rapport and relating well to all kinds of people.

Listen for self awareness, understanding and an ability to communicate effectively with others regardless of differences. Be sure to probe for as many details and specifics as possible such as names, dates and other verifiable information. Skilled interviewers will also ask candidates for their thoughts or feelings about a situation to gain further insight.

- Describe the most difficult working relationship you've had with an individual.
- What specific actions did you take to improve the relationship?
- What was the outcome?
- Describe the types of people you get along with best and why.
- Describe the types of people you have difficulty getting along with and why.
- Give me an example of a situation when you demonstrated sensitivity to diversity issues.
- Describe a situation when you were able to strengthen a relationship by communicating effectively.
- What made your communication effective?
- Describe your relationship with the people you work with.
- What have you done in the past to build rapport and relationship with people?
- Give me an example of your ability to communicate effectively and build relationships with people regardless of cultural differences.
- Describe how your ability to communicate effectively and build relationships with many different types of people has contributed to one of your greatest accomplishments.

6. PROBLEM SOLVING: Anticipating, analyzing, diagnosing and resolving problems.

Listen for an analytical and disciplined approach to solving problems. Be sure to probe for as many details and specifics as possible such as names, dates and other verifiable information. Skilled interviewers will also ask candidates for their thoughts or feelings about a situation to gain further insight.

Fig. 6R

BEHAVIORAL INTERVIEW QUESTIONS

- Describe a situation when you anticipated a problem.
- What, if anything did you do about it?
- Give me an example of when your diagnosis of a problem proved to be correct.
- What approach did you take to diagnose the problem?
- What was the outcome?
- Describe the most difficult work problem you've ever encountered.
- What made it difficult?
- What steps did you take towards developing a solution?
- What factors did you consider in evaluating solutions?
- What solution was implemented and how successful was it in solving the problem?

7. CREATIVITY/INNOVATION: Adapting traditional or devising new approaches, concepts, methods, models, design, processes, technologies and/or systems.

Listen for "out-of-the-box" thinking and unusual approaches. Be sure to probe for as many details and specifics as possible such as names, dates and other verifiable information. Skilled interviewers will also ask candidates for their thoughts or feelings about a situation to gain further insight.

- Describe a work situation when you adapted a concept, design, process or system to meet a need.
- How did you go about it?
- Describe a work situation when you took an unusual or non-traditional approach to get results.
- What made your approach so unusual?
- Why did you take that approach?
- How did others respond to your approach?
- What was the outcome?
- What, if anything, would you do differently?
- Give me an example of when you were given special recognition for a new idea, method or process that improved results.

8. WRITTEN COMMUNICATION: Writing clearly, succinctly and understandably.

Listen for example of clear, understandable writing that is effective at achieving a specific communication goal. Be sure to probe for as many details and specifics as possible such as names, dates and other verifiable information. Skilled interviewers will also ask candidates for their thoughts or feelings about a situation to gain further insight.

- Give me an example of something you wrote that was effective in achieving a communication goal.

Fig. 6S

BEHAVIORAL INTERVIEW QUESTIONS

- What were the challenges in writing it?
- Give me an example of when you adapted your writing to your reader(s).
- How did you adapt your writing?
- How do you know when something you've written has achieved its communication goal?
- Describe the most difficult writing challenge you've had.
- How did you meet it?
- Tell me about any experiences you've had with publishing your writing.
- Do you have any examples of writing that demonstrate your ability to write effectively?
- Give me an example of when you were given special recognition or acknowledgment for your ability to write a business document such as a proposal, report, newsletter or article.
- Describe a situation when your editing improved the effectiveness of someone else's writing.

9. CUSTOMER SERVICE: Anticipating, meeting and/or exceeding customer needs, wants and expectations Listen for extraordinary effort in responding to customer needs and wants to insure satisfaction. Be sure to probe for as many details and specifics as possible such as names, dates and other verifiable information. Skilled interviewers will also ask candidates for their thoughts or feelings about a situation to gain further insight.

- Give me an example of when you went out of your way for a customer.
- What was the outcome?
- Describe the most difficult customer you've ever had to deal with and how you handled them.
- Describe a situation when you were given outstanding customer service.
- What made it stand out?
- Describe a situation when you felt a particularly demanding customer may have been trying to take advantage of you or the organization.
- What was the outcome?
- Give me an example of a situation where you improved the level of customer service in your organization.
- What did you do to improve it?
- What was the outcome?
- Give me an example of when you were given special recognition or acknowledgment for going the extra mile to satisfy a customer.
- Question: Describe a situation when you took a stand for a customer.

Fig. 6T

BEHAVIORAL INTERVIEW QUESTIONS

10. FLEXIBILITY: Agility in adapting to change.

Listen for a positive attitude towards lots of activity, multi-tasking and change, in general.
    Be sure to probe for as many details and specifics as possible such as names, dates and other verifiable information. Skilled interviewers will also ask candidates for their thoughts or feelings about a situation to gain further insight.

- Give me an example of when you were forced to change priorities or direction.
    - How did you feel when you were first confronted with this change?
    - Describe a time when there was an extraordinary amount of activity at work.
    - How did you handle it?
    - Describe a situation when you were the author or architect of a change.
    - What were the barriers to implementing the change and how did you get beyond them?
    - How did you get buy-in from others?
    - What was the outcome?
    - Give me an example of when you were one of the first to get on board when a major change was introduced.
    - Describe a situation when you were given special recognition or acknowledgment for your ability to adapt quickly to a change.

11. GOAL ORIENTATION: Energetically focusing efforts on meeting a goal, mission or objective.

Listen for determination, persistence and a "never-give-up" attitude in efforts to meet goals. Be sure to probe for as many details and specifics as possible such as names, dates and other verifiable information. Skilled interviewers will also ask candidates for their thoughts or feelings about a situation to gain further insight.

- Give me an example of the most significant professional goal you have met.
    - How did you achieve it?
    - What were the obstacles?
    - How did you overcome them?
    - Give me an example of when you took a risk to achieve a goal.
    - What was the outcome?
    - What are your future professional goals?
    - How do you plan to achieve them?
    - What might keep you from achieving them?
    - Tell me about a time when you overcame great obstacles to achieve something significant.
    - Give me an example of when you achieved something by your persistence that others couldn't.

Fig. 6U

BEHAVIORAL INTERVIEW QUESTIONS

12. PLANNING/ORGANIZING: Utilizing logical, systematic and orderly procedures to meet objectives.

Listen for logical, organized and systematic approaches. Be sure to probe for as many details and specifics as possible such as names, dates and other verifiable information. Skilled interviewers will also ask candidates for their thoughts or feelings about a situation to gain further insight.

- Describe the most complex assignment or project you've worked on.
    - What actions did you take to start the assignment or project?
    - What were the most challenging aspects of the assignment or project?
    - How did you determine what steps needed to be taken to complete it?
    - How did you determine what resources were needed?
    - What obstacles did you encounter that you didn't anticipate?
    - What could you have done differently?
    - Describe a situation when your planning and preparation was a major factor in the success of a project. Describe a work situation where your lack of planning and organizing had a negative effect.
    - Give me an example of when you were given special recognition or acknowledgment for your attention to detail.

13. DIPLOMACY: Effectively handling difficult or sensitive issues by utilizing tact, diplomacy and an understanding of organizational culture, climate and/or politics.

Listen for insight, sensitivity and wisdom in handling issues associated with organizational culture, climate and politics. Be sure to probe for as many details and specifics as possible such as names, dates and other verifiable information. Skilled interviewers will also ask candidates for their thoughts or feelings about a situation to gain further insight.

- Describe a situation when politics played a major role in your career.
    - Who were the key players?
    - How did you know who the key players were?
    - What part did they play in the situation?
    - What was the outcome?
    - Give me an example of when you used tact and diplomacy effectively.
    - Describe a situation when politics negatively affected your career.
    - What, if anything, would you do differently?
    - Describe a situation when your sense of what was "politically correct" proved to be an asset.
    - Give me an example of when you were given special recognition or acknowledgment for handling a sensitive organizational issue effectively.

Fig. 6V

BEHAVIORAL INTERVIEW QUESTIONS

- Describe a situation when you gave someone good advice on how to handle a politically sensitive issue.

14. PERSONAL EFFECTIVENESS: Demonstrating initiative, self confidence, resiliency and a willingness to take responsibility for personal actions.

Listen for a strong sense of self, personal responsibility, courage and resilience. Be sure to probe for as many details and specifics as possible such as names, dates and other verifiable information. Skilled interviewers will also ask candidate for their thoughts or feelings about a situation to gain further insight.

- What do you think has enabled you to meet your goals?
- Give me an example of when you were able to accomplish something others didn't believe you could.
- Why were you able to accomplish it despite the negative opinions of others?
- Describe a time when all indications were that you probably would fail but you still didn't give up.
- What were your feelings during this time?
- Describe a situation when you failed to achieve a professional goal.
- How did you handle it?
- What happened next?
- Describe the lowest point in your career.
- How did you get beyond that point and go forward?

15. PRESENTING: Communicating effectively to groups.

Listen for positive audience feedback. Be sure to probe for as many details and specifics as possible such as names, dates and other verifiable information. Skilled interviewers will also ask candidates for their thoughts or feelings about a situation to gain further insight.

- Describe a situation when you had to give a presentation to a group of people you had never met.
- What did you do prepare for the presentation?
- What were the objectives of the presentation?
- What was the feedback from the audience on the presentation?
- Give me an example of a particularly effective presentation you gave.
- What made it effective?
- Give me an example of a time when your presentation was criticized.
- What changes did you make, if any, based on that feedback?
- What have you done to develop your presentation skills?
- Give me an example of when you gave such a powerful presentation that the same group wanted you to give another presentation.

Fig. 6W

BEHAVIORAL INTERVIEW QUESTIONS

- Describe a situation when you were given special recognition or acknowledgment for delivering an excellent presentation.

16. MANAGEMENT: Achieving extraordinary results through effective management of resources, systems and processes.

Listen for shrewd business sense, understanding of operational issues and an ability to improve the bottom line. Be sure to probe for as many details and specifics as possible such as names, dates and other verifiable information. Skilled interviewers will also ask candidates for their thoughts or feelings about a situation to gain further insight.

- Describe the largest budget you've ever developed and had responsibility for managing.
    - What process did you use to develop it?
    - Give me an example of when you exceeded your budget, what caused the overage and what you did, if anything, to remedy the situation.
    - Give me an example of when you had a quality problem and what you did to resolve it.
    - Give me an example of when you were able to turn an organization around financially.
    - Describe a time when you were able to achieve extraordinary results by effectively managing resources, systems or procedures.
    - Tell me about how you handled a situation when you had to choose between the bottom line and making people happy.
    - Give me an example of when you took a significant risk for the sake of a principle, value or mission?
    - Describe a situation when you had to hold people accountable for results.
    - Give me an example of how you removed a significant barrier in order to meet objectives.
    - Describe a situation when others believed you had set the standard too high but you continued to push them to achieve the goal.

17. NEGOTIATION: Facilitating agreements between two or more parties.

Listen for seasoned expertise in negotiating "win-win" agreements. Be sure to probe for as many details and specifics as possible such as names, dates and other verifiable information. Skilled interviewers will also ask candidates for their thoughts or feelings about a situation to gain further insight.

- Give me an example of when you were able to facilitate a "win-win" agreement between two or more adversarial parties.
    - How did you use to get them to agree?
    - What were the obstacles?
    - How did you get over them?

Fig. 6X

BEHAVIORAL INTERVIEW QUESTIONS

- What was the outcome?
- Give me an example of when you were unable to facilitate a "win-win" agreement.
- What factors hindered the agreement?
- What, if anything, would you do differently?
- Describe a situation when you had to negotiate an agreement with someone who took an unreasonable position.
- What did you do to bring them closer to agreement?
- Give me an example of when you played a key role in negotiating a significant contract or agreement.
- What steps have you taken to improve your ability to negotiate?

18. PERSUASION: Convincing others to change the way they think, believe or behave.
    Listen for the expert utilization of various influencing strategies to obtain compliance. Be sure to probe for as many details and specifics as possible such as names, dates and other verifiable information. Skilled interviewers will also ask candidates for their thoughts or feelings about a situation to gain further insight.

- Describe a situation where you were able to convince others to your way of thinking.
    - How did you do it?
    - Describe a situation when the only way you could accomplish a goal was to get buy-in from others.
    - What obstacles did you have in obtaining their buy-in?
    - How did you overcome them?
    - What was the outcome?
    - Give me an example of when you were able to facilitate a dramatic shift in the thinking, actions or beliefs of others.
    - What techniques or methods did you use?
    - Give me an example of a situation when you were given special recognition or acknowledgment for your ability to get others to say yes.
    - Describe a situation when you accomplished something significant as a result of your persuasive ability.

19. EMPATHY: Identifying with and caring about others.
    Listen for genuine caring, compassion and initiative in assisting others without expectations of rewards. Be sure to probe for as many details and specifics as possible such as names, dates and other verifiable information. Skilled interviewers will also ask candidates for their thoughts or feelings about a situation to gain further insight.

- Give me an example of when you identified with someone else's difficulties at work.

Fig 6Y

BEHAVIORAL INTERVIEW QUESTIONS

- What, if anything, did you do to help them?
- Give me an example of a time when a company policy or action hurt people.
- What, if anything did you do to mitigate the negative consequences to people?
- Give me an example of when you went out of your way to help someone.
- What were your thoughts and feeling about that situation?
- Give me an example of when you had to make a decision in favor of your own self-interest or someone else's.
- What were your thoughts and feelings?
- What did you do?
- What positive contributions have you made to your community or society?
- Give me an example of when you were given special recognition or acknowledgment for your contributions to the disadvantaged.
- Describe a situation when you were criticized for being too concerned about the difficulties of others.

20. CONTINUOUS LEARNING: Taking initiative in learning and implementing new concepts, technologies and/or methods.

Listen for positive attitude towards self-improvement, learning and the application of knowledge. Be sure to probe for as many details and specifics as possible such as names, dates and other verifiable information. Skilled interviewers will also ask candidates for their thoughts or feelings about a situation to gain further insight.

- How do you keep current on what's going on in your field?
- What books and magazines you have read or classes you have taken to keep abreast of what's new in your field?
- What was the last book you read?
- What learning activities have you been involved with since College/High School?
- Give me an example of when you were able to apply a concept, theory or knowledge to a work problem or situation.
- Describe how something you learned made a significant difference in your career.
- Give me an example of when you did not know enough about something to be effective.
- What did you do about it?
- In what ways have you invested in yourself to improve your performance?
- What self-improvement activities are you currently involved in?
- Give me an example that illustrates how other people have used you as a resource for knowledge in your field.
- What do you want to learn before you die?

Fig. 6Z

BEHAVIORAL INTERVIEW QUESTIONS

21. FUTURISTIC THINKING: Imagining, envisioning, projecting and/or predicting what has not yet been realized.

Listen for optimism, predictions and a commitment to future possibilities. Be sure to probe for as many details and specifics as possible such as names, dates and other verifiable information. Skilled interviewers will also ask candidates for their thoughts or feelings about a situation to gain further insight.

- Describe a situation when you were correct in seeing a future trend that others didn't.
    - What reaction did you have to those who did not see the trend?
    - Give me an example of when you predicted something that would happen in your department, organization or industry.
    - What caused you to make that prediction?
    - What was the most "far-out" concept you've ever had or supported?
    - Why did you believe in it?
    - What was the outcome?
    - What, in your opinion, are the trends or events that will impact this organization and its industry?
    - Give me an example of an idea you had that others thought was too far out but has since proved to be visionary.
    - Describe a situation when you maintained your commitment to a futuristic idea or venture even though others predicted failure.

22. DECISION MAKING: Utilizing effective processes to make decisions.

Listen for an ability to make timely decisions under difficult circumstances. Be sure to probe for as many details and specifics as possible such as names, dates and other verifiable information. Skilled interviewers will also ask candidates for their thoughts or feelings about a situation to gain further insight.

- Give me an example of when you had to make a quick decision when the risk of making an error was high.
    - What concerns did you have about your decision?
    - What was the outcome?
    - Describe how you handled a situation when a decision you made was challenged.
    - Give me an example of when you solved a particularly difficult problem when others couldn't.
    - What actions did you take to resolve the problem?
    - What made your solution work?
    - What kinds of problems have you been most successful at resolving?
    - What decision are you most proud of making?

Fig. 6AA

BEHAVIORAL INTERVIEW QUESTIONS

23. SELF MANAGEMENT: Demonstrating self control and an ability to manage time and priorities.

Listen for composure, assertiveness and emotional stability. Be sure to probe for as many details and specifics as possible such as names, dates and other verifiable information. Skilled interviewers will also ask candidates for their thoughts or feelings about a situation to gain further insight.

- Give me an example of when you were able to meet the personal and professional demands in your life yet still maintained a healthy balance.
   - Describe a situation when you had to exercise a significant amount of self control.
   - Describe a situation when you demonstrated initiative and took action without waiting for direction.
   - What was the outcome?
   - Give me an example of when your ability to manage your time and priorities proved to be an asset.
   - What have you done in the past that demonstrates your commitment to continuous improvement?
   - Give me an example of when you were responsible for an error or mistake.
   - What was the outcome?
   - What, if anything would you do differently?
   - Describe a time when you had to make a difficult choice between your personal and professional life.

Fig. 6BB

Performance DNA International, Ltd.
Position Report

A complete evaluation of the competencies necessary
to achieve superior performance in the position Auto Sales
Bonnstetter Auto

12/16/99

1046-2763

Prepared by Performance DNA International, Ltd.

Fig. 7A

INTRODUCTION

The purpose of this report is to provide insight into the most important performance criteria for the position. Managers or leaders are encouraged to discuss the results of the report with new hires and incumbents to enhance their understanding of performance expectations. The information in this report is particularly valuable to organizations in the following Human Resource activities:

- BUILDING COMPETENCY PROFILES OR MODELS
- DESIGNING PERFORMANCE EVALUATION PROCESSES
- ASSESSING TRAINING AND DEVELOPMENT NEEDS
- DEVELOPING COMPENSATION AND REWARD SYSTEMS
- DESIGNING SUCCESSION PLANNING PROCESSES
- DEVELOPING SELECTION SYSTEMS

Information in the report is based on an objective analysis of data collected from specially selected individuals who understand the position well. Report results reflect a summary of their responses to the Position Survey questionnaire. The report results are generated by a computer analysis of all responses. Hundreds of calculations are performed to determine the key performance criteria of the position. Where there were multiple respondent data, an average composite of all responses is provided.

Each section of the report is designed to address important aspects of the position. Clarity, understanding and consensus on what competencies are required for superior performance is essential to optimize selection, training and development, performance evaluation, rewards, recognition and succession planning programs. Read each section of the report carefully to gain insight into the most important position requirements.

Research indicates that a specific group of competencies are required to produce superior performance in most positions. This report provides detailed descriptions on seven (7) of the most important competencies required for superior performance in the position. Significant differences in respondent rankings of the competencies indicate a need for clarification. It is recommended that the results of the report be discussed with incumbents and management to obtain consensus before integrating the information into Human Resource processes.

The last section of the report provides samples of behavioral interview questions designed to assist hiring authorities to plan structured selection interviews. The questions provide a frame work for comparing candidate competency strengths with the competency requirements of the position. Select the questions that seem most appropriate to the position being analyzed.

Fig. 7B

SUGGESTIONS FOR IMPLEMENTING REPORT RESULTS

Before implementing the information in this report, it is recommended that the respondents meet to verify the results of the report. The hierarchy of competencies should not be accepted at face value as a competency model for the position. The hierarchical order of the competencies represents the relative importance of competencies in relationship to each other. Although competencies are shown in a hierarchy, several competencies may be relatively equal in importance.

Position reports on hundreds of positions confirms that it is more practical to eliminate the competencies that are not important for superior performance than to debate the precise order of the most important competencies. Based on the analysis of the responses to the questionnaire, the competencies noted with an asterisk have little or no importance in producing superior performance in the position. Therefore, they should not be emphasized in selection, training and development, performance evaluation, rewards, recognition or succession planning processes aimed at this position.

The data on hundreds of positions also confirms that differences in respondent rankings of competencies are common. The information in this report is designed to highlight both the differences as well as the similarities between respondent rankings of competencies.

Differences in competency rankings can be attributed to a number of factors. Some respondents may be high performing incumbents with a thorough understanding of the position, while others may be new to the position.

In some cases, respondents will have a different perspective of the importance of competencies by virtue of their unique relationship to the position. For example, a customer of the position may have a tendency to weight the customer service competency over others.

In cases where a position is being impacted by significant change, the difference in perspectives provides a valuable framework for respondents to create the new behavioral blueprint for success together. Working through the results of the report together, respondents can achieve a new level of understanding about how the demonstration of specific behaviors contributes to the fulfillment of the most important accountabilities and responsibilities in the position.

Fig. 7C

HIERARCHY OF COMPETENCIES

*The competencies required for superior performance have been prioritized based on the analysis of responses to the questionnaire. Where there were multiple respondents to the questionnaire, the list represents a composite average of all responses. The hierarchical order of the competencies represents their relative importance to each other in producing superior performance in the position.*

|   | HIERARCHY OF COMPETENCIES |
|---|---|
| 1. | Customer Service ✓ |
| 2. | Persuasion ✓ |
| 3. | Interpersonal skills ✓ |
| 4. | Goal orientation ✓ |
| 5. | Creativity/Innovation ✓ |
| 6. | Self Management ✓ |
| 7. | Diplomacy |
| 8. | Written Communication |
| 9. | Continuous Learning ✓ |
| 10. | Presenting |
| 11. | Flexibility ✓ |
| 12. | Teamwork ✓ |
| 13. | Problem Solving ✓ |
| 14. | Empathy ✓ |
| 15. | Futuristic Thinking ✓ |
| 16. | Negotiation |
| 17. | Personal Effectiveness ✓ |
| 18. | Planning/Organizing ✓ |
| 19. | Management ✓ |
| 20. | Conflict Management |
| 21. | Decision Making ✓ |
| 22. | Leadership ✓ |
| 23. | Employee Development/Coaching |

 Very Important     Important    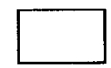 Not Important

Fig. 7D

Distribution of Competency Rankings

*The distribution of competency rankings illustrates individual differences in responses from multiple respondents to the questionnaire. The hierarchical listing of competencies on the left side of the chart represents the composite ranking of all respondents on each competency. The right side of the chart lists the competency rankings of each individual respondent.*

|     | HIERARCHY OF COMPETENCIES | R1 | R2 |
|-----|---------------------------|----|----|
| 1.  | Customer Service          | 1  | 1  |
| 2.  | Persuasion                | 3  | 4  |
| 3.  | Interpersonal Skills      | 2  | 5  |
| 4.  | Goal Orientation          | 6  | 2  |
| 5.  | Creativity/Innovation     | 5  | 6  |
| 6.  | Self Management           | 11 | 3  |
| 7.  | Diplomacy                 | 8  | 9  |
| 8.  | Written Communication     | 10 | 7  |
| 9.  | Continuous Learning       | 4  | 14 |
| 10. | Presenting                | 9  | 10 |
| 11. | Flexibility               | 7  | 13 |
| 12. | Teamwork                  | 13 | 11 |
| 13. | Problem Solving           | 17 | 8  |
| 14. | Empathy                   | 12 | 17 |
| 15. | Futuristic Thinking       | 15 | 15 |
| 16. | Negotiation               | 14 | 16 |
| 17. | Personal Effectiveness    | 16 | 18 |
| 18. | Planning/Organizing       | 22 | 12 |
| 19. | Management                | 19 | 20 |
| 20. | Conflict Management       | 18 | 22 |
| 21. | Decision Making           | 21 | 19 |
| 22. | Leadership                | 20 | 21 |
| 23. | Employee Development/Coaching | 23 | 23 |

 Very Important      Important      Not Important

Note: Based on the analysis of the responses to the questionnaire, the order of the competencies indicates three levels of importance shown by the average of the group as well as individual rankings. Competencies that are not important should not be emphasized in selection, training and development, performance evaluation, rewards, recognition or succession planning processes aimed at this position. Significant differences between respondents' rankings may indicate a need for clarification.

Fig. 7E

Key Characteristics of the Position

*The position has been analyzed relative to four key characteristics. These characteristics are accountability for results, results through people, authority and risk. Based on the responses to the questionnaire, these characteristics have been measured on a sliding scale and are illustrated by a bar graph. The scale range includes none, slight, moderate, significant and major.*

Accountability For Results: This characteristic addresses the accountability for producing measurable results in the position. This includes accountability for meeting financial, operations and/or system objectives.

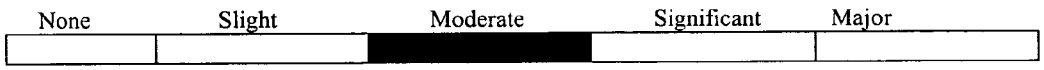

Results through People: This characteristic addresses the emphasis on producing results through the efforts and cooperation of people. This characteristic is not limited to management or leadership positions. Many non-management or leadership positions in team-based organizational structures depend heavily upon the efforts and cooperation of people to produce results.

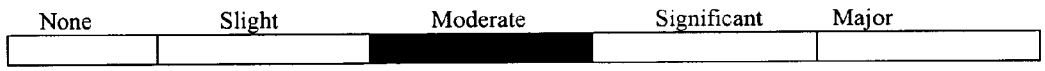

Authority: This characteristic addresses the level of authority that exists in the position. Evidence of authority can be found in the ability to make decisions or changes without prior approval from upper management. This characteristic is not limited to management or leadership positions. In their efforts to become more responsive, many large organizations are finding it necessary to drive decision-making downward. In these organizations, many positions can be characterized by a moderate to significant amount of authority but are not considered management or leadership.

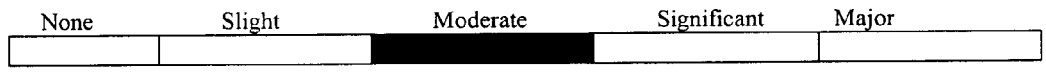

Risks: This characteristic addresses the inherent level of business risk or liability to the organization that exists in the position. Positions with indications of moderate, significant or major levels of inherent risk or liability to the organization may warrant the use of drug, alcohol and/or other appropriate assessments in their selection and management systems.

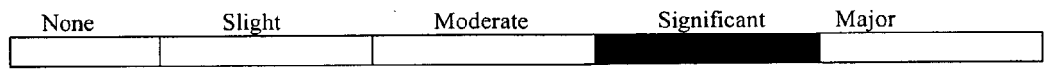

Fig. 7F

SUMMARY OF TOP COMPETENCIES

*This report focuses on soft skill competencies because they are usually more difficult to identify or assess than technical competencies or experience. Observing the behaviors people use to produce superior performance can provide insight into the demonstration of competencies. Seven (7) of the most important competencies required to produce superior performance are described below in terms of observable behaviors. The behaviors listed below each competency provide examples of some of the ways the competency is demonstrated. Read each behavior and check the ones that must be demonstrated to produce superior performance in the position. More importance is typically placed on those behaviors that must be demonstrated consistently on a daily, weekly or monthly basis.*

1. CUSTOMER SERVICE: Anticipating, meeting and/ or exceeding customer needs, wants and expectations.

- Strives to anticipate, identify and understand customers' wants, needs and concerns.
   - Responds to customers with a sense of urgency.
   - Follows through on customer requests.
   - Is patient and courteous with customers.
   - Resolves issues and complaints to the satisfaction of customers.
   - Expends extraordinary effort to satisfy customers.
   - Develops relationships with customers.
   - Partners with customers to assist them in achieving their objectives.
   - Acts as an advocate for customers' needs.
   - Takes professional risks for the sake of customers' needs.

2. PERSUASION: Convincing others to change the way they think, believe or behave.

- Utilizes the knowledge of other's needs, wants, beliefs, attitudes and behavior to promote a concept, product or service.
   - Builds trust and credibility before attempting to promote concepts, products or services.
   - Understands and utilizes compliance-producing behaviors to influence others such as authority, being likable, proof of the prior compliance of others, limited availability, sampling or giving something away to create a sense of obligation.
   - Uses logic and reason to develop rational arguments that challenge current assumptions, attitudes, beliefs and behavior.
   - Identifies and addresses the social, emotional, economic and practical barriers that prevent people from complying.
   - Adapts techniques and approaches to the needs and wants of those being influenced.

Fig. 7G

SUMMARY OF TOP COMPETENCIES

3. INTERPERSONAL SKILLS: Effectively communicating, building rapport and relating well to all kinds of people.

- Strives for self-awareness.
   - Demonstrates sincere interest in others.
   - Treats all people with respect, courtesy and consideration.
   - Respects differences in the attitudes and perspectives of others.
   - Listens, observes and strives to gain understanding of others.
   - Communicates effectively.
   - Sensitive to diversity issues.
   - Develops and maintains relationships with many different kinds of people regardless of cultural differences.

4. GOAL ORIENTATION: Energetically focusing efforts on meeting a goal, mission or objective.

- Acts independently to achieve objectives without supervision.
   - Expends the necessary time and effort to achieve goals.
   - Recognizes and acts on opportunities to advance progress towards meeting goals.
   - Establishes and works toward ambitious and challenging goals.
   - Develops and implements strategies to meet objectives.
   - Measures effectiveness and performance to ensure results are attained.
   - Acts with a sense of urgency to achieve goals.
   - Demonstrates persistence in overcoming obstacles to meet objectives.
   - Takes calculated risks to achieve results.

5. CREATIVITY/INNOVATION: Adapting traditional or devising new approaches, concepts, methods, models, designs, processes, technologies and/or systems.

- Notices unique patterns, variables, processes, systems or relationships.
   - Expresses non-traditional perspectives and/or novel approaches.
   - Synthesizes and/or simplifies data, ideas, models, processes or systems.
   - Challenges established theories, methods and/or protocols.
   - Encourages and promotes creativity and innovation.
   - Modifies existing concepts, methods, models, designs, processes, technologies and systems.
   - Develops and tests new theories to explain or resolve complex issues.
   - Applies unorthodox theories and/or methods.
   - Imagines new or revolutionary concepts, methods, models, designs, processes, technology, systems, products, services or industries.

Fig. 7H

SUMMARY OF TOP COMPETENCIES

6. SELF MANAGEMENT: Demonstrating self control and an ability to manage time and priorities.

- Effectively manages emotions and impulses.
    - Effectively manages time and priorities to meet deadlines.
    - Presents self assertively.
    - Demonstrates an ability to maintain composure in the midst of crisis.
    - Strives for continuous improvement.
    - Balances personal and professional life.
    - Takes initiative and acts without waiting for direction.
    - Accepts responsibility for actions and results.

7. DIPLOMACY: Effectively handling difficult or sensitive issues by utilizing tact, diplomacy and an understanding of organizational culture, climate and/or politics.

- Effectively utilizes tact and diplomacy in working with people across hierarchical, functional and/or cultural borders.
    - Understands cultural, climate and organizational issues.
    - Adapts conduct and communications to "politically correct" standards.
    - Effectively leverages networks of influence to get things done.
    - Is sensitive to the needs of "special interest" groups within organizations.
    - Builds relationships and networks with key people of influence.
    - Provides advice, counsel and mentoring on organizational issues.
    - Utilizes both formal and informal networks internally to obtain support and achieve results.
    - Utilizes both formal and informal networks externally to obtain support and achieve results.

Fig. 7I

BEHAVIORAL INTERVIEW QUESTIONS

Studies show that traditional interviewing methods are less than 14% accurate in predicting performance. Properly conducted structured interviewing techniques focused on assessing the competencies most important for superior performance in a position can significantly improve accuracy over traditional interviewing methods.

Behavioral interviewing is a disciplined approach that has been used effectively by corporate America since the 1970s. Behavioral interviewing is based on the premise that past behavior is the best predictor of future behavior. Behavioral interview questions ask for specific examples and experiences from the candidate's past. Interviewers can determine whether or not candidates have actually demonstrated the required competencies by the examples they use.

To plan a structured or behavioral interview, start by reviewing the job description to clarify the most important accountabilities of the position. Then review the list of top seven competencies and determine their relative importance as selection criteria according to which ones are necessary to produce the most important results of the position. Next, review the suggestions for behavioral interview questions and select the ones that seem most appropriate for the position.

The suggested behavioral interview questions relate specifically to the top seven (7) competencies. For most positions, additional questions will need to be developed. Since technical competencies are not a part of the Position Survey, questions relative to technical competencies are not provided in this report. The technical competencies required for superior performance in positions will need to be identified and addressed in selection interviews. A complete interview plan includes the development of appropriate behavioral interview questions relating to both soft skill and technical competencies.

The manual provides a suggested methodology for evaluating candidates by weighing the competencies according to their importance, developing benchmarks for evaluating competency levels and a standardized candidate rating scale. Regardless of the interviewing, evaluation and selection methodologies an organization uses, the same process should be consistently applied with each and every candidate.

Fig. 7J

BEHAVIORAL INTERVIEW QUESTIONS

1. CUSTOMER SERVICE: Anticipating, meeting and/or exceeding customer needs, wants and expectations.

Listen for extraordinary effort in responding to customer needs and wants to insure satisfaction. Be sure to probe for as many details and specifics as possible such as names, dates and other verifiable information. Skilled interviewers will also ask candidates for their thoughts or feelings about a situation to gain further insight.

- Give me an example of when you went out of your way for a customer.
- What was the outcome?
- Describe the most difficult customer you've ever had to deal with and how you handled them.
- Describe a situation when you were given outstanding customer service
- What made it stand out?
- Describe a situation when you felt a particularly demanding customer may have been trying to take advantage of you or the organization.
- What was the outcome?
- Give me an example of a situation where you improved the level of customer service in your organization.
- What did you do to improve it?
- What was the outcome?
- Give me an example of when you were given special recognition or acknowledgment for going the extra mile to satisfy a customer.
- Question: Describe a situation when you took a stand for a customer.

2. PERSUASION: Convincing others to change the way they think, believe or behave.

Listen for the expert utilization of various influencing strategies to obtain compliance. Be sure to probe for as many details and specifics as possible such as names, dates and other verifiable information. Skilled interviewers will also ask candidates for their thoughts or feelings about a situation to gain further insight.

- Describe a situation where you were able to convince others to your way of thinking.
- How did you do it?
- Describe a situation when the only way you could accomplish a goal was to get buy-in from others.
- What obstacles did you have in obtaining their buy-in?
- How did you overcome them?
- What was the outcome?
- Give me an example of when you were able to facilitate a dramatic shift in the thinking, actions or beliefs of others.
- What techniques or methods did you use?
- Give me an example of a situation when you were given special recognition or acknowledgment for your ability to get others to say yes.

Fig. 7K

BEHAVIORAL INTERVIEW QUESTIONS

- Describe a situation when you accomplished something significant as a result of your persuasive ability.

3. INTERPERSONAL SKILLS: Effectively communicating, building rapport and relating well to all kinds of people.

Listen for self awareness, understanding and an ability to communicate effectively with others regardless of differences. Be sure to probe for as many details and specifics as possible such as names, dates and other verifiable information. Skilled interviewers will also ask candidates for their thoughts or feelings about a situation to gain further insight.

- Describe the most difficult working relationship you've had with an individual.
- What specific actions did you take to improve the relationship?
- What was the outcome?
- Describe the types of people you get along with best and why.
- Describe the types of people you have difficulty getting along with and why.
- Give me an example of a situation when you demonstrated sensitivity to diversity issues.
- Describe a situation when you were able to strengthen a relationship by communicating effectively.
- What made your communication effective?
- Describe your relationship with the people you work with.
- What have you done in the past to build rapport and relationship with people?
- Give me an example of your ability to communicate effectively and build relationships with people regardless of cultural differences.
- Describe how your ability to communicate effectively and build relationships with many different types of people has contributed to one of your greatest accomplishments.

4. GOAL ORIENTATION: Energetically focusing efforts on meeting a goal, mission or objective.

Listen for determination, persistence and a "never-give-up" attitude in efforts to meet goals. Be sure to probe for as many details and specifics as possible such as names, dates and other verifiable information. Skilled interviewers will also ask candidates for their thoughts or feelings about a situation to gain further insight.

- Give me an example of the most significant professional goal you have met.
- How did you achieve it?
- What were the obstacles?
- How did you overcome them?
- Give me an example of when you took a risk to achieve a goal.
- What was the outcome?

Fig. 7L

BEHAVIORAL INTERVIEW QUESTIONS

- What are your future professional goals?
- How do you plan to achieve them?
- What might keep you from achieving them?
- Tell me about a time when you overcame great obstacles to achieve something significant.
- Give me an example of when you achieved something by your persistence that others couldn't.

5. CREATIVITY/INNOVATION: Adapting traditional or devising new approaches, concepts, methods, models, designs, processes, technologies and/or systems.

Listen for "out-of-the-box" thinking and unusual approaches. Be sure to probe for as many details and specifics as possible such as names, dates and other verifiable information. Skilled interviewers will also ask candidates for their thoughts or feelings about a situation to gain further insight.

- Describe a work situation when you adapted a concept, design, process or system to meet a need.
- How did you go about it?
- Describe a work situation when you took an unusual or non-traditional approach to get results.
- What made your approach so unusual?
- Why did you take that approach?
- How did others respond to your approach?
- What was the outcome?
- What, if anything, would you do differently?
- Give me an example of when you were given special recognition for a new idea, method or process that improved results.

6. SELF MANAGEMENT: Demonstrating self control and an ability to manage time and priorities.

Listen for composure, assertiveness and emotional stability. Be sure to probe for as many details and specifics as possible such as names, dates and other verifiable information. Skilled interviewers will also ask candidates for their thoughts or feelings about a situation to gain further insight.

- Give me an example of when you were able to meet the personal and professional demands in your life yet still maintained a healthy balance.
- Describe a situation when you had to exercise a significant amount of self control.
- Describe a situation when you demonstrated initiative and took action without waiting for direction.

Fig. 7M

BEHAVIORAL INTERVIEW QUESTIONS

- What was the outcome?
- Give me an example of when your ability to manage your time and priorities proved to be an asset.
- What have you done in the past that demonstrates your commitment to continuous improvement?
- Give me an example of when you were responsible for an error or mistake.
- What was the outcome?
- What, if anything would you do differently?
- Describe a time when you had to make a difficult choice between your personal and professional life.

7. DIPLOMACY: Effectively handling difficult or sensitive issues by utilizing tact, diplomacy and an understanding of organizational culture, climate and/or politics.

Listen for insight, sensitivity and wisdom in handling issues associated with organizational culture, climate and politics. Be sure to probe for as many details and specifics as possible such as names, dates and other verifiable information. Skilled interviewers will also ask candidates for their thoughts or feelings about a situation to gain further insight.

- Describe a situation when politics played a major role in your career.
- Who were the key players?
- How did you know who the key players were?
- What part did they play in the situation?
- What was the outcome?
- Give me an example of when you used tact and diplomacy effectively.
- Describe a situation when politics negatively affected your career.
- What, if anything, would you do differently?
- Describe a situation when your sense of what was "politically correct" proved to be an asset.
- Give me an example of when you were given special recognition or acknowledgment for handling a sensitive organizational issue effectively.
- Describe a situation when you gave someone good advice on how to handle a politically sensitive issue.

Fig. 7N

Performance DNA International, Ltd.
Position Report

A complete evaluation of the competencies necessary
to achieve superior performance in the position VP Marketing
Target Training International

12/21/99

1050-2315

Prepared by Performance DNA International, Ltd.

Fig. 8A

INTRODUCTION

The purpose of this report is to provide insight into the most important performance criteria for the position. Managers or leaders are encouraged to discuss the results of the report with new hires and incumbents to enhance their understanding of performance expectations. The information in this report is particularly valuable to organizations in the following Human Resources activities:

- BUILDING COMPETENCY PROFILES OR MODELS
- DESIGNING PERFORMANCE EVALUATION PROCESSES
- ASSESSING TRAINING AND DEVELOPMENT NEEDS
- DEVELOPING COMPENSATION AND REWARD SYSTEMS
- DESIGNING SUCCESSION PLANNING PROCESSES
- DEVELOPING SELECTION SYSTEMS

Information in the report is based on an objective analysis of data collected from specially selected individuals who understand the position well. Report results reflect a summary of their responses to the Position Survey questionnaire. The report results are generated by a computer analysis of all responses. Hundreds of calculations are performed to determine the key performance criteria of the position. Where there were multiple respondent data, an average composite of all responses is provided.

Each section of the report is designed to address important aspects of the position. Clarity, understanding and consensus on what competencies are required for superior performance is essential to optimize selection, training and development, performance evaluation, rewards, recognition and succession planning programs. Read each section of the report carefully to gain insight into the most important position requirements.

Research indicates that a specific group of competencies are required to produce superior performance in most positions. This report provides detailed descriptions on seven (7) of the most important competencies required for superior performance in the position. Significant differences in respondent rankings of the competencies indicate a need for clarification. It is recommended that the results of the report be discussed with incumbents and management to obtain consensus before integrating the information into Human Resource processes.

The last section of the report provides samples of behavioral interview questions designed to assist hiring authorities to plan structured selection interviews. The questions provide a framework for comparing candidate competency strengths with the competency requirements of the position. Select the questions that seem most appropriate to the position being analyzed.

Fig. 8B

HIERARCHY OF COMPETENCIES

The competencies required for superior performance have been prioritized based on the analysis of responses to the questionnaire. Where there were multiple respondents to the questionnaire, the list represents a composite average of all responses. The hierarchical order of the competencies represents their relative importance to each other in producing superior performance in the position.

|     | HIERARCHY OF COMPETENCIES |
| --- | --- |
| 1.  | Self Management |
| 2.  | Employee Development/Coaching |
| 3.  | Customer Service |
| 4.  | Teamwork |
| 5.  | Leadership |
| 6.  | Personal Effectiveness |
| 7.  | Planning/Organizing |
| 8.  | Interpersonal Skills |
| 9.  | Goal Orientation |
| 10. | Diplomacy |
| 11. | Management |
| 12. | Negotiation |
| 13. | Presenting |
| 14. | Empathy |
| 15. | Decision Making |
| 16. | Persuasion |
| 17. | Problem Solving |
| 18. | Written Communication |
| 19. | Conflict Management |
| 20. | Futuristic Thinking |
| 21. | Flexibility |
| 22. | Creativity/Innovation |
| 23. | Continuous Learning |

 Very Important   Important   Not Important

Fig. 8C

SUGGESTIONS FOR IMPLEMENTING REPORT RESULTS

Before implementing the information in this report, it is recommended that the respondents meet to verify the results of the report. The hierarchy of competencies should not be accepted at face value as a competency model for the position. The hierarchical order of the competencies represents the relative importance of competencies in relationship to each other. Although competencies are shown in a hierarchy, several competencies may be relatively equal in importance.

Position reports on hundreds of positions confirms that it is more practical to eliminate the competencies that are not important for superior performance than to debate the precise order of the most important competencies. Based on the analysis of the responses to the questionnaire, the competencies noted with an asterisk have little or no importance in producing superior performance in the position. Therefore, they should not be emphasized in selection, training and development, performance evaluation, rewards, recognition or succession planning processes aimed at this position.

The data on hundreds of positions also confirms that differences in respondent rankings of competencies are common. The information in this report is designed to highlight both the differences as well as the similarities between respondent rankings of competencies.

Differences in competency rankings can be attributed to a number of factors. Some respondents may be high performing incumbents with a thorough understanding of the position, while others may be new to the position.

In some cases, respondents will have a different perspective of the importance of competencies by virtue of their unique relationship to the position. For example, a customer of the position may have a tendency to weight the customer service competency over others.

In cases where a position is being impacted by significant change, the difference in perspectives provides a valuable framework for respondents to create the new behavioral blueprint for success together. Working through the results of the report together, respondents can achieve a new level of understanding about how the demonstration of specific behaviors contributes to the fulfillment of the most important accountabilities and responsibilities in the position.

Fig. 8D

Distribution of Competency Rankings

*The distribution of competency rankings illustrates individual differences in responses from multiple respondents to the questionnaire. The hierarchical listing of competencies on the left side of the chart represents the composite rankings of all respondents on each competency. The right side of the chart lists the competency rankings of each individual respondent.*

|     | HIERARCHY OF COMPETENCIES | R1 | R2 | R3 | R4 | R5 |
|-----|---------------------------|----|----|----|----|----|
| 1.  | Self Management | 2 | 1 | 3 | 8 | 1 |
| 2.  | Employee Development/Coaching | 19 | 5 | 2 | 6 | 3 |
| 3.  | Customer Service | 13 | 4 | 1 | 10 | 13 |
| 4.  | Teamwork | 7 | 14 | 4 | 15 | 4 |
| 5.  | Leadership | 10 | 3 | 8 | 13 | 11 |
| 6.  | Personal Effectiveness | 6 | 8 | 15 | 4 | 14 |
| 7.  | Planning/Organizing | 18 | 7 | 9 | 17 | 2 |
| 8.  | Interpersonal Skills | 20 | 6 | 7 | 5 | 16 |
| 9.  | Goal Orientation | 5 | 19 | 6 | 16 | 9 |
| 10. | Diplomacy | 14 | 12 | 22 | 2 | 5 |
| 11. | Management | 15 | 2 | 10 | 13 | 15 |
| 12. | Negotiation | 9 | 16 | 18 | 12 | 7 |
| 13. | Presenting | 16 | 13 | 16 | 7 | 10 |
| 14. | Empathy | 23 | 9 | 12 | 9 | 12 |
| 15. | Decision Making | 11 | 10 | 21 | 19 | 8 |
| 16. | Persuasion | 21 | 22 | 5 | 1 | 20 |
| 17. | Problem Solving | 3 | 15 | 13 | 22 | 17 |
| 18. | Written Communication | 17 | 20 | 17 | 11 | 6 |
| 19. | Conflict Management | 22 | 11 | 23 | 3 | 19 |
| 20. | Futuristic Thinking | 8 | 17 | 11 | 20 | 23 |
| 21. | Flexibility | 1 | 18 | 20 | 23 | 21 |
| 22. | Creativity/Innovation | 4 | 23 | 14 | 21 | 22 |
| 23. | Continuous Learning | 12 | 21 | 19 | 14 | 18 |

■ Very Important    ▨ Important    □ Not Important

Note: Based on the analysis of the responses to the questionnaire, the order of the competencies indicates three levels of importance shown by the average of the group as well as individual rankings. Competencies that are not important should not be emphasized in selection, training and development, performance evaluation, rewards, recognition or succession planning processes aimed at this position. Significant differences between respondents' rankings may indicate a need for clarification.

Fig. 8E

Key Characteristics of the Position

*The position has been analyzed relative to four key characteristics. These characteristics are accountability for results, results through people, authority and risk. Based on the responses to the questionnaire, these characteristics have been measured on a sliding scale and are illustrated by a bar graph. The scale range includes none, slight, moderate, significant and major.*

Accountability For Results: This characteristic addresses the accountability for producing measurable results in the position. This includes accountability for meeting financial, operations and/or system objectives.

| None | Slight | Moderate | Significant | Major |
|------|--------|----------|-------------|-------|
|      |        |          |             | ■■■■■ |

Results through People: This characteristic addresses the emphasis on producing results through the efforts and cooperation of people. This characteristic is not limited to management or leadership positions. Many non-management or leadership positions in team-based organizational structures depend heavily upon the efforts and cooperation of people to produce results.

| None | Slight | Moderate | Significant | Major |
|------|--------|----------|-------------|-------|
|      |        |          |             | ■■■■■ |

Authority: This characteristic addresses the level of authority that exists in the position. Evidence of authority can be found in the ability to make decisions or changes without prior approval from upper management. This characteristic is not limited to management or leadership positions. In their efforts to become more responsive, many large organizations are finding it necessary to drive decision-making downward. In these organizations, many positions can be characterized by a moderate to significant amount of authority but are not considered management or leadership.

| None | Slight | Moderate | Significant | Major |
|------|--------|----------|-------------|-------|
|      |        |          |             | ■■■■■ |

Risks: This characteristic addresses the inherent level of business risk or liability to the organization that exists in the position. Positions with indications of moderate, significant or major levels of inherent risk or liability to the organization may warrant the use of drug, alcohol and/or other appropriate assessments in their selection and management systems.

| None | Slight | Moderate | Significant | Major |
|------|--------|----------|-------------|-------|
|      |        |          |             | ■■■■■ |

Fig. 8F

Work Environment

Behavior

*The following is a summary of how position requirements will best be met behaviorally based on the responses to the questionnaire. Describing the work environment in behavioral terms helps people to understand the type of behavior that is most likely to produce superior performance in the position. Aligning an employee's natural behavioral tendencies to the behavioral requirements of the position can create an optimum environment for superior performance.*

- Challenging the status quo.
- Innovative.
- Challenge-oriented.
- Forward-looking and future-oriented.
- Building confidence in others.
- Accomplishing goals through people.
- Creative problem solving.

Fig. 8G

Work Environment

Attitudes

*The following is a summary of the type of person whose interests, attitudes and/or motivations can be satisfied by the intrinsic rewards of the position, based on the responses to the questionnaire. Employees whose interests, attitude and/or motivations are met through their work naturally perform better than employees who find fulfillment outside of work.*

- Future-oriented.
- Goal oriented.
- Motivated by personal achievements and accomplishments.
- Motivated to achieve their maximum potential.
- Working to maintain balance and harmony in all areas of their life.
- Bottom-line-oriented.
- Concerned about personal image and the image of the company.

Fig. 8H

SUMMARY OF TOP COMPETENCIES

*This report focuses on soft skill competencies because they are usually more difficult to identify or assess than technical competencies or experience. Observing the behaviors people use to produce superior performance can provide insight into the demonstration of competencies. Seven (7) of the most important competencies required to produce superior performance are described below in terms of observable behaviors. The behaviors listed below each competency provide examples of some of the ways the competency is demonstrated. Read each behavior and check the ones that must be demonstrated to produce superior performance in the position. More importance is typically placed on those behaviors that must be demonstrated consistently on a daily, weekly or monthly basis.*

1. SELF MANAGEMENT: Demonstrating self control and an ability to manage time and priorities.

- Effectively manages emotions and impulses.
    - Effectively manages time and priorities to meet deadlines.
    - Presents self assertively.
    - Demonstrates an ability to maintain composure in the midst of crisis.
    - Strives for continuous improvement.
    - Balances personal and professional life.
    - Takes initiative and acts without waiting for direction.
    - Accepts responsibility for actions and results.

2. EMPLOYEE DEVELOPMENT/COACHING: Facilitating and supporting the professional growth of others.

- Expresses confidence in others' ability to perform.
    - Identifies developmental needs.
    - Encourages initiative and improvement.
    - Provides opportunities for training.
    - Gives new, difficult and/or challenging work assignments.
    - Acknowledges and praises improvements.
    - Trains, coaches and mentors others to develop.
    - Views mistakes as opportunities for learning.
    - Promotes learning and growth.

3. CUSTOMER SERVICE: Anticipating, meeting and/or exceeding customer needs, wants and expectations.

- Strives to anticipate, identify and understand customers' wants, needs and concerns.
    - Responds to customers with a sense of urgency.
    - Follows through on customer requests.
    - Is patient and courteous with customers.

Fig. 8I

SUMMARY OF TOP COMPETENCIES

- Resolves issues and complaints to the satisfaction of customers.
- Expends extraordinary effort to satisfy customers.
- Develops relationships with customers.
- Partners with customers to assist them in achieving their objectives.
- Acts as an advocate for customers' needs.
- Takes professional risks for the sake of customers' needs.

4. TEAMWORK: Working effectively and productively with others.

- Respects team members and their individual perspectives.
- Makes team mission and objectives a priority.
- Works towards consensus when team decisions are required.
- Meets agreed-upon deadlines on team assignments and commitments.
- Shares responsibility with team members for successes and failures.
- Keeps team members informed regarding projects.
- Supports team decisions.
- Recognizes and appreciates the contributions of team members.
- Behaves in a manner consistent with team values and mission.
- Provides constructive feedback to team and its members.
- Responds positively to feedback from team members.
- Raises and/or confronts issues limiting team effectiveness.

5. LEADERSHIP: Achieving extraordinary business results through people.

- Inspires others with compelling visions.
- Takes risks for the sake of principles, values or mission.
- Builds trust and demonstrates integrity with a noticeable congruence between words and actions (walk their talk).
- Demonstrates optimism and positive expectations of others.
- Delegates appropriate responsibilities and authority.
- Involves people in decisions that affect them.
- Addresses performance issues promptly, fairly and consistently.
- Adapts methods and approaches to the needs and motivations of others.
- Makes decisions to avoid or mitigate the negative consequences for people.
- Demonstrates loyalty to constituents.

Fig. 8J

SUMMARY OF TOP COMPETENCIES

6. PERSONAL EFFECTIVENESS: Demonstrating initiative, self confidence, resiliency and a willingness to take responsibility for personal actions.

- Possesses unwavering confidence and belief in personal capabilities.
    - Takes initiative and does what ever it takes to achieve goals
    - Projects confidence and self-assurance.
    - Bounces back after setbacks.
    - Asserts self in personal and professional life.
    - Admits mistakes and works to avoid repeating them.
    - Accepts personal responsibility for achieving personal and professional goals.
    - Functions effectively and achieves results even in adverse circumstances.

7. PLANNING/ORGANIZING: Utilizing logical, systematic and orderly procedures to meet objectives.

- Works effectively within established time frames and priorities.
    - Utilizes logical, practical and efficient approaches.
    - Prioritizes tasks for optimum productivity.
    - Develops procedures, processes and systems for order, accuracy, efficiency and productivity.
    - Anticipates probable effects, outcomes and risks.
    - Develops contingency plans to minimum waste, error and risk.
    - Allocates, adjusts and manages resources according to priorities.
    - Monitors implementation of plans and makes adjustments as needed.

Fig. 8K

BEHAVIORAL INTERVIEW QUESIONS

Studies show that traditional interviewing methods are less than 14% accurate in predicting performance. Properly conducted structured interviewing techniques focused on assessing the competencies most important for superior performance in a position can significantly improve accuracy over traditional interviewing methods.

Behavioral interviewing is a disciplined approach that has been used effectively by corporate America since the 1970s. Behavioral interviewing is based on the premise that past behavior is the best predictor of future behavior. Behavioral interview questions ask for specific examples and experiences from the candidate's past. Interviewers can determine whether or not candidates have actually demonstrated the required competencies by the examples they use.

To plan a structured or behavioral interview, start by reviewing the job description to clarify the most important accountabilities of the position. Then review the list of top seven competencies and determine their relative importance as selection criteria according to which ones are necessary to produce the most important results of the position. Next, review the suggestions for behavioral interview questions and select the ones that seem most appropriate for the position.

The suggested behavioral interview questions relate specifically to the top seven (7) competencies. For most positions, additional questions will need to be developed. Since technical competencies are not a part of the Position Survey, questions relative to technical competencies are not provided in this report. The technical competencies required for superior performance in positions will need to be identified and addressed in selection interviews. A complete interview plan includes the development of appropriate behavioral interview questions relating to both soft skill and technical competencies.

The manual provides a suggested methodology for evaluating candidates by weighting the competencies according to their importance, developing benchmarks for evaluating competency levels and a standardized candidate rating scale. Regardless of the interviewing, evaluation and selection methodologies an organization uses, the same process should be consistently applied with each and every candidate.

Fig. 8L

BEHAVIORAL INTERVIEW QUESTIONS

1. SELF MANAGEMENT: Demonstrating self control and an ability to manage time and priorities.

Listen for composure, assertiveness and emotional stability. Be sure to probe for as many details and specifics as possible such as names, dates and other verifiable information. Skilled interviewers will also ask candidates for their thoughts or feelings about a situation to gain further insight.

- Give me an example of when you were able to meet the personal and professional demands in your life yet still maintained a healthy balance.
   - Describe a situation when you had to exercise a significant amount of self control.
   - Describe a situation when you demonstrated initiative and took action without waiting for direction.
   - What was the outcome?
   - Give me an example of when your ability to manage your time and priorities proved to be an asset.
   - What have you done in the past that demonstrates your commitment to continuous improvement?
   - Give me an example of when you were responsible for an error or mistake.
   - What was the outcome?
   - What, if anything would you do differently?
   - Describe a time when you had to make a difficult choice between your personal and professional life.

2. EMPLOYEE DEVELOPMENT/COACHING: Facilitating and supporting the professional growth of others.

Listen for a belief in the potential of others and promoting of learning and development. Be sure to probe for as many details and specifics as possible such as names, dates and other verifiable information. Skilled interviewers will also ask candidates for their thoughts or feelings about a situation to gain further insight.

- Describe your personal experience with a mentor or coach.
   - What role have they played in your career development?
   - What training or development activities have you participated in over the last three years?
   - Give me an example of when your mentoring or coaching helped someone develop.
   - What process or approach did you take?
   - What, if any obstacles did you encounter?
   - How did you overcome them?
   - Describe a situation when you gave someone an assignment you knew would be a stretch for them.
   - What was the outcome?

Fig. 8M

BEHAVIORAL INTERVIEW QUESTIONS

- What influence or role have you had in advancing individual and organizational learning?
- Describe a situation when your personal learning and development objectives conflicted with business objectives?
- How did you resolve it?

3. CUSTOMER SERVICE: Anticipating, meeting and/or exceeding customer needs, wants and expectations.

Listen for extraordinary effort in responding to customer needs and wants to insure satisfaction. Be sure to probe for as many details and specifics as possible such as names, dates and other verifiable information. Skilled interviewers will also ask candidates for their thoughts or feelings about a situation to gain further insight.

- Give me an example of when you went out of your way for a customer.
    - What was the outcome?
    - Describe the most difficult customer you've ever had to deal with and how you handled them.
    - Describe a situation when you were given outstanding customer service.
    - What made it stand out?
    - Describe a situation when you felt a particularly demanding customer may have been trying to take advantage of you or the organization.
    - What was the outcome?
    - Give me an example of a situation where you improved the level of customer service in your organization.
    - What did you do to improve it?
    - What was the outcome?
    - Give me an example of when you were given special recognition or acknowledgment for going the extra mile to satisfy a customer.
    - Question: Describe a situation when you took a stand for a customer.

4. TEAMWORK: Working effectively and productively with others.

Listen for strong commitment and contributions to team members working towards a specific goal. Be sure to probe for as many details and specifics as possible such as names, dates and other verifiable information. Skilled interviewers will also ask candidates for their thoughts or feelings about a situation to gain future insight.

- Give me an example of one of the most significant contributions you made as a member of high performing team.
    - What, in your opinion, made it a high performing team?

Fig. 8N

BEHAVIORAL INTERVIEW QUESTIONS

- Describe how you felt about the contributions of the others on the team.
- Give me an example of a situation where you had difficulties with a team member.
- What, if anything, did you do to resolve the difficulties?
- Describe how you felt about a decision the team wanted to make that you didn't agree with.
- Describe a situation where the team was having trouble agreeing on a decision and what you did to facilitate consensus.
- Give me an example of when you were on a team that failed to meet its objectives.
- What could the team have done differently?

5. LEADERSHIP: Achieving extraordinary business results through people.

Listen for an ability to obtain the trust, commitment and motivation of others to achieve goals and objectives. Be sure to probe for as many details and specifics as possible such as names, dates and other verifiable information. Skilled interviewers will also ask candidates for their thoughts or feelings about a situation to gain further insight.

- If you have held a leadership position in the past, draw the organizational chart above and below your position to illustrate the scope of your leadership responsibilities.
   - Give me an example of when you inspired people with a vision.
   - Tell me about a time when you significantly improved the performance of a group of people who reported directly to you.
   - How did you motivate the top performers?
   - Did you use the same techniques with the poor performance?
   - If not, what did you do differently?
   - What actions did you take to improve poor performance?
   - Describe your leadership style.
   - Tell me about a situation when you were able to maintain the trust and commitment of people after making or implementing a decision that negatively impacted them.
   - Give me an example of when you took a significant risk for the sake of principles, values or mission?
   - Describe a situation when you failed to obtain the commitment, dedication and trust of others.
   - What, if anything, would you do differently?

6. PERSONAL EFFECTIVENESS: Demonstrating initiative, self confidence, resiliency and a willingness to take responsibility for personal actions.

Listen for a strong sense of self, personal responsibility, courage and resilience. Be sure to probe for as many details and specifics as possible such as names, dates and other verifiable information. Skilled interviewers will also ask candidates for their thoughts or feelings about a situation to gain further insight.

Fig. 80

BEHAVIORAL INTERVIEW QUESTIONS

- What do you think has enabled you to meet your goals?
- Give me an example of when you were able to accomplish something others didn't believe you could.
- Why were you able to accomplish it despite the negative opinions of others?
- Describe a time when all indications were that you probably would fail but you still didn't give up.
- What were your feelings during this time?
- Describe a situation when you failed to achieve a professional goal.
- How did you handle it?
- What happened next?
- Describe the lowest point in your career.
- How did you get beyond that point and go forward?

7. PLANNING/ORGANIZING: Utilizing logical, systematic and orderly procedures to meet objectives.

Listen for logical, organized and systematic approaches. Be sure to probe for as many details and specifics as possible such as names, dates and other verifiable information. Skilled interviewers will also ask candidates for their thoughts or feelings about a situation to gain further insight.

- Describe the most complex assignment or project you've worked on.
- What actions did you take to start the assignment or project?
- What were the most challenging aspects of the assignment or project?
- How did you determine what steps needed to be taken to complete it?
- How did you determine what resources were needed?
- What obstacles did you encounter that you didn't anticipate?
- What could you have done differently?
- Describe a situation when your planning and preparation was a major factor in the success of a project.
- Describe a work situation where your lack of planning and organizing had a negative effect.
- Give me an example of when you were given special recognition or acknowledgment for your attention to detail.

Fig. 8P

Performance DNA International, Ltd.
Position Report

A complete evaluation of the competencies necessary
to achieve superior performance in the position.

Programmer
Target Training International
Development

12/21/99

1048-1603

Prepared by performance DNA International, Ltd.

Fig. 9A

INTRODUCTION

The purpose of this report is to provide insight into the most important performance criteria for the position. Managers or leaders are encouraged to discuss the results of the report with new hires and incumbents to enhance their understanding of performance expectations. The information in this report is particularly valuable to organizations in the following Human Resource activities:

- BUILDING COMPETENCY PROFILES OR MODELS
- DESIGNING PERFORMANCE EVALUATION PROCESSES
- ASSESSING TRAINING AND DEVELOPMENT NEEDS
- DEVELOPING COMPENSATION AND REWARD SYSTEMS
- DESIGNING SUCCESSION PLANNING PROCESSES
- DEVELOPING SELECTION SYSTEMS

Information in the report is based on an objective analysis of data collected from specially selected individuals who understand the position well. Report results reflect a summary of their responses to the Position Survey questionnaire. The report results are generated by a computer analysis of all responses. Hundreds of calculations are performed to determine the key performance criteria of the position. Where there were multiple respondent data, an average composite of all responses is provided.

Each section of the report is designed to address important aspects of the position. Clarity, understanding and consensus on what competencies are required for superior performance is essential to optimize selection, training and development, performance evaluation, rewards, recognition and succession planning programs. Read each section of the report carefully to gain insight into the most important position requirements.

Research indicates that a specific group of competencies are required to produce superior performance in most positions. This report provides detailed descriptions on seven (7) of the most important competencies required for superior performance in the position. Significant differences in respondent rankings of the competencies indicate a need for clarification. It is recommended that the results of the report be discussed with incumbents and management to obtain consensus before integrating the information into Human Resource processes.

The last section of the report provides samples of behavioral interview questions designed to assist hiring authorities to plan structured selection interviews. The questions provide a frame work for comparing candidate competency strengths with the competency requirements of the position. Select the questions that seem most appropriate to the position being analyzed.

Fig. 9B

HIERARCHY OF COMPETENCIES

*The competencies required for superior performance have been prioritized based on the analysis of responses to the questionnaire. Where there were multiple respondents to the questionnaire, the list represents a composite average of all responses. The hierarchical order of the competencies represents their relative importance to each other in producing superior performance in the position.*

|    | HIERARCHY OF COMPETENCIES |
|----|---------------------------|
| 1  | Self Management |
| 2  | Problem Solving |
| 3  | Creativity/Innovation |
| 4  | Continuous Learning |
| 5  | Flexibility |
| 6  | Goal Orientation |
| 7  | Planning/Organizing |
| 8  | Interpersonal Skills |
| 9  | Teamwork |
| 10 | Personal effectiveness |
| 11 | Futuristic Thinking |
| 12 | Empathy |
| 13 | Written Communication |
| 14 | Decision Making |
| 15 | Employee Development/Coaching |
| 16 | Diplomacy |
| 17 | Conflict management |
| 18 | Negotiation |
| 19 | Presenting |
| 20 | Leadership |
| 22 | Management |
| 22 | Persuasion |
| 23 | Customer Service |

 Very Important     Important    Not Important

Fig. 9C

SUGGESTIONS FOR IMPLEMENTING REPORT RESULTS

Before implementing the information in this report, it is recommended that the respondents meet to verify the results of the report. The hierarchy of competencies should not be accepted at face value as a competency model for the position. The hierarchical order of the competencies represents the relative importance of competencies in relationship to each other. Although competencies are shown in a hierarchy, several competencies may be relatively equal in importance.

Position reports on hundreds of positions confirms that it is more practical to eliminate the competencies that are not important for superior performance than to debate the precise order of the most important competencies. Based on the analysis of the responses to the questionnaire, the competencies noted with an asterisk have little or no importance in producing superior performance in the position. Therefore, they should not be emphasized in selection, training and development, performance evaluation, rewards, recognition or succession planning processes aimed at this position.

The data on hundreds of positions also confirms that differences in respondent rankings of competencies are common. The information in this report is designed to highlight both the differences as well as the similarities between respondent rankings of competencies.

Differences in competency rankings can be attributed to a number of factors. Some respondents may be high performing incumbents with a thorough understanding of the position, while others may be new to the position.

In some cases, respondents will have a different perspective of the importance of competencies by virtue of their unique relationship to the position. For example, a customer of the position may have a tendency to weight the customer service competency over others.

In cases where a position is being impacted by significant change, the difference in perspectives provides a valuable framework for respondents to create the new behavioral blueprint for success together. Working through the results of the report together, respondents can achieve a new level of understanding about how the demonstration of specific behaviors contributes to the fulfillment of the most important accountabilities and responsibilities in the position.

Fig. 9D

Distribution of Competency Rankings

*The distribution of competency rankings illustrates differences in responses from multiple respondents to the questionnaire. The hierarchical listing of competencies on the left side of the chart represents the composite ranking of all respondents on each competency. The right side of the chart lists the competency rankings of each individual respondent.*

|    | HIERARCHY OF COMPETENCIES | R1 | R2 | R3 | R4 | R5 |
|----|----------------------------|----|----|----|----|----|
| 1  | Self Management            | 6  | 1  | 1  | 1  | 1  |
| 2  | Problem Solving            | 5  | 2  | 6  | 5  | 4  |
| 3  | Creativity/Innovation      | 3  | 3  | 3  | 6  | 9  |
| 4  | Continuous Learning        | 4  | 5  | 9  | 3  | 5  |
| 5  | Flexibility                | 1  | 6  | 11 | 2  | 3  |
| 6  | Goal Orientation           | 2  | 4  | 7  | 7  | 10 |
| 7  | Planning/Organizing        | 7  | 7  | 5  | 4  | 7  |
| 8  | Interpersonal Skills       | 8  | 9  | 2  | 10 | 2  |
| 9  | Teamwork                   | 8  | 8  | 8  | 8  | 8  |
| 10 | Personal effectiveness     | 10 | 10 | 4  | 13 | 13 |
| 11 | Futuristic Thinking        | 9  | 11 | 10 | 11 | 19 |
| 12 | Empathy                    | 14 | 16 | 12 | 18 | 6  |
| 13 | Written Communication      | 15 | 15 | 16 | 9  | 14 |
| 14 | Decision Making            | 11 | 12 | 18 | 12 | 18 |
| 15 | Employee Development/Coaching | 12 | 22 | 15 | 21 | 11 |
| 16 | Diplomacy                  | 22 | 17 | 8  | 19 | 15 |
| 17 | Conflict management        | 18 | 20 | 14 | 22 | 12 |
| 18 | Negotiation                | 21 | 14 | 20 | 17 | 16 |
| 19 | Presenting                 | 20 | 13 | 22 | 16 | 17 |
| 20 | Leadership                 | 16 | 21 | 17 | 14 | 21 |
| 21 | Management                 | 17 | 19 | 19 | 15 | 20 |
| 22 | Persuasion                 | 23 | 18 | 21 | 23 | 22 |
| 23 | Customer Service           | 19 | 23 | 23 | 20 | 23 |

 Very Important    Important    Not Important

Note: Based on the analysis of the responses to the questionnaire, the order of the competencies indicates three levels of importance shown by the average of the group as well as individual rankings. Competencies that are not important should not be emphasized in selection, training and development, performance evaluation, rewards, recognition or succession planning processes aimed at this position. Significant differences between respondents' rankings may indicate a need for clarification.

Fig. 9E

Key Characteristics of the Position

*The position has been analyzed relative to four key characteristics. These characteristics are accountability for results, results through people, authority and risk. Based on the responses to the questionnaire, these characteristics have been measured on a sliding scale and are illustrated by a bar graph. The scale range includes none, slight, moderate, significant and major.*

Accountability For Results: This characteristic addresses the accountability for producing measurable results in the position. This includes accountability for meeting financial, operations and/or system objectives.

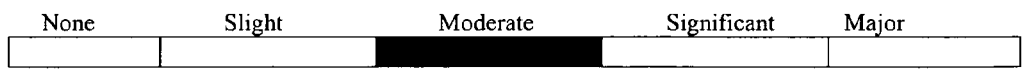

Results through People: This characteristic addresses the emphasis on producing results through the efforts and cooperation of people. This characteristic is not limited to management or leadership positions. Many non-management or leadership positions in team-based organizational structures depend heavily upon the efforts and cooperation of people to produce results.

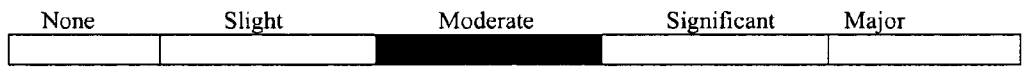

Authority: This characteristic addresses the level of authority that exists in the position. Evidence of authority can be found in the ability to make decisions or changes without prior approval from upper management. This characteristic is not limited to management or leadership positions. In their efforts to become more responsive, many large organizations are finding it necessary to drive decision-making downward. In these organizations, many positions can be characterized by a moderate to significant amount of authority but are not considered management or leadership.

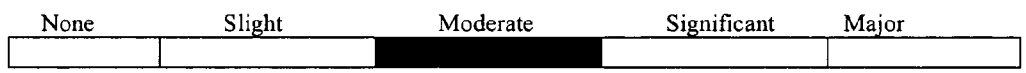

Risks: This characteristic addresses the inherent level of business risk or liability to the organization that exists in the position. Positions with indications of moderate, significant or major levels of inherent risk or liability to the organization may warrant the use of drug, alcohol and/or other appropriate assessments in their selection and management systems.

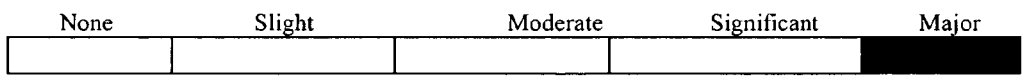

Fig. 9F

WORK ENVIRONMENT
Behavior

*The following is a summary of how position requirements will best be met behaviorally based on the responses to the questionnaire. Describing the work environment in behavioral terms helps people to understand the type of behavior that is most likely to produce superior performance in the position. Aligning an employee's natural behavioral tendencies to the behavioral requirements of the position can create an optimum environment for superior performance.*

- Persistence to complete tasks.
- Systematic guidelines and a deliberate approach to problem-solving.
- Accuracy and adherence to standards and procedures.
- Limited change or change that is planned, detailed and organized.
- Weighing pros and cons before making decisions.
- Adherence to safety rules.
- High standards and time to achieve them.
- Time to complete the task right the first time.
- Working alone or with a small team.

Fig. 9G

Work Environment
Attitudes

*The following is a summary of the type of person whose interests, attitudes and/or motivations can be satisfied by the intrinsic rewards of the position, based on the responses to the questionnaire. Employees whose interests, attitudes and/or motivations are met through their work naturally perform better than employees who find fulfillment outside of work.*

- Integrates past and present knowledge into the future.
- Is results oriented.
- Prefers structured economic dealings.
- Uses knowledge to design efficient systems and eliminate waste.
- Desires to be rewarded for individual expertise and results.
- Wants an opportunity to continuously learn and advance knowledge.
- Gathers data to formulate theories and strategies.
- Is bottom-line oriented.

Fig. 9H

SUMMARY OF TOP COMPETENCIES

*This report focuses on soft skill competencies because they are usually more difficult to identify or assess than technical competencies or experience. Observing the behaviors people use to produce superior performance can provide insight into the demonstration of competencies. Seven (7) of the most important competencies required to produce superior performance are described below in terms of observable behaviors. The behaviors listed below each competency provide examples of some of the ways the competency is demonstrated. Read each behavior and check the ones that must be demonstrated to produce superior performance in the position. More importance is typically placed on those behaviors that must be demonstrated consistently on a daily, weekly or monthly basis.*

1. SELF MANAGEMENT: Demonstrating self control and an ability to manage time and priorities.

- Effectively manages emotions and impulses.
   - Effectively manages time and priorities to meet deadlines.
   - Presents self assertively.
   - Demonstrates an ability to maintain composure in the midst of crisis.
   - Strives for continuous improvement.
   - Balances personal and professional life.
   - Takes initiative and acts without waiting for direction.
   - Accepts responsibilities for actions and results.

2. PROBLEM SOLVING: Anticipating, analyzing, diagnosing, and resolving problems.

- Anticipates, identifies and resolves problems or obstacles.
   - Utilizes logic and systematic processes to analyze and solve problems.
   - Defines the causes, effects, impact and scope of problems.
   - Identifies the multiple components of problems and their relationships.
   - Prioritizes steps to solution.
   - Develops criteria for optimum solutions.
   - Evaluates the potential impact of possible solutions and selects the best one.

3. CREATIVITY/INNOVATION: Adapting traditional or devising new approaches, concepts, methods, models, designs, processes, technologies and/or systems.

- Notices unique patterns, variables, processes, systems or relationships.
   - Expresses non-traditional perspectives and/or novel approaches.
   - Synthesizes and/or simplifies data, ideas, models, processes or systems.
   - Challenges established theories, methods and/or protocols.
   - Encourages and promotes creativity and innovation.
   - Modifies existing concepts, methods, models, designs, processes, technologies and systems.

Fig. 9I

SUMMARY OF TOP COMPETENCIES

- Develops and tests new theories to explain or resolve complex issues.
- Applies unorthodox theories and/or methods.
- Imagines new or revolutionary concepts, methods, models, designs, processes, technology, systems, products, services or industries.

4. CONTINUOUS LEARNING: Taking initiative in learning and implementing new concepts, technologies and/or methods.

- Demonstrates curiosity and enthusiasm for learning.
- Takes initiatives in acquiring and mastering the skills and knowledge requirements of a position.
- Keeps abreast of current or new information through reading and other learning methods.
- Actively interested in new technologies, processes and methods.
- Welcomes or seeks assignments requiring new skills and knowledge.
- Expends considerable effort and/or expense on learning.
- Genuinely enjoys learning.
- Identifies applications for knowledge.
- Is considered a knowledgeable resource by others.

5. FLEXIBILITY: Agility in adapting to change.

- Responds promptly to shifts in direction, priorities and schedules.
- Demonstrates agility in accepting new ideas, approaches and/or methods.
- Effective in juggling multiple priorities and tasks.
- Modifies methods or strategies to fit changing circumstances.
- Adapts personal style to work with different people.
- Maintains productivity during transitions, even in the midst of chaos.
- Embraces and/or champions change.

6. GOAL ORIENTATION: Energetically focusing efforts on meeting a goal, mission or objective.

- Acts independently to achieve objectives without supervision.
- Expends the necessary time and effort to achieve goals.
- Recognizes and acts on opportunities to advance progress towards meeting goals.
- Establishes and works towards ambitious and challenging goals.
- Develops and implements strategies to meet objectives.
- Measures effectiveness and performance to ensure results are attained.
- Acts with a sense of urgency to achieve goals.

Fig. 9J

| SUMMARY OF TOP COMPETENCIES |
|---|

- Demonstrates persistence in overcoming obstacles to meet objectives.
- Takes calculated risks to achieve results.

7. PLANNING/ORGANIZING: Utilizing logical, systematic and orderly procedures to meet objectives.

- Works effectively within established time frames and priorities.
- Utilizes logical, practical and efficient approaches.
- Prioritizes tasks for optimum productivity.
- Develops procedures, processes and systems for order, accuracy, efficiency and productivity.
- Anticipates probable effects, outcomes and risks.
- Develops contingency plans to minimize waste, error and risk.
- Allocates, adjusts and manages resources according to priorities.
- Monitors implementation of plans and makes adjustments as needed.

Fig. 9K

BEHAVIORAL INTERVIEW QUESTIONS

Studies show that traditional interviewing methods are less than 14% accurate in predicting performance. Properly conducted structured interviewing techniques focused on assessing the competencies most important for superior performance in a position can significantly improve accuracy over traditional interviewing methods.

Behavioral interviewing is a disciplined approach that has been used effectively by corporate America since the 1970s. Behavioral interviewing is based on the premise that past behavior is the best predictor of future behavior. Behavioral interview questions ask for specific examples and experiences from the candidate's past. Interviewers can determine whether or not candidates have actually demonstrated the required competencies by the examples they use.

To plan a structured or behavioral interview, start by reviewing the job description to clarify the most important accountabilities of the position. Then review the list of top seven competencies and determine their relative importance as selection criteria according to which ones are necessary to produce the most important results of the position. Next, review the suggestions for behavioral interview questions and select the ones that seem most appropriate for the position.

The suggested behavioral interview questions relate specifically to the top seven (7) competencies. For most positions, additional questions will need to be developed. Since technical competencies are not a part of the Position Survey, questions relative to technical competencies are not provided in this report. The technical competencies required for superior performance in positions will need to be identified and addressed in selection interviews. A complete interview plan includes the development of appropriate behavioral interview questions relating to both soft skill and technical competencies.

The manual provides a suggested methodology for evaluating candidates by weighting the competencies according to their importance, developing benchmarks for evaluating competency levels and a standardized candidate rating scale. Regardless of the interviewing, evaluation and selection methodologies an organization uses, the same process should be consistently applied with each and every candidate.

Fig. 9L

BEHAVIORAL INTERVIEW QUESTIONS

1. SELF MANAGEMENT: Demonstrating self control and an ability to manage time and priorities.

Listen for composure, assertiveness and emotional stability. Be sure to probe for as many details and specifics as possible such as names, dates and other verifiable information. Skilled interviewers will also ask candidates for their thoughts or feelings about a situation to gain further insight.

- Give me an example of when you were able to meet the personal and professional demands in your life yet still maintained a healthy balance.
   - Describe a situation when you had to exercise a significant amount of self control.
   - Describe a situation when you demonstrated initiative and took action without waiting for direction.
   - What was the outcome?
   - Give me an example of when your ability to manage your time and priorities proved to be an asset.
   - What have you done in the past that demonstrates your commitment to continuous improvement?
   - Give me an example of when you were responsible for an error or mistake.
   - What was the outcome?
   - What, if anything would you do differently?
   - Describe a time when you had to make a difficult choice between your personal and professional life.

2. PROBLEM SOLVING: Anticipating, analyzing, diagnosing and resolving problems.

Listen for an analytical and disciplined approach to solving problems. Be sure to probe for as many details and specifics as possible such as names, dates and other verifiable information. Skilled interviewers will also ask candidates for their thoughts or feelings about a situation to gain further insight.

- Describe a situation when you anticipated a problem.
   - What, if anything did you do about it?
   - Give me an example of when your diagnosis of a problem proved to be correct.
   - What approach did you take to diagnose the problem?
   - What was the outcome?
   - Describe the most difficult work problem you've ever encountered.
   - What made it difficult?
   - What steps did you take towards developing a solution?
   - What factors did you consider in evaluating solutions?
   - What solution was implemented and how successful was it in solving the problem?

Fig. 9M

BEHAVIORAL INTERVIEW QUESTIONS

3. CREATIVITY/INNOVATION: Adapting traditional or devising new approaches, concepts, methods, models, design, processes, technologies and/or system.

Listen for "out-of-the-box" thinking and unusual approaches. Be sure to probe for as many details and specifics as possible such as names, dates and other verifiable information. Skilled interviewers will also ask candidates for their thoughts or feelings about a situation to gain further insight.

- Describe a work situation when you adapted a concept, design, process or system to meet a need.
   - How did you go about it?
   - Describe a work situation when you took an unusual or non-traditional approach to get results.
   - What made your approach so unusual?
   - Why did you take that approach?
   - How did others respond to your approach?
   - What was the outcome?
   - What, if anything, would you do differently?
   - Give me an example of when you were given special recognition for a new idea, method or process that improved results.

4. CONTINUOUS/LEARNING: Taking initiative in learning and implementing new concepts, technologies and/or methods.

Listen for positive attitude towards self-improvement, learning and the application of knowledge. Be sure to probe for as many details and specifics as possible such as names, dates and other verifiable information. Skilled interviewers will also ask candidates for their thoughts or feelings about a situation to gain further insight.

- How do you keep current on what's going on in your field?
   - What books and magazines you have read or classes you have taken to keep abreast of what's new in your field?
   - What was the last book you read?
   - What learning activities have you been involved with since College/High School?
   - Give me an example of when you were able to apply a concept, theory or knowledge to a work problem or situation.
   - Describe how something you learned made a significant difference in your career.
   - Give me an example of when you did not know enough about something to be effective.
   - What did you do about it?
   - In what ways have you invested in yourself to improve your performance?
   - What self-improvement activities are you currently involved in?
   - Give me an example that illustrates how other people have used you as a resource for knowledge in your field.

Fig. 9N

BEHAVIORAL INTERVIEW QUESTIONS

- What do you want to learn before you die?

5. FLEXIBILITY: Agility in adapting to change.

Listen for a positive attitude towards lots of activity, multi-tasking and change, in general. Be sure to probe for as many details and specifics as possible such as names, dates and other verifiable information. Skilled interviewers will also ask candidates for their thoughts or feeling about a situation to gain further insight.

- Give me an example of when you were forced to change priorities or direction.
   - How did you feel when you were first confronted with this change?
   - Describe a time when there was an extraordinary amount of activity at work.
   - How did you handle it?
   - Describe a situation when you were the author or architect of a change.
   - What were the barriers to implementing the change and how did you get beyond them?
   - How did you get buy-in from others?
   - What was the outcome?
   - Give me an example of when you were one of the first to get on board when a major change was introduced.
   - Describe a situation when you were given special recognition or acknowledgment for your ability to adapt quickly to a change.

6. GOAL ORIENTATION: Energetically focusing efforts on meeting a goal, mission or objective.

Listen for determination, persistence and a "never-give-up" attitude in efforts to meet goals. Be sure to probe for as many details and specifics as possible such as names, dates and other verifiable information. Skilled interviewers will also ask candidates for their thoughts or feelings about a situation to gain further insight.

- Give me an example of the most significant professional goal you have met.
   - How did you achieve it?
   - What were the obstacles?
   - How did you overcome them?
   - Give me an example of when you took a risk to achieve a goal.
   - What was the outcome?
   - What are your future professional goals?
   - How do you plan to achieve them?
   - What might keep you from achieving them?
   - Tell me about a time when you overcame great obstacles to achieve something significant.

Fig. 90

BEHAVIORAL INTERVIEW QUESTIONS

- Give me an example of when you achieved something by your persistence that others couldn't.

7. PLANNING/ORGANIZING: Utilizing logical, systematic and orderly procedures to meet objectives.

Listen for logical, organized and systematic approaches. Be sure to probe for as many details and specifics as possible such as names, dates and other verification information. Skilled interviewers will also ask candidates for their thoughts or feelings about a situation to gain further insight.

- Describe the most complex assignment or project you've worked on.
- What actions did you take to start the assignment or project?
- What were the most challenging aspects of the assignment or project?
- How did you determine what steps needed to be taken to complete it?
- How did you determine what resources were needed?
- What obstacles did you encounter that you didn't anticipate?
- What could you have done differently?
- Describe a situation when your planning and preparation was a major factor in the success of a project.
- Describe a work situation where your lack of planning and organizing had a negative effect.
- Give me an example of when you were given special recognition or acknowledgment for your attention to detail.

Fig. 9P

Performance DNA International, Ltd.
Position Report

A complete evaluation of the competencies necessary
to achieve superior performance in the position Customer Service
Target Training International
Support

12/21/99

1049-0788

Prepared by Performance DNA International, Ltd.

Fig. 10A

INTRODUCTION

The purpose of this report is to provide insight into the most important performance criteria for the position. Managers or leaders are encouraged to discuss the results of the report with new hires and incumbents to enhance their understanding of performance expectations. The information in this report is particularly valuable to organizations in the following Human Resources activities:

- BUILDING COMPETENCY PROFILES OR MODELS
- DESIGNING PERFORMANCE EVALUATION PROCESSES
- ASSESSING TRAINING AND DEVELOPMENT NEEDS
- DEVELOPING COMPENSATION AND REWARD SYSTEMS
- DESIGNING SUCCESSION PLANNING PROCESSES
- DEVELOPING SELECTION SYSTEMS

Information in the report is based on an objective analysis of data collected from specially selected individuals who understand the position well. Report results reflect a summary of their responses to the Position Survey questionnaire. The report results are generated by a computer analysis of all responses. Hundreds of calculations are performed to determine the key performance criteria of the position. Where there were multiple respondent data, an average composite of all responses is provided.

Each section of the report is designed to address important aspects of the position. Clarity, understanding and consensus on what competencies are required for superior performance is essential to optimize selection, training and development, performance evaluation, rewards, recognition and succession planning programs. Read each section of the report carefully to gain insight into the most important position requirements.

Research indicates that a specific group of competencies are required to produce superior performance in most positions. This report provides detailed descriptions on seven (7) of the most important competencies required for superior performance in the position. Significant differences in respondent rankings of the competencies indicate a need for clarification. It is recommended that the results of the report be discussed with incumbents and management to obtain consensus before integrating the information into Human Resource processes.

The last section of the report provides samples of behavioral interview questions designed to assist hiring authorities to plan structured selection interviews. The questions provide a framework for comparing candidate competency strengths with the competency requirements of the position. Select the questions that seem most appropriate to the position being analyzed.

Fig. 10B

HIERARCHY OF COMPETENCIES

*The competencies required for superior performance have been prioritized based on the analysis of responses to the questionnaire. Where there were multiple respondents to the questionnaire, the list represents a composite average of all responses. The hierarchical order of the competencies represents their relative importance to each other in producing superior performance in the position.*

|  | HIERARCHY OF COMPETENCIES |
|---|---|
| 1. | Interpersonal Skills |
| 2. | Teamwork |
| 3. | Self Management |
| 4. | Goal orientation |
| 5. | Empathy |
| 6. | Customer Service |
| 7. | Problem Solving |
| 8. | Creativity/Innovation |
| 9. | Continuous Learning |
| 10. | Flexibility |
| 11. | Planning/Organizing |
| 12. | Employee Development/Coaching |
| 13. | Diplomacy |
| 14. | Negotiation |
| 15. | Personal Effectiveness |
| 16. | Persuasion |
| 17. | Conflict Management |
| 18. | Written Communication |
| 19. | Decision Making |
| 20. | Presenting |
| 21. | Management |
| 22. | Futuristic Thinking |
| 23. | Leadership |

 Very Important      Important      Not Important

Fig. 10C

SUGGESTIONS FOR IMPLEMENTING REPORT RESULTS

Before implementing the information in this report, it is recommended that the respondents meet to verify the result of the report. The hierarchy of competencies should not be accepted at face value as a competency model for the position. The hierarchical order of the competencies represents the relative importance of competencies in relationship to each other. Although competencies are shown in a hierarchy, several competencies may be relatively equal in importance.

Position reports on hundreds of positions confirms that it is more practical to eliminate the competencies that are not important for superior performance than to debate the precise order of the most important competencies. Based on the analysis of the responses to the questionnaire, the competencies noted as not important should not be emphasized in selection, training and development, performance evaluation, rewards, recognition or succession planning processes aimed at this position.

The data on hundreds of positions also confirms that differences in respondent rankings of competencies are common. The information in this report is designed to highlight both the differences as well as the similarities between respondent rankings of competencies.

Differences in competency rankings can be attributed to a number of factors. Some respondents may be high performing incumbents with a thorough understanding of the position, while others may be new to the position.

In some cases, respondents will have a different perspective of the importance of competencies by virtue of their unique relationship to the position. For example, a customer of the position may have a tendency to weight the customer service competency over others.

In cases where a position is being impacted by significant change, the difference in perspectives provides a valuable framework for respondents to create the new behavioral blueprint for success together. Working through the results of the report together, respondents can achieve a new level of understanding about how the demonstration of specific behaviors contributes to the fulfillment of the most important accountabilities and responsibilities in the position.

Fig. 10D

Distribution of Competency Rankings

*The distribution of competency rankings illustrates individual differences in responses from multiple respondents to the questionnaire. The hierarchical listing of competencies on the left side of the chart represents the composite ranking of all respondents on each competency. The right side of the chart lists the competency rankings of each individual respondent.*

| | HIERARCHY OF COMPETENCIES | R1 | R2 | R3 | R4 | R5 |
|---|---|---|---|---|---|---|
| 1. | Interpersonal Skills | 4 | 2 | 2 | 1 | 5 |
| 2. | Teamwork | 1 | 7 | 3 | 4 | 2 |
| 3. | Self Management | 6 | 14 | 1 | 3 | 1 |
| 4. | Goal orientation | 2 | 1 | 5 | 11 | 7 |
| 5. | Empathy | 7 | 3 | 10 | 2 | 6 |
| 6. | Customer Service | 11 | 7 | 4 | 5 | 4 |
| 7. | Problem Solving | 13 | 4 | 11 | 10 | 3 |
| 8. | Creativity/Innovation | 9 | 5 | 7 | 12 | 10 |
| 9. | Continuous Learning | 8 | 22 | 9 | 6 | 8 |
| 10. | Flexibility | 6 | 12 | 14 | 8 | 15 |
| 11. | Planning/Organizing | 5 | 10 | 12 | 16 | 16 |
| 12. | Employee Development/Coaching | 10 | 6 | 16 | 9 | 18 |
| 13. | Diplomacy | 12 | 19 | 13 | 7 | 9 |
| 14. | Negotiation | 16 | 9 | 17 | 15 | 11 |
| 15. | Personal Effectiveness | 17 | 20 | 6 | 18 | 14 |
| 16. | Persuasion | 20 | 8 | 18 | 19 | 12 |
| 17. | Conflict Management | 15 | 18 | 15 | 13 | 17 |
| 18. | Written Communication | 14 | 23 | 8 | 14 | 19 |
| 19. | Decision Making | 22 | 13 | 21 | 21 | 13 |
| 20. | Presenting | 18 | 21 | 19 | 17 | 20 |
| 21. | Management | 23 | 11 | 23 | 22 | 21 |
| 22. | Futuristic Thinking | 19 | 16 | 22 | 20 | 23 |
| 23. | Leadership | 21 | 15 | 20 | 23 | 22 |

 Very Important     Important     Not Important

Note: Based on the analysis of the responses to the questionnaire, the order of the competencies indicates three levels of importance shown by the average of the group as well as individual rankings. Competencies that are not important should not be emphasized in selection, training and development, performance evaluation, rewards, recognition or succession planning processes aimed at this position. Significant differences between respondents' rankings may indicate a need for clarification Copyright © 1998-1999 Performance DNA International, Ltd. – Page 4

Fig. 10E

Key Characteristics of the Position

*The position has been analyzed relative to four key characteristics. These characteristics are accountability for results, results through people, authority and risk. Based on the responses to the questionnaire, these characteristics have been measured on a sliding scale and are illustrated by a bar graph. The scale range includes none, slight, moderate, significant and major.*

Accountability For Results: This characteristic addresses the accountability for producing measurable results in the position. This includes accountability for meeting financial, operations and/or system objectives.

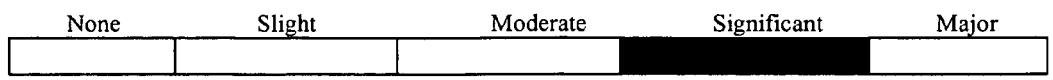

Results through People: This characteristic addresses the emphasis on producing results through the efforts and cooperation of people. This characteristic is not limited to management or leadership positions. Many non-management or leadership positions in team-based organizational structures depend heavily upon the efforts and cooperation of people to produce results.

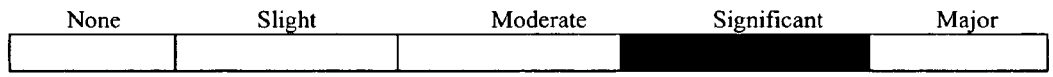

Authority: This characteristic addresses the level of authority that exists in the position. Evidence of authority can be found in the ability to make decisions or changes without prior approval from upper management. This characteristic is not limited to management or leadership positions. In their efforts to become more responsive, many large organizations are finding it necessary to drive decision-making downward. In these organizations, many positions can be characterized by a moderate to significant amount of authority but are not considered management or leadership.

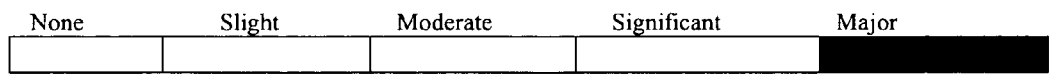

Risks: This characteristic addresses the inherent level of business risk or liability to the organization that exists in the position. Position with indications of moderate, significant or major levels of inherent risk or liability to the organization may warrant the use of drug, alcohol and/or other appropriate assessment in their selection and management system.

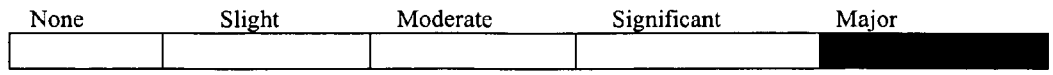

Fig. 10F

Work Environment

Behavior

*The following is a summary of how position requirements will best be met behaviorally based on the responses to the questionnaire. Describing the work environment in behavioral terms helps people to understand the type of behavior that is most likely to produce superior performance in the position. Aligning an employee's natural behavioral tendencies to the behavioral requirements of the position can create an optimum environment for superior performance.*

- Sensitivity to changes in social and work environment
- Peoples feelings more important than results.
- Goodwill, diplomacy and the ability to get along with strangers.
- Negotiating people conflicts or solving people problems.
- Optimistic outlook toward all activities, including many social interactions.
- Flexible use of time.
- A public relations approach over a sales approach.
- Concerned about how others feel.

Fig. 10G

Work Environment
Behavior

*The following is a summary of the type of person whose interests, attitudes and/or motivations can be satisfied by the intrinsic rewards of the position, based on the responses to the questionnaire. Employees whose interests, attitudes and/or motivations are met through their work naturally perform better than employees who find fulfillment outside of work.*

- Invests time, talent and resources in helping others gain knowledge.
- Has an ability to research and understand complex social problems.
- Is able to formulate theories and solve problems.
- Uses knowledge to achieve mutually beneficial negotiations.
- Works hard to achieve consistency and fairness regarding all people.
- Is a team player.
- Is motivated by new opportunities for learning and advancement of knowledge.

Fig. 10H

SUMMARY OF TOP COMPETENCIES

*This report focuses on soft skill competencies because they are usually more difficult to identify or assess than technical competencies or experience. Observing the behaviors people use to produce superior performance can provide insight into the demonstration of competencies. Seven (7) of the most important competencies required to produce superior performance are described below in terms of observable behaviors. The behaviors listed below each competency provide examples of some of the ways the competency is demonstrated. Read each behavior and check the ones that must be demonstrated to produce superior performance in the position. More importance is typically placed on those behaviors that must be demonstrated consistently on a daily, weekly or monthly basis.*

1. INTERPERSONAL SKILLS: Effectively communicating, building rapport and relating well to all kinds of people.

- Strives for self-awareness.
   - Demonstrates sincere interest in others.
   - Treats all people with respect, courtesy and consideration.
   - Respects differences in the attitudes and perspectives of others.
   - Listens, observes and strives to gain understanding of others.
   - Communicates effectively.
   - Sensitive to diversity issues.
   - Develops and maintains relationship with many different kinds of people regardless of cultural differences.

2. TEAMWORK: Working effectively and productively with others.

- Respects team members and their individual perspectives.
   - Makes team mission and objectives a priority.
   - Works towards consensus when team decisions are required.
   - Meets agreed-upon deadlines on team assignments and commitments.
   - Shares responsibility with team members for successes and failures.
   - Keeps team members informed regarding projects.
   - Supports team decisions.
   - Recognizes and appreciates the contributions of team members.
   - Behaves in a manner consistent with team values and mission.
   - Provides constructive feedback to team and its members.
   - Responds positively to feedback from team members.
   - Raises and/or confronts issues limiting team effectiveness.

Fig. 10I

SUMMARY OF TOP COMPETENCIES

3   SELF MANAGEMENT: Demonstrating self control and an ability to manage time and priorities.

- Effectively manages emotions and impulses.
- Effectively manages time and priorities to meet deadlines.
- Presents self assertively.
- Demonstrates an ability to maintain composure in the midst of crisis.
- Strives for continuous improvement.
- Balances personal and professional life.
- Takes initiative and acts without waiting for directions.
- Accepts responsibility for actions and results.

4   GOAL ORIENTATION: Energetically focusing efforts on meeting a goal, mission or objective.

- Acts independently to achieve objectives without supervision.
- Expends the necessary time and effort to achieve goals.
- Recognizes and acts on opportunities to advance progress towards meeting goals.
- Establishes and works towards ambitious and challenging goals.
- Develops and implements strategies to meet objectives.
- Measures effectiveness and performance to ensure results are attained.
- Acts with a sense of urgency to achieve goals.
- Demonstrates persistence in overcoming obstacles to meet objectives.
- Takes calculated risks to achieve results.

5   EMPATHY: Identifying with and caring about others.

- Demonstrates genuine concern for others.
- Respects and values people.
- Perceives and is sensitive to the emotions people experience.
- Expends considerable effort to understand the real needs, concerns and feelings of others.
- Advocates for the interests, needs and wants of others.
- Demonstrates cross-cultural sensitivity and understanding.
- Takes personal and/or professional risks for the sake of others.

Fig. 10J

SUMMARY OF TOP COMPETENCIES

6 CUSTOMER SERVICE: Anticipating, meeting and/or exceeding customer needs, wants and expectations

- Strives to anticipate, identify and understand customers' wants, needs and concerns.
- Responds to customers with a sense of urgency.
- Follows through on customer requests.
- Is patient and courteous with customers.
- Resolves issues and complaints to the satisfaction of customers.
- Expends extraordinary effort to satisfy customers.
- Develops relationships with customers.
- Partners with customers to assist them in achieving their objectives.
- Acts as an advocate for customers' needs.
- Takes professional risks for the sake of customers' needs.

7 PROBLEM SOLVING: Anticipating, analyzing, diagnosing and resolving problems.

- Anticipates, identifies and resolves problems or obstacles.
- Utilizes logic and systematic processes to analyze and solve problems.
- Defines the causes, effects, impact and scope of problems.
- Identifies the multiple components of problems and their relationships.
- Prioritizes steps to solution.
- Develops criteria for optimum solutions.
- Evaluates the potential impact of possible solutions and selects the best one.

Fig. 10K

BEHAVIORAL INTERVIEW QUESTIONS

Studies show that traditional interviewing methods are less than 14% accurate in predicting performance. Properly conducted structured interviewing techniques focused on assessing the competencies most important for superior performance in a position can significantly improve accuracy over traditional interviewing methods.

Behavioral interviewing is a disciplined approach that has been used effectively by corporate America since the 1970s. Behavioral interviewing is based on the premise that past behavior is the best predictor of future behavior. Behavioral interview questions ask for specific examples and experiences from the candidate's past. Interviewers can determine whether or not candidates have actually demonstrated the required competencies by the examples they use.

To plan a structured or behavioral interview, start by reviewing the job description to clarify the most important accountabilities of the position. Then review the list of top seven competencies and determine their relative importance as selection criteria according to which ones are necessary to produce the most important results of the position. Next, review the suggestions for behavioral interview questions and select the ones that seem most appropriate for the position.

The suggested behavioral interview questions relate specifically to the top seven (7) competencies. For most positions, additional questions will need to be developed. Since technical competencies are not a part of the Position Survey, questions relative to technical competencies are not provided in this report. The technical competencies required for superior performance in positions will need to be identified and addressed in selection interviews. A complete interview plan includes the development of appropriate behavioral interview questions relating to both soft skill and technical competencies.

The manual provides a suggested methodology for evaluating candidates by weighting the competencies according to their importance, developing benchmarks for evaluating competency levels and a standardized candidate rating scale. Regardless of the interviewing, evaluation and selection methodologies an organization uses, the same process should be consistently applied with each and every candidate.

Fig. 10L

BEHAVIORAL INTERVIEW QUESTIONS

1. INTERPERSONAL SKILLS: Effectively communicating, building rapport and relating well to all kinds of people.

Listen for self awareness, understanding and an ability to communicate effectively with others regardless of differences. Be sure to probe for as many details and specifics as possible such as names, dates and other verifiable information. Skilled interviewers will also ask candidates for their thoughts or feelings about a situation to gain further insight.

- Describe the most difficult working relationship you've had with an individual.
   - What specific actions did you take to improve the relationship?
   - What was the outcome?
   - Describe the types of people you get along with best and why.
   - Describe the types of people you have difficulty getting along with and why.
   - Give me an example of a situation when you demonstrated sensitivity to diversity issues.
   - Describe a situation when you were able to strengthen a relationship by communicating effectively.
   - What made your communication effective?
   - Describe your relationship with the people you work with.
   - What have you done in the past to build rapport and relationship with people?
   - Give me an example of your ability to communicate effectively and build relationships with people regardless of cultural differences.
   - Describe how your ability to communicate effectively and build relationships with many different types of people has contributed to one of your greatest accomplishments.

2. TEAMWORK: Working effectively and productively with others.

Listen for strong commitment and contributions to team members working towards a specific goal. Be sure to probe for as many details and specifics as possible such as names, dates and other verifiable information. Skilled interviewers will also ask candidates for their thoughts or feelings about a situation to gain future insight.

- Give me an example of one of the most significant contributions you made as a member of a high performing team.
   - What, in your opinion, made it a high performing team?
   - Describe how you felt about the contributions of the others on the team.
   - Give me an example of a situation where you had difficulties with a team member.
   - What, if anything, did you do to resolve the difficulties?
   - Describe how you felt about a decision the team wanted to make that you didn't agree with.
   - Describe a situation where the team was having trouble agreeing on a decision and what you did to facilitate consensus.
   - Give me an example of when you were on a team that failed to meet its objectives.

Fig. 10M

BEHAVIORAL INTERVIEW QUESTIONS

- What could the team have done differently?

3. SELF MANAGEMENT: Demonstrating self control and an ability to manage time and priorities.

Listen for composure, assertiveness and emotional stability. Be sure to probe for as many details and specifics as possible such as names, dates and other verifiable information. Skilled interviewers will also ask candidates for their thoughts or feelings about a situation to gain further insight.

- Give me an example of when you were able to meet the personal and professional demands in your life yet still maintained a healthy balance.
   - Describe a situation when you had to exercise a significant amount of self control.
   - Describe a situation when you demonstrated initiative and took action without waiting for direction.
   - What was the outcome?
   - Give me an example of when your ability to manage your time and priorities proved to be an asset.
   - What have you done in the past that demonstrates your commitment to continuous improvement?
   - Give me an example of when you were responsible for an error or mistake.
   - What was the outcome?
   - What, if anything would you do differently?
   - Describe a time when you had to make a difficult choice between your personal and professional life.

4. GOAL ORIENTATION: Energetically focusing efforts on meeting a goal, mission or objective.

Listen for determination, persistence and a "never-give-up" attitude in efforts to meet goals. Be sure to probe for as many details and specifics as possible such as names, dates and other verifiable information. Skilled interviewers will also ask candidates for their thoughts or feelings about a situation to gain further insight.

- Give me an example of the most significant professional goal you have met.
   - How did you achieve it?
   - What were the obstacles?
   - How did you overcome them?
   - Give me an example of when you took a risk to achieve a goal.
   - What was the outcome?
   - What are your future professional goals?

Fig. 10N

BEHAVIORAL INTERVIEW QUESTIONS

- How do you plan to achieve them?
- What might keep you from achieving them?
- Tell me about a time when you overcame great obstacles to achieve something significant.
- Give me an example of when you achieved something by your persistence that others couldn't.

5. EMPATHY: Identifying with and caring about others.

Listen for genuine caring, compassion and initiative in assisting others without expectations of rewards. Be sure to probe for as many details and specifics as possible such as names, dates and other verifiable information. Skilled interviewers will also ask candidates for their thoughts or feelings about a situation to gain further insight.

- Give me an example of when you identified with someone else's difficulties at work.
- What, if anything, did you do to help them?
- Give me an example of a time when a company policy or action hurt people.
- What, if anything did you do to mitigate the negative consequences to people?
- Give me an example of when you went out of your way to help someone.
- What were your thoughts and feeling about that situation?
- Give me an example of when you had to make a decision in favor of your own self-interest or someone else's.
- What were your thoughts and feelings?
- What did you do?
- What positive contributions have you made to your community or society?
- Give me an example of when you were given special recognition or acknowledgment for your contributions to the disadvantaged.
- Describe a situation when you were criticized for being too concerned about the difficulties of others.

6. CUSTOMER SERVICE: Anticipating, meeting and/or exceeding customer needs, wants and expectations.

Listen for extraordinary effort in responding to customer needs and wants to insure satisfaction. Be sure to probe for as many details and specifics as possible such as names, dates and other verifiable information. Skilled interviewers will also ask candidates for their thoughts or feelings about a situation to gain further insight.

- Give me an example of when you went out of your way for a customer.
- What was the outcome?
- Describe the most difficult customer you've ever had to deal with and how you handled them.

Fig. 10O

BEHAVIORAL INTERVIEW QUESTIONS

- Describe a situation when you were given outstanding customer service
- What made it stand out?
- Describe a situation when you felt a particularly demanding customer may have been trying to take advantage of you or the organization.
- What was the outcome?
- Give me an example of a situation where you improved the level of customer service in your organization.
- What did you do to improve it?
- What was the outcome?
- Give me an example of when you were given special recognition or acknowledgment for going the extra mile to satisfy a customer.
- Question: Describe a situation when you took a stand for a customer.

7. PROBLEM SOLVING: Anticipating, analyzing, diagnosing and resolving problems.

Listen for an analytical and disciplined approach to solving problems. Be sure to probe for as many details and specifics as possible such as names, dates and other verifiable information. Skilled interviewers will also ask candidates for their thoughts or feelings about a situation to gain further insight.

- Describe a situation when you anticipated a problem.
- What, if anything did you do about it?
- Give me an example of when your diagnosis of a problem proved to be correct.
- What approach did you take to diagnose the problem?
- What was the outcome?
- Describe the most difficult work problem you've ever encountered.
- What made it difficult?
- What steps did you take towards developing a solution?
- What factors did you consider in evaluating solutions?
- What solution was implemented and how successful was it in solving the problem?

Fig. 10P

INSTRUCTIONS FOR COMPLETING THE PERSONAL COMPETENCY INVENTORY (PCI)

A computerized analysis of your responses to the PCI will result in a profile of your competency strengths. Your competency strengths will be matched to the competency requirements of positions. You will be contacted by e-mail if your competency strengths match the requirements of any positions. Your PCI result will be available to hiring authorities.

As tempting as it may be to portray yourself as having more strengths than you do, the best career management strategy is to represent yourself as accurately as you can. The best employment situation is one in which your true talents fit the requirements of the position. Today's most marketable candidates know their strengths as well as their limitations.

To give yourself the best chance for a good fit between your strengths and position requirements, you must respond honestly. You may be asked to defend any strengths indicated by your responses to the PCI during subsequent interviews.

The PCI has three separate response sections. Please read the directions for each section before completing it. Section One lists word-sets that others have used to describe your behavior in the workplace. Section two lists statements that describe feelings you have about work issues. Section Three lists statements that relate to competencies.

Fig. 12A

SECTION ONE

Click on the word-sets that others would use to describe your behavior in the workplace. Take care that you don't select too many or too few word-sets. Selecting too many or too few word-sets could invalidate the results of your profile. An average of 7-10 word-sets usually provides an accurate description of a person's work behavior. You should be prepared to provide more detail on your word-set selections during interviews.

| | | | | |
|---|---|---|---|---|
| 1. | _____ | Charismatic/Personal Magnetism | 12. _____ | Organized/Structured |
| 2. | _____ | Mentor/Facilitator | 13. _____ | Diplomatic/Tactful |
| 3. | _____ | Cooperative/Team-player | 14. _____ | Resilient/Courageous |
| 4. | _____ | Mediator/Arbitrator | 15. _____ | Speaker/Presenter |
| 5. | _____ | Personable/Sociable | 16. _____ | Take Charge/Controlling |
| 6. | _____ | Problem Solver/Inquisitive | 17. _____ | Negotiator/Mediator |
| 7. | _____ | Imaginative/Creative | 18. _____ | Convincing/Persuasive |
| 8. | _____ | Writer/Editor | 19. _____ | Caring/Compassionate |
| 9. | _____ | Helpful/Supportive | 20. _____ | Curious/Learner |
| 10. | _____ | Adaptable/Open Minded | 21. _____ | Visionary/Entrepreneurial |
| 11. | _____ | Tenacious/Motivated | 22. _____ | Decisive/Certain |
| | | | 23. _____ | Self Controlled/Composed |

Fig. 12B

SECTION TWO

The following statements describe feelings you may or may not have about work issues. You should be prepared to explain your responses to these statements during interviews. Please click on 1, 2 or 3 to indicate whether you:

1) Disagree with the statement.
2) Have no opinion about the statement.
3) Agree with the statement.

1. I know what I want and I usually get it.   (P11)

| Disagree | No opinion | Agree |
|---|---|---|
| 1 | 2 | 3 |

2. I usually need more time than most people to adjust to changes.   (K10)

| Disagree | No opinion | Agree |
|---|---|---|
| 1 | 2 | 3 |

3. I enjoy speaking to large groups.   (P15)

| Disagree | No opinion | Agree |
|---|---|---|
| 1 | 2 | 3 |

4. It's difficult for me to influence the outcome of discussions.   (K18)

| Disagree | No opinion | Agree |
|---|---|---|
| 1 | 2 | 3 |

5. I like going out of my way to help others get their needs met.   (P9)

| Disagree | No opinion | Agree |
|---|---|---|
| 1 | 2 | 3 |

6. I'm not very good at dealing with deadlines.   (K11)

| Disagree | No opinion | Agree |
|---|---|---|
| 1 | 2 | 3 |

7. I prefer structure in my work.   (K10)

| Disagree | No opinion | Agree |
|---|---|---|
| 1 | 2 | 3 |

8. I would not want the responsibility of getting others to work towards goals, especially if it involved risk.   (K1)

| Disagree | No opinion | Agree |
|---|---|---|
| 1 | 2 | 3 |

9. I believe results are more important than the process used to obtain them.   (P16)

| Disagree | No opinion | Agree |
|---|---|---|
| 1 | 2 | 3 |

Fig. 12C

SECTION TWO

10. It bothers me when I see others passing up opportunities to learn.

| Disagree | No opinion | Agree |
|---|---|---|
| 1 | 2 | 3 |

(P2)

11. Too much competition upsets me.

| Disagree | No opinion | Agree |
|---|---|---|
| 1 | 2 | 3 |

(K14)

12. I would like to plan my work very carefully before starting.

| Disagree | No opinion | Agree |
|---|---|---|
| 1 | 2 | 3 |

(P12)

13. I prefer working alone.

| Disagree | No opinion | Agree |
|---|---|---|
| 1 | 2 | 3 |

(K3)

14. People spend far too much time dreaming about the future instead of solving today's problems.

| Disagree | No opinion | Agree |
|---|---|---|
| 1 | 2 | 3 |

(K21)

15. I have difficulty making quick decisions.

| Disagree | No opinion | Agree |
|---|---|---|
| 1 | 2 | 3 |

(K22)

16. I don't like haggling over prices.

| Disagree | No opinion | Agree |
|---|---|---|
| 1 | 2 | 3 |

(K17)

17. I have difficulty putting my thoughts in writing.

| Disagree | No opinion | Agree |
|---|---|---|
| 1 | 2 | 3 |

(K8)

18. Demanding customers irritate me.

| Disagree | No opinion | Agree |
|---|---|---|
| 1 | 2 | 3 |

(K9)

19. I prefer to be evaluated on my results rather than my methods.

| Disagree | No opinion | Agree |
|---|---|---|
| 1 | 2 | 3 |

(P16)

20. I prefer a tried and true approach.

| Disagree | No opinion | Agree |
|---|---|---|
| 1 | 2 | 3 |

SECTION TWO

21. One thing I am very good at is spontaneity.

| Disagree | No opinion | Agree |
|---|---|---|
| 1 | 2 | 3 |

(K12)

22. It really bothers me when people say things that are obviously politically incorrect.

| Disagree | No opinion | Agree |
|---|---|---|
| 1 | 2 | 3 |

(P13)

23. I feel that people on welfare are just looking for a handout.

| Disagree | No opinion | Agree |
|---|---|---|
| 1 | 2 | 3 |

(K19)

24. One of my greatest fears is getting up in front of a group of people and speaking.

| Disagree | No opinion | Agree |
|---|---|---|
| 1 | 2 | 3 |

(K15)

25. I am grateful for my failures because they have been some of my best learning experiences.

| Disagree | No opinion | Agree |
|---|---|---|
| 1 | 2 | 3 |

(P14)

26. Too often old traditions are discarded in favor of untested ideas.

| Disagree | No opinion | Agree |
|---|---|---|
| 1 | 2 | 3 |

(K21)

27. I would rather wait for someone else to take the lead.

| Disagree | No opinion | Agree |
|---|---|---|
| 1 | 2 | 3 |

(K1)

28. Far too much emphasis is placed on learning new things when there is so much work to do.

| Disagree | No opinion | Agree |
|---|---|---|
| 1 | 2 | 3 |

(K2)

29. I go out of my way to avoid conflict.

| Disagree | No opinion | Agree |
|---|---|---|
| 1 | 2 | 3 |

(K4)

30. Meeting new people is hard for me.

| Disagree | No opinion | Agree |
|---|---|---|
| 1 | 2 | 3 |

(K5)

31. I rely on my instincts to solve problems.

| Disagree | No opinion | Agree |
|---|---|---|
| 1 | 2 | 3 |

SECTION TWO

32. I am not known for being creative or inventive.  (K7)

| Disagree | No opinion | Agree |
|---|---|---|
| 1 | 2 | 3 |

33. I enjoy expressing my thoughts and feelings in writing.  (P8)

| Disagree | No opinion | Agree |
|---|---|---|
| 1 | 2 | 3 |

34. Persuasion is not one of my strengths.  (K18)

| Disagree | No opinion | Agree |
|---|---|---|
| 1 | 2 | 3 |

35. I don't spend much time worrying about other people's problems.  (K19)

| Disagree | No opinion | Agree |
|---|---|---|
| 1 | 2 | 3 |

36. Besides being boring, theoretical discussions are a waste of time.  (K20)

| Disagree | No opinion | Agree |
|---|---|---|
| 1 | 2 | 3 |

37. I am shy at social gatherings.  (K5)

| Disagree | No opinion | Agree |
|---|---|---|
| 1 | 2 | 3 |

38. I dislike participating in negotiations.  (K17)

| Disagree | No opinion | Agree |
|---|---|---|
| 1 | 2 | 3 |

39. I have been criticized for being too emotional.  (K23)

| Disagree | No opinion | Agree |
|---|---|---|
| 1 | 2 | 3 |

40. I feel uncomfortable when working with people who consistently make decisions without a proper analysis of the data.  (K22)

| Disagree | No opinion | Agree |
|---|---|---|
| 1 | 2 | 3 |

41. One thing I am very good at is identifying the best solution to a problem.  (P6)

| Disagree | No opinion | Agree |
|---|---|---|
| 1 | 2 | 3 |

42. I have to work on managing my time continually.  (K23)

| Disagree | No opinion | Agree |
|---|---|---|
| 1 | 2 | 3 |

Fig.12F

SECTION THREE

The following statements relate to competencies. You should be prepared to provide specific details relative to your responses to these statements during interviews. Click on a 1, 2 or 3 to indicate whether you:

1) Disagree with the statement.
2) Have no opinion about the statement.
3) Agree with the statement.

1. I spend a lot of time in libraries and bookstores. (P20)

| Disagree | No opinion | Agree |
|---|---|---|
| 1 | 2 | 3 |

2. People have often come to me for advice on how to handle politically sensitive issues (R13)

| Disagree | No opinion | Agree |
|---|---|---|
| 1 | 2 | 3 |

3. What I am most proud of is what others have accomplished as a result of my mentoring. (R2)

| Disagree | No opinion | Agree |
|---|---|---|
| 1 | 2 | 3 |

4. I have been criticized for being too far out in my ideas. (R21)

| Disagree | No opinion | Agree |
|---|---|---|
| 1 | 2 | 3 |

5. I am most productive when working closely with others to achieve goals. (P3)

| Disagree | No opinion | Agree |
|---|---|---|
| 1 | 2 | 3 |

6. In the past, people have taken risks to support my vision, mission or goals. (R1)

| Disagree | No opinion | Agree |
|---|---|---|
| 1 | 2 | 3 |

7. I have a history of making significant contributions as a member of a high performing team. (R3)

| Disagree | No opinion | Agree |
|---|---|---|
| 1 | 2 | 3 |

8. I have a gift for resolving conflict. (R4)

| Disagree | No opinion | Agree |
|---|---|---|
| 1 | 2 | 3 |

9. I have a reputation for keeping up with what's new in my field. (R20)

| Disagree | No opinion | Agree |
|---|---|---|
| 1 | 2 | 3 |

Fig. 12G

SECTION THREE

10. I am known for my ability to build and maintain many relationships with all kinds of people.

| Disagree | No opinion | Agree |
|---|---|---|
| 1 | 2 | 3 |

(R5)

11. I have often been recognized for achieving results when others couldn't.

| Disagree | No opinion | Agree |
|---|---|---|
| 1 | 2 | 3 |

(R11)

12. I have been criticized for being too concerned about the difficulties of others.

| Disagree | No opinion | Agree |
|---|---|---|
| 1 | 2 | 3 |

(R19)

13. I am known for making timely decisions even when the risk of an error was high.

| Disagree | No opinion | Agree |
|---|---|---|
| 1 | 2 | 3 |

(R22)

14. People will verify my ability to facilitate win /win agreements.

| Disagree | No opinion | Agree |
|---|---|---|
| 1 | 2 | 3 |

(R17)

15. I am known for taking unique or unusual approaches to get results.

| Disagree | No opinion | Agree |
|---|---|---|
| 1 | 2 | 3 |

(R7)

16. I have often been recognized for my ability to get others to say yes.

| Disagree | No opinion | Agree |
|---|---|---|
| 1 | 2 | 3 |

(R18)

17. I have often been acknowledged for my ability to write proposals, reports, newsletters, articles or other business documents.

| Disagree | No opinion | Agree |
|---|---|---|
| 1 | 2 | 3 |

(R8)

18. I have often been acknowledged for going the extra mile to satisfy customers.

| Disagree | No opinion | Agree |
|---|---|---|
| 1 | 2 | 3 |

(R9)

19. I have often been invited back to speak to the same group.

| Disagree | No opinion | Agree |
|---|---|---|
| 1 | 2 | 3 |

(R15)

20. In the past, I have always been one of the first to get on board when changes occur.

| Disagree | No opinion | Agree |
|---|---|---|
| 1 | 2 | 3 |

| SECTION THREE |
|---|

21. I have been criticized for being too competitive.  (R14)

| Disagree | No opinion | Agree |
|---|---|---|
| 1 | 2 | 3 |

22. I have often been acknowledged for my attention to detail.  (R12)

| Disagree | No opinion | Agree |
|---|---|---|
| 1 | 2 | 3 |

23. I have been criticized for not handling sensitive organizational issues very well.  (K13)

| Disagree | No opinion | Agree |
|---|---|---|
| 1 | 2 | 3 |

24. I have often been acknowledged for my ability to handle sensitive organizational issues.  (R13)

| Disagree | No opinion | Agree |
|---|---|---|
| 1 | 2 | 3 |

25. I have often accomplished things others didn't believe I could.  (R14)

| Disagree | No opinion | Agree |
|---|---|---|
| 1 | 2 | 3 |

26. I have a reputation for delivering powerful presentations.  (R15)

| Disagree | No opinion | Agree |
|---|---|---|
| 1 | 2 | 3 |

27. I have often been recognized for my ability to turn things around financially.  (R16)

| Disagree | No opinion | Agree |
|---|---|---|
| 1 | 2 | 3 |

28. I have been criticized for holding people accountable for their actions.  (R16)

| Disagree | No opinion | Agree |
|---|---|---|
| 1 | 2 | 3 |

29. I have often played a key role in negotiating significant contracts or agreements.  (R17)

| Disagree | No opinion | Agree |
|---|---|---|
| 1 | 2 | 3 |

30. It's been said that I could sell ice to Eskimos.  (R18)

| Disagree | No opinion | Agree |
|---|---|---|
| 1 | 2 | 3 |

31. I am known for overcoming significant obstacles to reach goals.  (R11)

| Disagree | No opinion | Agree |
|---|---|---|
| 1 | 2 | 3 |

Fig.12I

SECTION THREE

32. I have often been recognized for my contributions to the disadvantaged.   (R19)

| Disagree | No opinion | Agree |
|---|---|---|
| 1 | 2 | 3 |

33. I have been recognized for my ability to resolve conflict in the workplace.   (R4)

| Disagree | No opinion | Agree |
|---|---|---|
| 1 | 2 | 3 |

34. Others consider me a resource for knowledge.   (R20)

| Disagree | No opinion | Agree |
|---|---|---|
| 1 | 2 | 3 |

35. My ability to get along with people has been a key to my greatest accomplishments   (R5)

| Disagree | No opinion | Agree |
|---|---|---|
| 1 | 2 | 3 |

36. I have a reputation for using a disciplined approach to collecting and analyzing data to define, diagnose and resolve problems.   (R6)

| Disagree | No opinion | Agree |
|---|---|---|
| 1 | 2 | 3 |

37. I have a history of championing futuristic ideas when others predicted failure.   (R21)

| Disagree | No opinion | Agree |
|---|---|---|
| 1 | 2 | 3 |

38. I am known for acknowledging the contributions of every member of the team.   (R3)

| Disagree | No opinion | Agree |
|---|---|---|
| 1 | 2 | 3 |

39. Even outside of work, I am frequently asked to take a leadership role.   (R1)

| Disagree | No opinion | Agree |
|---|---|---|
| 1 | 2 | 3 |

40. I am known for my ability to calm people who are emotionally upset.   (R4)

| Disagree | No opinion | Agree |
|---|---|---|
| 1 | 2 | 3 |

41. I have often been acknowledged for my role in training and/or developing others.   (R2)

| Disagree | No opinion | Agree |
|---|---|---|
| 1 | 2 | 3 |

42. I have often been recognized for coming up with new ideas, methods or processes that improved results.   (R7)

| Disagree | No opinion | Agree |
|---|---|---|
| 1 | 2 | 3 |

Fig.12J

| SECTION THREE |
|---|

43. I have often been recognized for doing a good job of editing other people's writing.  (R8)

| Disagree | No opinion | Agree |
|---|---|---|
| 1 | 2 | 3 |

44. I am known for standing up for customers.  (R9)

| Disagree | No opinion | Agree |
|---|---|---|
| 1 | 2 | 3 |

45. I have often been acknowledged for my ability to adapt quickly to changes.  (R10)

| Disagree | No opinion | Agree |
|---|---|---|
| 1 | 2 | 3 |

46. I have a reputation for always being prepared.  (R12)

| Disagree | No opinion | Agree |
|---|---|---|
| 1 | 2 | 3 |

47. I have often been recognized for my ability to maintain my composure in emotionally charged situations.  (R23)

| Disagree | No opinion | Agree |
|---|---|---|
| 1 | 2 | 3 |

48. I have often been recognized for my ability to make good decisions under pressure.  (R22)

| Disagree | No opinion | Agree |
|---|---|---|
| 1 | 2 | 3 |

49. People will verify that I rarely, if ever, attempt to resolve a problem without a disciplined approach to gathering and analyzing the appropriate data first.  (R6)

| Disagree | No opinion | Agree |
|---|---|---|
| 1 | 2 | 3 |

50. I have often been recognized for my ability to manage my time and priorities well.  (R23)

| Disagree | No opinion | Agree |
|---|---|---|
| 1 | 2 | 3 |

Fig.12K

| §2 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| Competency # | | | | | | | | | | | | | | | | | | | | | | | |
| R | 2 | 2 | 2 | 3 | 2 | 2 | 2 | 2 | 2 | 2 | 2 | 2 | 2 | 2 | 2 | 2 | 2 | 2 | 2 | 2 | 2 | 2 | 2 |
| K | 2 | 1 | 1 | 1 | 2 | 1 | 2 | 1 | 1 | 2 | 1 | 1 | 1 | 1 | 1 | | 2 | 2 | 2 | 1 | 2 | 2 | 2 |
| P | | 1 | 1 | | | 1 | | 1 | 1 | | 1 | 1 | 1 | 1 | 1 | 2 | | | | 1 | | | |

Fig. 13

PERSONAL COMPETENCY INVENTORY

A REPORT ON

John Doe
Candidate for Position of
Sales Representative

CANDIDATE STRENGTHS

The information in this report is based solely on the analysis of the candidate's responses to the PERSONAL COMPETENCY INVENTORY (PCI) questionnaire. Candidates are instructed to respond to the PCI questionnaire as honestly as possible to ensure a suitable fit between their strengths and position requirements.

The following competencies are listed in order of the candidate's strengths. It is highly recommended that hiring authorities confirm the candidate's competency strengths during screening and selection interviews. Sample interview questions are provided in the CPP report. For additional assistance in designing and implementing selection, performance management and succession planning processes please contact "http://www.dnaskills.com"

1. Self Management
2. Decision Making
3. Futuristic Thinking
4. Continuous Learning
5. Empathy
6. Persuasion
7. Negotiation
8. Management
9. Presenting
10. Personal Effectiveness
11. Diplomacy
12. Planning/Organizing
13. Goal Orientation
14. Flexibility
15. Customer Service
16. Written Communication
17. Creativity/Innovation
18. Problem Solving
19. Interpersonal Skills
20. Conflict Management
21. Teamwork
22. Employee Development/Coaching
23. Leadership

Fig.14B

Competency DNA Discovery 360 Feedback

Subject: Joan Lark     Reference Number: 491     Self

Please take a few minutes to complete this survey about your day-to-day practices.

As you complete this survey, please remember:

> You will be asked to answer TWO QUESTIONS for each of the behaviors:
>
> "How often does it occur?" - You should indicate how often you perform the behavior now.
>
> "How often should it occur?" - You should indicate how often you should perform the behavior.

Be sure to answer BOTH QUESTIONS for each practice.

There are no "Right" or "Wrong" answers. Just try to be fair and honest.

| RETURN BY |
|---|
| 1/6/2000 |

Please complete this survey based upon your interactions with others.

| Choose ONE in EACH Column | |
|---|---|
| PERFORMANCE | EXPECTATIONS |

PERFORMANCE: How often do you...
EXPECTATIONS: How often should you...

Rating scale (for each column): Almost Never / Sometimes / Generally / Almost Always / Always 1. Demonstrate loyalty to constituents
2. Obtain commitment from others to a vision or mission
3. Inspire and lead others to achieve results
4. Involve others in decisions which affect them
5. Inspire loyalty and the willingness to take risks 6. Identify and address issues limiting team effectiveness
7. Contribute to team effectiveness
8. Follow through on team commitments and responsibilities
9. Demonstrate loyalty to team members
10. Make team goals and objectives a priority 11. Utilize logical systems and methodologies to diagnose and define problems...
12. Anticipate barriers and/or problems
13. Select best solution based on analysis of data
14. Gather and evaluate all relevant input before selecting optimum solutions to problems
15. Objectively analyze data to determine cause, scope and impact of problems

| PERFORMANCE | EXPECTATIONS |
|---|---|
| COMPLETE BOTH COLUMNS | |

Fig.15

Competency DNA Discovery 360 Feedback

Subject: Joan Lark        Reference Number: 493        Boss

Please take a few minutes to complete this CONFIDENTIAL SURVEY about the day-to-day practices of the person whose name is listed above. Unless you are the immediate supervisor of this person, your responses will be combined with the responses of others and not individually identified.

As you complete this survey, please remember:

You will be asked to answer TWO QUESTIONS for each of the practices:

"How often does it occur?" - Indicate how often you believe the practice occurs NOW.

"How often should it occur?" - Indicate how often you EXPECT or believe the practice should occur.

Be sure to answer BOTH QUESTIONS for each practice.

There are no "Right" or "Wrong" answers. Just try to be fair and honest.

| RETURN BY |
|---|
| 1/6/2000 |

SKIP ANY PRACTICE you have not observed or about which you can't make a judgment.

Please complete each question based upon your observations and interactions with this person.

| Choose ONE in EACH Column | |
|---|---|
| PERFORMANCE | EXPECTATIONS |

PERFORMANCE: How often does this person...
EXPECTATIONS: How often should this person...

Rating scale (for each of PERFORMANCE and EXPECTATIONS): Almost Never / Sometimes / Generally / Almost Always / Always 1. Demonstrate loyalty to constituents
2. Obtain commitment from others to a vision or mission
3. Inspire and lead others to achieve results
4. Involve others in decisions which affect them
5. Inspire loyalty and the willingness to take risks 6. Identify and address issues limiting team effectiveness
7. Contribute to team effectiveness
8. Follow through on team commitments and responsibilities
9. Demonstrate loyalty to team members
10. Make team goals and objectives a priority 11. Utilize logical systems and methodologies to diagnose and define problems
12. Anticipate barriers and/or problems
13. Select best solution based on analysis of data
14. Gather and evaluate all relevant input before selecting optimum solutions to problems
15. Objectively analyze data to determine cause, scope and impact of problems

| PERFORMANCE | EXPECTATIONS |
|---|---|
| COMPLETE BOTH COLUMNS | |

Fig.16

Competency DNA Discovery 360 Feedback

Subject: Joan Lark          Reference Number: 495          Team

Please take a few minutes to complete this CONFIDENTIAL SURVEY about the day-to-day practices of the person whose name is listed above. Unless you are the immediate supervisor of this person, your responses will be combined with the responses of others and not individually identified.

As you complete this survey, please remember:

You will be asked to answer TWO QUESTIONS for each of the practices:

"How often does it occur?" - Indicate how often you believe the practice occurs NOW.

"How often should it occur?" - Indicate how often you EXPECT or believe the practice should occur.

Be sure to answer BOTH QUESTIONS for each practice.

There are no "Right" or "Wrong" answers. Just try to be fair and honest.

| RETURN BY |
|---|
| 1/6/2000 |

SKIP ANY PRACTICE you have not observed or about which you can't make a judgment.

Please complete each question based upon your observations and interactions with this person.

| Choose ONE in EACH Column | |
|---|---|
| PERFORMANCE | EXPECTATIONS |

PERFORMANCE: How often does this person...
EXPECTATIONS: How often should this person...

|  | Almost Never | Sometimes | Generally | Almost Always | Always | Almost Never | Sometimes | Generally | Almost Always | Always |
|---|---|---|---|---|---|---|---|---|---|---|
| 1. Demonstrate loyalty to constituents | ■ | □ | ■ | □ | ■ | ■ | □ | ■ | □ | ■ |
| 2. Obtain commitment from others to a vision or mission | ■ | □ | ■ | □ | ■ | ■ | □ | ■ | □ | ■ |
| 3. Inspire and lead others to achieve results | ■ | □ | ■ | □ | ■ | ■ | □ | ■ | □ | ■ |
| 4. Involve others in decisions which affect them | ■ | □ | ■ | □ | ■ | ■ | □ | ■ | □ | ■ |
| 5. Inspire loyalty and the willingness to take risks | ■ | □ | ■ | □ | ■ | ■ | □ | ■ | □ | ■ |
| 6. Identify and address issues limiting team effectiveness | ■ | □ | ■ | □ | ■ | ■ | □ | ■ | □ | ■ |
| 7. Contribute to team effectiveness | ■ | □ | ■ | □ | ■ | ■ | □ | ■ | □ | ■ |
| 8. Follow through on team commitments and responsibilities | ■ | □ | ■ | □ | ■ | ■ | □ | ■ | □ | ■ |
| 9. Demonstrate loyalty to team members | ■ | □ | ■ | □ | ■ | ■ | □ | ■ | □ | ■ |
| 10. Make team goals and objectives a priority | ■ | □ | ■ | □ | ■ | ■ | □ | ■ | □ | ■ |
| 11. Utilize logical systems and methodologies to diagnose and define problems... | ■ ■ | □ □ | ■ ■ | □ □ | ■ ■ | ■ ■ | □ □ | ■ ■ | □ □ | ■ ■ |
| 12. Anticipate barriers and/or problems | ■ | □ | ■ | □ | ■ | ■ | □ | ■ | □ | ■ |
| 13. Select best solution based on analysis of data | ■ | □ | ■ | □ | ■ | ■ | □ | ■ | □ | ■ |
| 14. Gather and evaluate all relevant input before selecting optimum solutions to problems | ■ | □ | ■ | □ | ■ | ■ | □ | ■ | □ | ■ |
| 15. Objectively analyze data to determine cause, scope and impact of problems | ■ | □ | ■ | □ | ■ | ■ | □ | ■ | □ | ■ |

| PERFORMANCE | EXPECTATIONS |
|---|---|
| COMPLETE BOTH COLUMNS | |

Fig.17

BEHAVIORAL FEEDBACK

Competency DNA Discovery 360

Target Training International

Joan Lark

Thursday, December 23, 1999

Discovery 360° Feedback™

Fig.18A

| CATEGORY FEEDBACK |
|---|
December 23, 1999    Competency DNA Discovery 360    Joan Lark
CATEGORY REPORT
Leadership
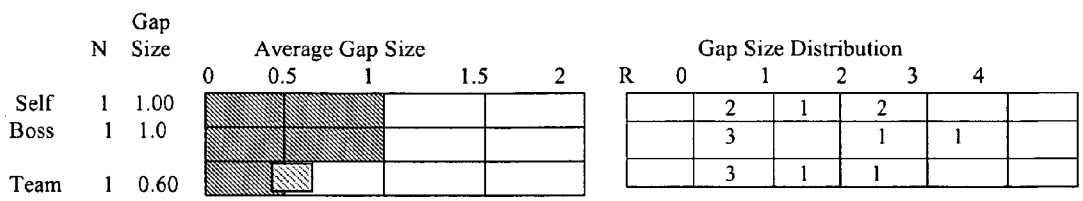
Teamwork
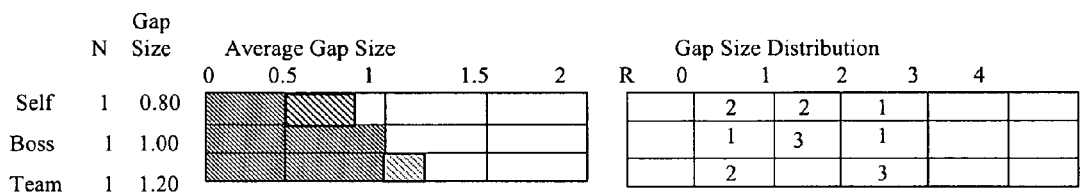
Problem Solving
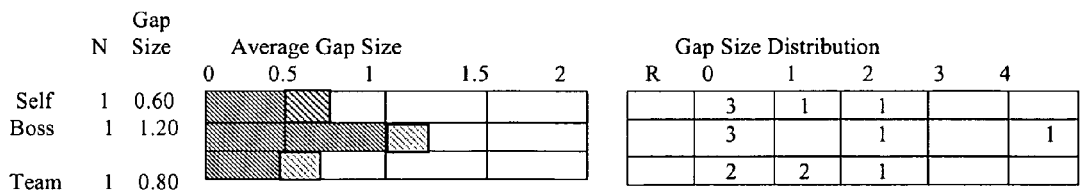
Fig.18B

INDIVIDUAL FEEDBACK

December 23, 1999     Competency DNA Discovery 360     Joan Lark

INDIVIDUAL PRACTICES REPORT

How often does this person......

| | | N | Gap Size | Average Gap Size (0 – 2) | R | Gap Size Distribution (0 – 4) |
|---|---|---|---|---|---|---|
| 1) Demonstrate Loyalty to Constituents | Self | 1 | 2.00 | | | 1 at 2 |
| | Boss | 1 | 0.00 | | | 1 at 0 |
| | Team | 1 | 0.00 | | | 1 at 0 |
| 2) Obtain Commitment From others to a Vision or mission | Self | 1 | 2.00 | | | 1 at 2 |
| | Boss | 1 | 0.00 | | | 1 at 0 |
| | Team | 1 | 1.00 | | | 1 at 1 |
| 3) Inspire and lead others to achieve Results | Self | 1 | 0.00 | | | 1 at 0 |
| | Boss | 1 | 3.00 | | | 1 at 3 |
| | Team | 1 | 2.00 | | | 1 at 2 |
| 4) Involve others in decisions which Affect them | Self | 1 | 0.00 | | | 1 at 0 |
| | Boss | 1 | 2.00 | | | 1 at 2 |
| | Team | 1 | 0.00 | | | 1 at 0 |
| 5) Inspire loyalty and the willingness to take risks | Self | 1 | 1.00 | | | 1 at 1 |
| | Boss | 1 | 0.00 | | | 1 at 0 |
| | Team | 1 | 0.00 | | | 1 at 0 |
| 6) Identify and address issues limiting team effectiveness | Self | 1 | 1.00 | | | 1 at 1 |
| | Boss | 1 | 1.00 | | | 1 at 1 |
| | Team | 1 | 2.00 | | | 1 at 2 |
| 7) Contribute to team effectiveness | Self | 1 | 0.00 | | | 1 at 0 |
| | Boss | 1 | 2.00 | | | 1 at 2 |
| | Team | 1 | 0.00 | | | 1 at 0 |
| 8) Follow through on team commitments and responsibilities | Self | 1 | 0.00 | | | 1 at 0 |
| | Boss | 1 | 1.00 | | | 1 at 1 |
| | Team | 1 | 2.00 | | | 1 at 2 |
| 9) Demonstrate loyalty to team members | Self | 1 | 2.00 | | | 1 at 2 |
| | Boss | 1 | 1.00 | | | 1 at 1 |
| | Team | 1 | 2.00 | | | 1 at 2 |

Fig.18C

| OVERVIEW FEEDBACK |
|---|

December 23, 1999    Competency DNA Discovery 360    Joan Lark

OVERVIEW REPORT

STRENGTHS/BOSS

The following are your Strengths. These practices have the smallest average gap size. Continue performing these in the manner you are performing them.

| Practice | Gap size |
|---|---|
| 1) Demonstrate loyalty to constituents | 0.00 |
| 2) Obtain commitment from others to a vision or mission | 0.00 |
| 5) Inspire loyalty and the willingness to take risks | 0.00 |
| 10) Make team goals and objectives a priority | 0.00 |
| 11) Utilize logical systems and methodologies to diagnose and define problems | 0.00 |

POSSIBLE DEVELOPMENTAL NEEDS/BOSS

The following are your Developmental Needs. These practices have the largest average gap sizes.

| Practice | Gap Size | |
|---|---|---|
| 13) Select best solution based on analysis of data | 4.00 | Check |
| 3) Inspire and lead others to achieve results | 3.00 | Check |
| 12) Anticipate barriers and/or problems | 2.00 | |
| 7) Contribute to team effectiveness | 2.00 | |
| 4) Involve others in decision which affect them | 2.00 | |

Examine each of these practices to see how many people answered each question. Also examine the Gap Distribution data to locate the degree of change desired by the majority.

Select priorities to develop by considering the importance of the practice and your ability to make the changes people desire.

Fig.18E

| OVERVIEW FEEDBACK |
|---|

<u>December 23, 1999</u>  <u>Competency DNA Discovery 360</u>  <u>Joan Lark</u>
OVERVIEW REPORT

STRENGTHS/TEAM

The following are your Strengths. These practices have the smallest average gap size. Continue performing these in the manner you are performing them.

| Practice | Gap size |
|---|---|
| 1) Demonstrate loyalty to constituents | 0.00 |
| 4) Involve others in decisions which affect them | 0.00 |
| 5) Inspire loyalty and the willingness to take risks | 0.00 |
| 7) Contribute to team effectiveness | 0.00 |
| 10) Make team goals and objectives a priority | 0.00 |

POSSIBLE DEVELOPMENTAL NEEDS/TEAM

The following are your developmental needs. These practices have the largest average gap sizes.

| Practice | Gap Size |
|---|---|
| 14) Gather and evaluate all relevant input before selecting optimum solutions to problems | 2.00 |
| 9) Demonstrate loyalty to team members | 2.00 |
| 8) Follow through on team commitments and responsibilities | 2.00 |
| 6) Identify and address issues limiting team effectiveness | 2.00 |
| 3) Inspire and lead others to achieve results | 2.00 |

Examine each of these practices to see how many people answered each question. Also examine the Gap Distribution data to locate the degree of change desired by the majority.

Select priorities to develop by considering the importance of the practice and your ability to make the changes people desire.

Fig.18F

FEEDBACK REPORT

December 23, 1999     Competency DNA Discovery 360   Joan Lark

SUMMARY REPORT

RESPONSES FROM BOSS

The following list displays the practices on the survey for this group arranged by Average Gap Size.

| Practice | Gap Size |
|---|---|
| 1) Demonstrate loyalty to constituents............................................................ | 0.00 |
| 2) Obtain commitment from others to a vision or mission............................... | 0.00 |
| 5) Inspire loyalty and the willingness to take risks......................................... | 0.00 |
| 10) Make team goals and objectives a priority................................................ | 0.00 |
| 11) Utilize logical systems and methodologies to diagnose and define problems................................................................................................... | 0.00 |
| 14) Gather and evaluate all relevant input before selecting optimum solutions to problems............................................................................... | |
| 15) Objectively analyze data to determine cause, scope and impact of problems................................................................................................... | 0.00 |
| 6) Identify and address issues limiting team effectiveness............................... | 1.00 |
| 8) Follow through on team commitments and responsibilities......................... | 1.00 |
| 9) Demonstrate loyalty to team members........................................................ | 1.00 |
| 4) Involve others in decisions which affect them............................................ | 2.00 |
| 7) Contribute to team effectiveness................................................................. | 2.00 |
| 12) Anticipate barriers and/or problems.......................................................... | 2.00 |
| 3) Inspire and lead others to achieve results.................................................... | 3.00 Check |
| 13) Select best solution based on analysis of data............................................ | 4.00 Check |

FIG.18G

FEEDBACK REPORT

December 23, 1999     Competency DNA Discovery 360     Joan Lark

SUMMARY REPORT

RESPONSES FROM TEAM

The following list displays the practices on the survey for this group arranged by Average Gap Size.

| Practice | Gap Size |
|---|---|
| 1) Demonstrate loyalty to constituents | 0.00 |
| 4) Involve others in decisions which affect them | 0.00 |
| 5) Inspire loyalty and the willingness to take risks | 0.00 |
| 7) Contribute to team effectiveness | 0.00 |
| 10) Make team goals and objectives a priority | 0.00 |
| 13) Select best solution based on analysis of data | 0.00 |
| 15) Objectively analyze data to determine cause, scope and impact of problems | 0.00 |
| 2) Obtain commitment from others to a vision or mission | 1.00 |
| 11) Utilize logical systems and methodologies to diagnose and define problems | 1.00 |
| 12) Anticipate barriers and /or problems | 1.00 |
| 3) Inspire and lead others to achieve results | 2.00 |
| 6) Identify and address issues limiting team effectiveness | 2.00 |
| 8) Follow through on team commitments and responsibilities | 2.00 |
| 9) Demonstrate loyalty to team members | 2.00 |
| 14) Gather and evaluate all relevant input before selecting optimum solutions to problems | 2.00 |

FIG.18H

| FEEDBACK REPORT |
| --- |

| December 23, 1999 | Competency DNA Discovery 360 | Joan Lark |
| --- | --- | --- |

SUMMARY REPORT

For the practices with the largest Gap Sizes, examine each practice to see how many people completed the surveys and the degree of change desired by the majority.

In selecting priorities for development, also consider the importance of the practices, and your ability to make the changes people desire.

FIG.18I

| BEHAVIORAL FEEDBACK |
|---|

Competency DNA Discovery 360

Target Training International

Joan Lark

Thursday, December 23, 1999

Discovery 360° Feedback™

FIG. 19A

BEHAVIORAL FEEDBACK

December 23, 1999   Competency DNA Discovery 360   Joan Lark

COMPARATIVE REPORT

Current Data: 6/14/2000

Previous Data: 12/23/1999

| | | N Gap Size | Average Gap Size (0 – 2) | |
|---|---|---|---|---|
| 11) Utilize logical systems and methodologies to diagnose and define problems | Self | 1  2.00 | | Develop |
| | | 1  0.00 | | |
| | Boss | 1  2.00 | | Develop |
| | | 1  0.00 | | |
| | Team | 1  2.00 | | Develop |
| | | 1  1.00 | | |
| 12) Anticipate barriers and/or problems | Self | 1  2.00 | | Develop |
| | | 1  2.00 | | |
| | Boss | 1  2.00 | | Develop |
| | | 1  2.00 | | |
| | Team | 1  2.00 | | Develop |
| | | 1  1.00 | | |
| 13) Select best solution based on analysis of data | Self | 1  2.00 | | Develop |
| | | 1  1.00 | | Develop |
| | Boss | 1  2.00 | | |
| | | 1  4.00 | | Develop |
| | Team | 1  2.00 | | |
| | | 1  0.00 | | |
| 14) Gather and evaluate all relevant input before selecting optimum solutions to problems | Self | 1  2.00 | | |
| | | 1  0.00 | | Develop |
| | Boss | 1  2.00 | | Develop |
| | | 1  0.00 | | |
| | Team | 1  2.00 | | Develop |
| | | 1  2.00 | | |
| 15) Objectively analyze data to determine cause, scope and impact of problems | Self | 1  2.00 | | |
| | | 1  0.00 | | Develop |
| | Boss | 1  2.00 | | |
| | | 1  0.00 | | Develop |
| | Team | 1  2.00 | | |
| | | 1  0.00 | | Develop |

FIG.19D

Sample (completed)
Structured Interview Candidate Record
Position: Office Manager          Candidate: John Doe

Top 5 Competencies from DNA Report

<u>Weight</u> = How important a competency is in relation to other competencies.
<u>Rating</u> = How a candidate scores on demonstrated examples of a competency.
<u>W x R</u> = The Weight of the competency multiplied by the candidate's Rating

| Competency/ Selection Criteria | Weight 5-1 | Rating 5-1 | Score W x R | Reason for Rating |
|---|---|---|---|---|
| Leadership/Management | 5 | 2 | 10 | His only example of achieving results through others was the Boy Scout Fundraiser. |
| Goal Orientation | 4 | 3 | 12 | Put himself through college. His drive to get the new product launched despite obstacles demonstrated a fair amount of goal orientation. |
| Teamwork | 3 | 3 | 9 | Working with four departments, he constantly spoke highly of his team's results. Defended team efforts when challenged. |
| Conflict Management | 2 | 1 | 2 | Wasn't able to describe his role in the conflict with his former boss. Asking HR to help him shows lack of competency. |
| Continuous Learning | 1 | 2 | 2 | His outside reading, participation in association conferences and his incorporation of concepts he learned demonstrates competency in continuous learning. |
| Total Score | | | 35 | |

Weight of the Competency
5=most important
1=least important

Rating of the candidate's answers to the competency questions.
5=Excellent    1=Poor Weight X Rating = Total score per competency Notes on candidate's responses to the interview questions.

Total score for the candidate

FIG. 20A

Sample (Completed) Structured Interview Candidate Record
Position: Office Manager      Candidate: Jane Smith

Weight = How important a competency is in relation to other competencies.
Rating = How a candidate scores on demonstrated examples of a competency.
W x R = The Weight of the competency multiplied by the candidate's Rating

| Competency/ Selection Criteria | Weight 5-1 | Rating 5-1 | Score W x R | Reason for Rating |
|---|---|---|---|---|
| Leadership/Management | 5 | 4 | 20 | Her turn around of the department with such low morale demonstrated a significant amount of leadership. |
| Goal Orientation | 4 | 3 | 12 | Her persistence in achieving her career goal with the organization despite its financial difficulties and her achievements in cost-cutting demonstrated competency in goal orientation. |
| Teamwork | 3 | 3 | 9 | Her work with each of the departments while they reorganized and her achievements with them in cost cutting projects demonstrated significant teamwork competency. |
| Conflict Management | 2 | 2 | 4 | Her role in resolving the dispute between the receptionist and the sales manager demonstrated an ability to mediate. |
| Continuous Learning | 1 | 2 | 2 | Her self-taught knowledge of software applications as well as her use of Community College resources demonstrated a competency in continuous learning. |
|  |  |  |  |  |
|  |  |  |  |  |
| Total Score |  |  | 47 |  |

Copyright 1998 – 1999 Susan Fronk & Bill J. Bonnstetter

FIG. 21

Sample (completed)

Structured Interview Candidate Record

Position: Office Manager          Candidate: Len Wu

Weight = How important a competency is in relation to other competencies.
Rating = How a candidate scores on demonstrated examples of a competency.
W x R = The Weight of the competency multiplied by the candidate's Rating

| Competency/ Selection Criteria | Weight 5-1 | Rating 5-1 | Score W x R | Reason for Rating |
|---|---|---|---|---|
| Leadership/Management | 5 | 3 | 15 | His story about how he motivated the team to go further than their project scope demonstrated a fair amount of leadership. |
| Goal Orientation | 4 | 4 | 16 | His tenacity in getting his green card and starting a small business to support himself demonstrates a significant amount of gal orientation. |
| Teamwork | 3 | 3 | 9 | His story about helping the team get back on track after their failed project demonstrated a high level of team work competency. |
| Conflict Management | 2 | 3 | 6 | Len's role in resolving his conflict with his boss showed a high degree of conflict management competency. |
| Continuous Learning | 1 | 2 | 2 | Len's independent correspondence coursework in contract law demonstrates a high degree of learning competency. |
|  |  |  |  |  |
|  |  |  |  |  |
| Total Score |  |  | 48 |  |

Copyright 1998 – 1999 Susan Fronk & Bill J. Bonnstetter

FIG. 22

Sample
Structured Interview Candidate Comparison

| Competency/ Selection Criteria | Leadership/ Management | Goal Orientation | Teamwork | Conflict Management | Continuous Learning | | | | | |
|---|---|---|---|---|---|---|---|---|---|---|
| Weight x Rating (W x R) | W x R | W x R | W x R | W x R | W x R | | | | | |
| Candidates | | | | | | | | | | Total Score |
| John Doe | 10 | 12 | 9 | 2 | 2 | | | | | 35 |
| Jane Smith | 20 | 12 | 9 | 4 | 2 | | | | | 47 |
| Len Wu | 15 | 16 | 9 | 6 | 2 | | | | | 48 |
| | | | | | | | | | | |
| | | | | | | | | | | |
| | | | | | | | | | | |

Top 5 Competencies from DNA Report

Comparison of candidate's total scores

Comparison of each candidate's Individual competency score.

Copyright 1998 – 1999 Susan Fronk & Bill J. Bonnstetter

FIG. 23

POSITION ANALYSIS SYSTEM AND METHOD

I. CROSS-REFERENCE TO RELATED APPLICATION

This application claims the benefit of U.S. Provisional Application Ser. No. 60/115,300 filed Jan. 8, 1999.

II. INCORPORATION BY REFERENCE

The entire contents of U.S. Pat. No. 5,551,880, issued Sep. 3, 1996, are incorporated by reference herein.

III. BACKGROUND OF THE INVENTION

A. Field of the Invention

The present invention relates to a system and method of testing or interviewing persons for a particular job or work position, and in particular, to a system and method for improving the likelihood the person will perform highly in the particular job or assisting the person to increase performance in the particular job, particularly jobs that require human interaction.

B. Problems in the Art

It is difficult to accurately predict how successful a person will be in a particular job or work position. Traditional hiring practices involve reviewing a potential employee's resume and personally interviewing the candidate. Studies have found this a remarkably ineffective, or at least unpredictable, method of hiring highly performing individuals for particular jobs. For example, a recent university study suggests that while 90% of employees are hired by personal interviews, only 14% of those hired turn out to be highly successful in the particular job.

It is believed that the reason for the low success rate is due in part to human nature. Interviews have conscious or unconscious biases that effect judgment or ability to predict a success employee. Or interviewers do not know the important matters about the job and/or the person in relation to the job to effectively interview the potential employee. See, for example, Plotkin, Harris, "Building a Winning Team", Griffen Publishing, 544 Colorado Street, Glendale, Calif. (1997).

People have been using skills for selection of employees for years. However, they can not validate the process. They are biased and can not identify if they are measuring a skill, behavior or attitude, for example. If skills always led to performance, all CPA's, attorneys, medical doctor, nurses, engineers and artists would be successful. If intelligence always led to success, all valedictorians would be successful.

The behaviorist who has used behavior as a part of the selection process is biased and does not acknowledge the need to look at skills, intelligence, attitudes and beliefs.

The amount of people who understand and use attitudes for selection are biased and do not look at the other views either. Generally all the people who are involved in selection are biased and have trouble truly looking at a job or position the way they should be viewed. No one addresses the passions of individuals that can be met by certain jobs. Selection asks, "What does it take to be a key performer in a certain job?". While ways exist to measure talent, there has not been a way to be able to find a place to drop the talent in, i.e., match a job to the talent.

Numerous and increasing attempts have been made to create a system for hiring or identifying which persons will be successful for particular jobs. A number of testing systems have been developed and are in use. Many focus on the technical competency of the potential employee. Many focus purely on the behavioral characteristics of the employee.

One such system is described in U.S. Pat. No. 5,551,880 (incorporated by reference herein). This system extracts information from the potential employee through a questionnaire. In the case of this patent, the questionnaire probes the behavioral and value characteristics of the individual. Those characteristics are compared to behavioral and value characteristics that are exhibited by persons successful in the particular job. A computer can be used to keep track of the questionnaire answers, their ratings, and their comparison to standards, and a printout can be created which allows the employer to evaluate the potential employee to see if they match up with successful models for the job. Alternatively, the system can be used to test existing employees to see if they fit a job, or to help them improve in a job.

While the patented system described previously has been found to be a much better predictor of employee success for a job, there are still needs in the art. The previously described system is focused on the people and their characteristics. More emphasis, or at least significant emphasis on what characteristics the job requires, may lead to even better predictions of employee success.

There are currently discussions of "competency" for jobs. See, for example, Parry, Scott B., "Just What is a Competency?" June 1998 issue of TRAINING, pp. 58–63; Klein, Andrews, L., "Validity and Reliability for Competency-based system: Reducing Litigation Risks", Vol. 28, COMPENSATION & BENEFITS REVIEW, Jul. 17, 1996, pp. 31(7). While there is much discussion of competency, an effective way to measure the talent of a person and then find a job to maximize the talent of the person is not known.

Therefore, there is a real need in the art for an improvement regarding this question. It is therefore a principal object of the invention to provide a system and method that improves upon or solves the problems and deficiencies in the art.

The many attempts to shift the focus of inquiry from interviews and resumes to an evaluation of "competencies" of potential employees beg the question—how does one define "competencies" and which ones are relevant?

There is no agreement on these questions. Many attempts at using "competencies" mix hard skills, e.g. technical competencies, with what are sometimes called "soft skills", e.g. more behavioral related. Others come up with generalized, "one size fits all" approaches.

Some companies hire consultants to tailor competency models to a particular company or job.

The problems with present attempts include inaccuracy, biases, cost, and ineffectiveness. A "one size fits all" approach does not take into account that different jobs require different competencies. It also does not allow for differences in company goals or philosophies.

A significant problem in many present competency based systems is bias of the creator of the system. For example, no matter how experienced or educated, a consultant or system developer has patent or latent biases. They invariably show up in the definitions, questions, and processing of such systems. Also, a consultant many times is affected by what the consultant perceives as the desired outcome of the client.

Specific hiring of consultants is costly. Some charge several thousand dollars a day. A customized system for a company can cost tens of thousands of dollars. And, again, biases are likely.

Also, the effectiveness of present systems is questionable. Most are based primarily on the real or perceived needs of the company, and not upon the needs of the position. Therefore, many good candidates for effective or even superior performance in a position are not identified.

III. OBJECTS OF THE INVENTION

Therefore, there is a real need in the art for improvement in the way competencies are identified for good performance in a job or position.

The present invention provides a method and apparatus, which improves over or solves problems and deficiencies in the art.

Other objects, features and advantages of the present invention include, but are not limited to:
1. A focus on first defining a job by competencies and the most important competencies.
2. Utilization of such a defined job to (a) screen potential employees for the job, (b) evaluate existing employees in the job, (c) assist interviewer of job applicants ask the right questions, (d) develop employees, (e) develop strategies for matching employees to jobs, and/or (f) help with future business planning.
3. Has greater accuracy.
4. Is quicker.
5. Is economical.
6. Is more flexible.
7. Is reusable.
8. Diminishes or eliminates bias.
9. Assists in ultimate hiring decision.
10. Is adaptable to number of jobs/uses.
11. Can be computerized/automated.
12. Is useable with other methodologies.
13. Provides technology, methodologies and processes. for aligning the behaviors, attitudes and performance of individuals with organizational needs.
14. Identifies, calibrates and prioritizes the competencies required to produce superior performance relative to specific positions.
15. Includes a process for assessing an individual's performance against the competency requirements of their position.
16. Provides the framework for career development plans focused on developing the competencies required for superior performance.
17. Reinforces the behaviors necessary for superior performance.
18. Identifies the behaviors that may hinder superior performance.
19. Minimizes the time required to develop competency models.
20. Assists in the development of competency profiles that clarify job descriptions in terms of behavior.
21. Provides a job-related basis for coaching and mentoring.
22. Provides job-related links between the recruiting, selection and performance management processes for specific positions.
23. Can be implemented using paper and pencil, Intranet or Internet.
24. Provides methodologies for developing competency-based succession plans for key positions.
25. Provides the framework for tailoring training and development programs to individual needs.
26. Collects and interprets multiple inputs and perspectives on position requirements and performance issues.
27. Clarifies where training and development investments will be cost effective and where they may not be justified.
28. Provides insight into management or cultural biases on performance issues.
29. Provides information that can assist new hires to understand what behaviors they will need to demonstrate in a specific position.
30. Provides a framework for assessing the impact of internal or external changes on the behaviors necessary for performance in a specific position.
31. Assists organizations to develop a baseline for an inventory of their current workforce competencies.
32. Provides a competency-based framework for workforce planning.
33. Provides objective, job-specific language for appraising performance.
34. Assists in the development of a competency-based compensation system.
35. Provides a methodology for clarifying the shifts in importance of soft skill competencies between positions represented in career ladders or within job families.

These and other objects, features, and advantages of the present invention will become more apparent with the accompanying specification and claims.

IV. SUMMARY OF THE INVENTION

The present invention comprises a system and method for analyzing a job or work position and then evaluating applicants for the position to determine if their characteristics will make them high performers in the position. The present invention is particularly useful relative to jobs or positions that have human interaction, either with persons inside the company, e.g. coworkers, or persons outside the company, e.g. customers, suppliers, etc.

First, a set or family of characteristics, herein called Competencies, specifically related to observable behaviors in the workplace for most jobs or positions is defined.

Second, one or more persons familiar with the position, and preferably highly performing individuals in the position, are interrogated regarding the Set of Competencies. Optionally, not only are the individuals queried for skills needed to have high performance in the job, but also the values/attitudes and others traits or characteristics that seem to match up with high performance in the job. Other characteristics that can be tested are risks involved individually or for the company with the job, beliefs associated with high performers in the job, and intelligence.

Third, the responses are analyzed from the standpoint of the interrogations. The manner in which the Competencies relate to a given job can then be analyzed. At least some Competencies are related to skills, attitudes/values, and/or behavioral traits. Risks could also have identified factors, as could others, if desired. Biases are dealt with or removed by using observable behaviors in a job to define the job and by surveying a set of high performers relative to these observable behaviors.

From those Competencies, essential Competencies for the particular job can be identified. They are correlated with skills, attitudes/values, and/or behavioral traits.

From this key Competencies identification, a plan of action can be developed to better interview and identify those candidates for the job that are most likely to be high performers. Specific questions for interviews can be fashioned. If the key Competencies are identified in the candidate, the candidate is likely to be a high performer, even if the resume or the personal opinion of the interviewer suggests otherwise.

Alternatively, the report can be shared with existing employees or workers to assist them to develop the Competency for a certain job, or to assist them to improve in the present job with a very specific development program.

V. BRIEF DESCRIPTION OF THE DRAWINGS

FIGS. 3A to 3U are an example of a Position Survey used with the method of FIG. 2, including indicia to assist in an understanding of a method of processing the Position Survey.

FIGS. 4A and 4B are tables used in processing the Position Survey.

FIGS. 5A and 5B are tables used in processing the Position Survey.

FIGS. 6 A to 6AB are an example of a master Position Report used to create specific Position Reports for a variety of jobs or positions from results of a Position Survey.

FIGS. 7A to 7N are a hypothetical specific Position Report for a first job.

FIGS. 8A to 8P are a hypothetical specific Position Report for a second job.

FIGS. 9A to 9P are a hypothetical specific Position Report for a third job.

FIGS. 10A to 10P are a hypothetical specific Position Report for a fourth job.

Figure 11:
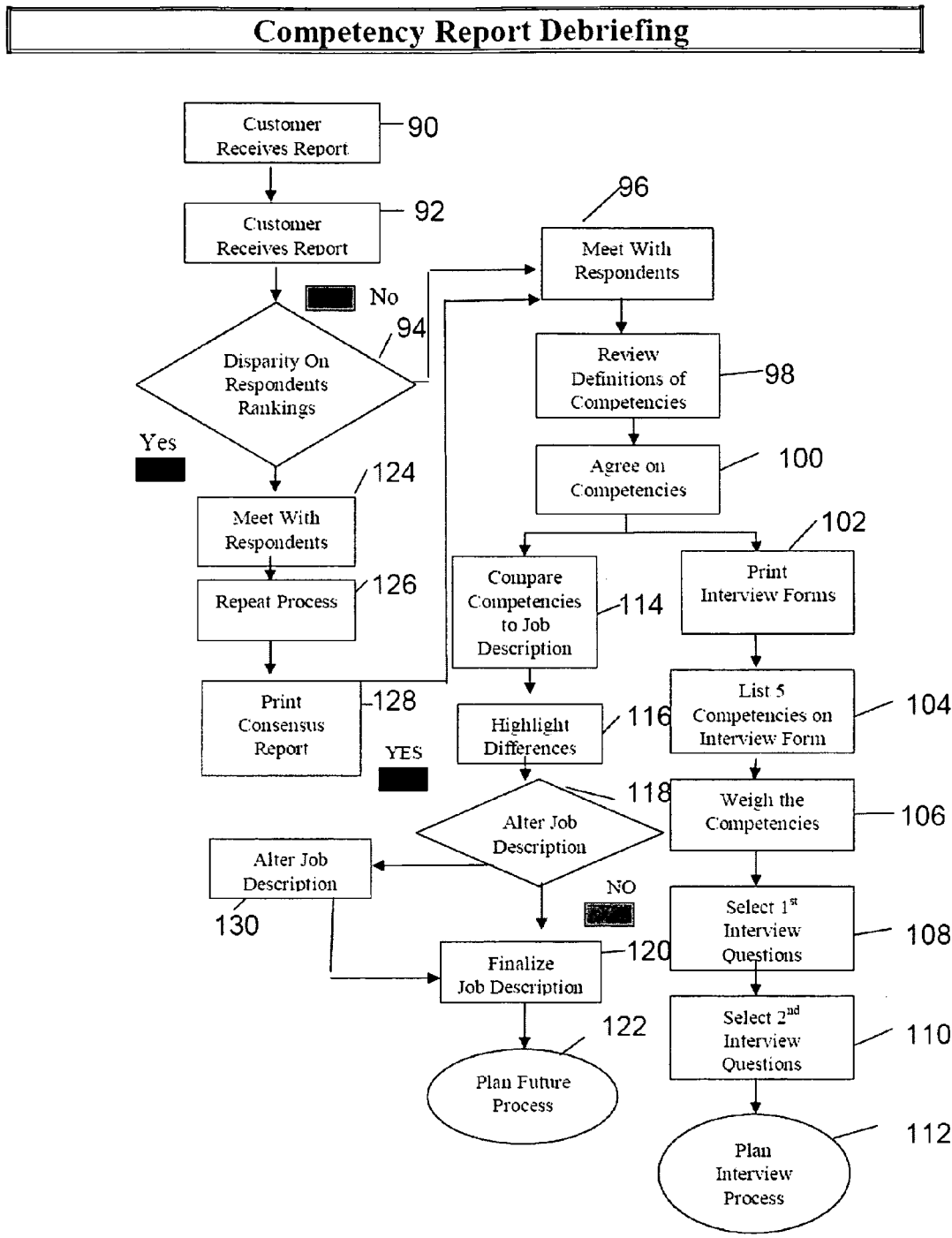
Figure 18D:
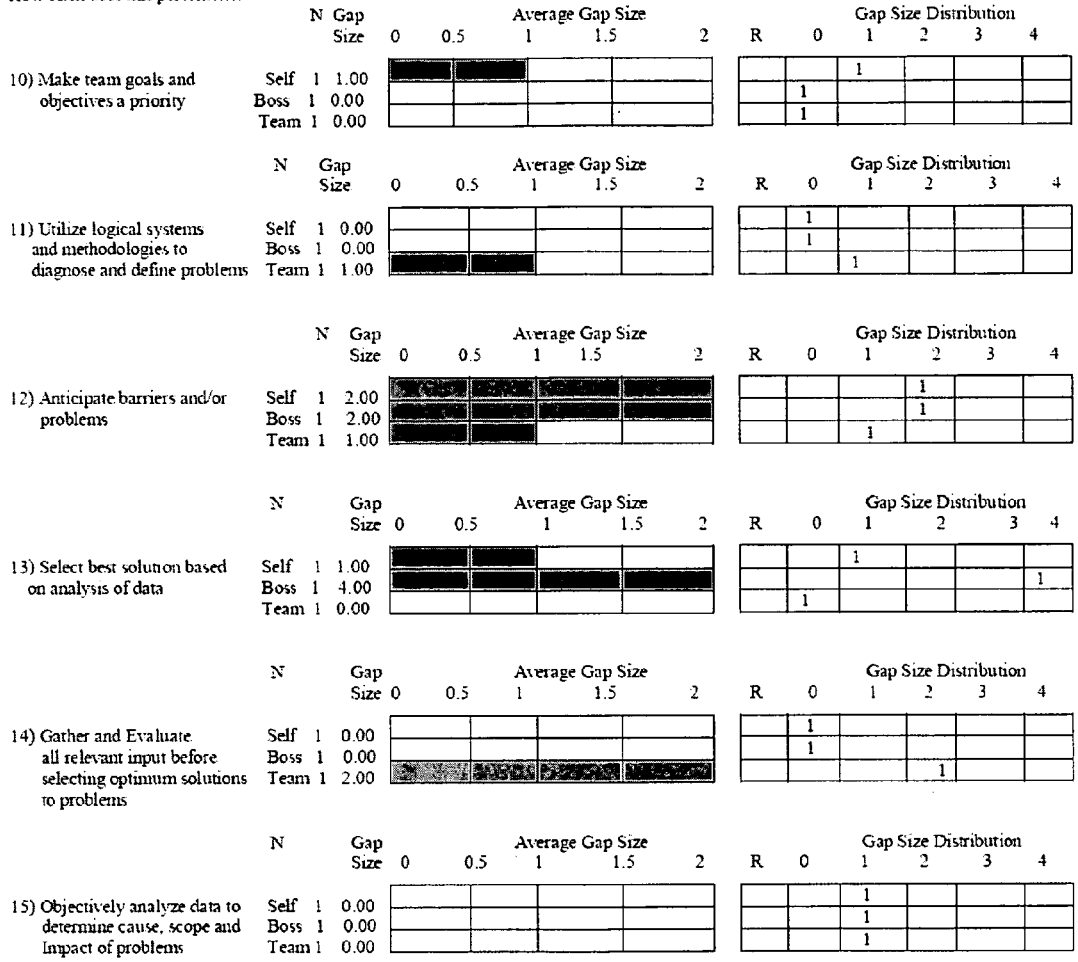
Figure 19B:
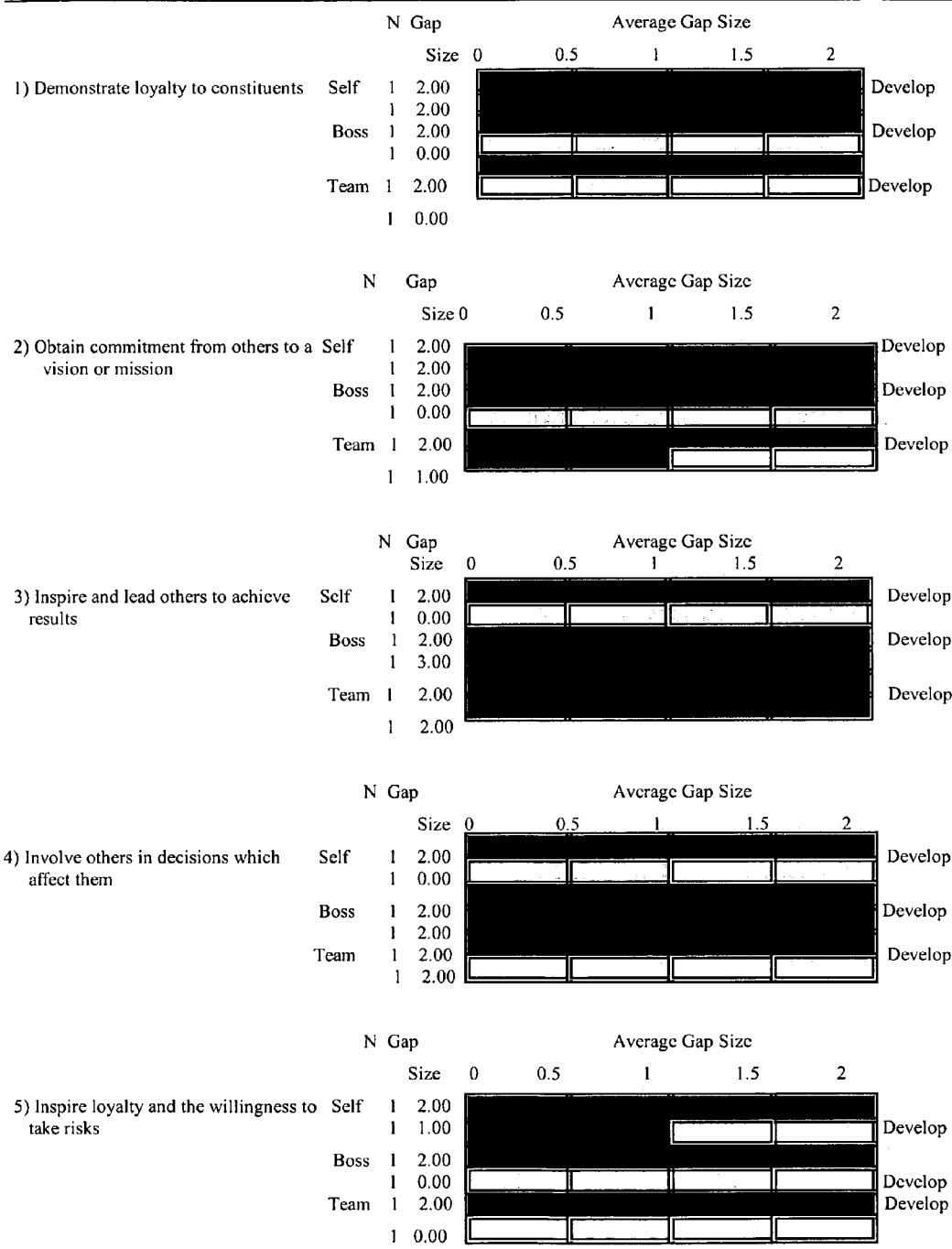
Figure 19C:
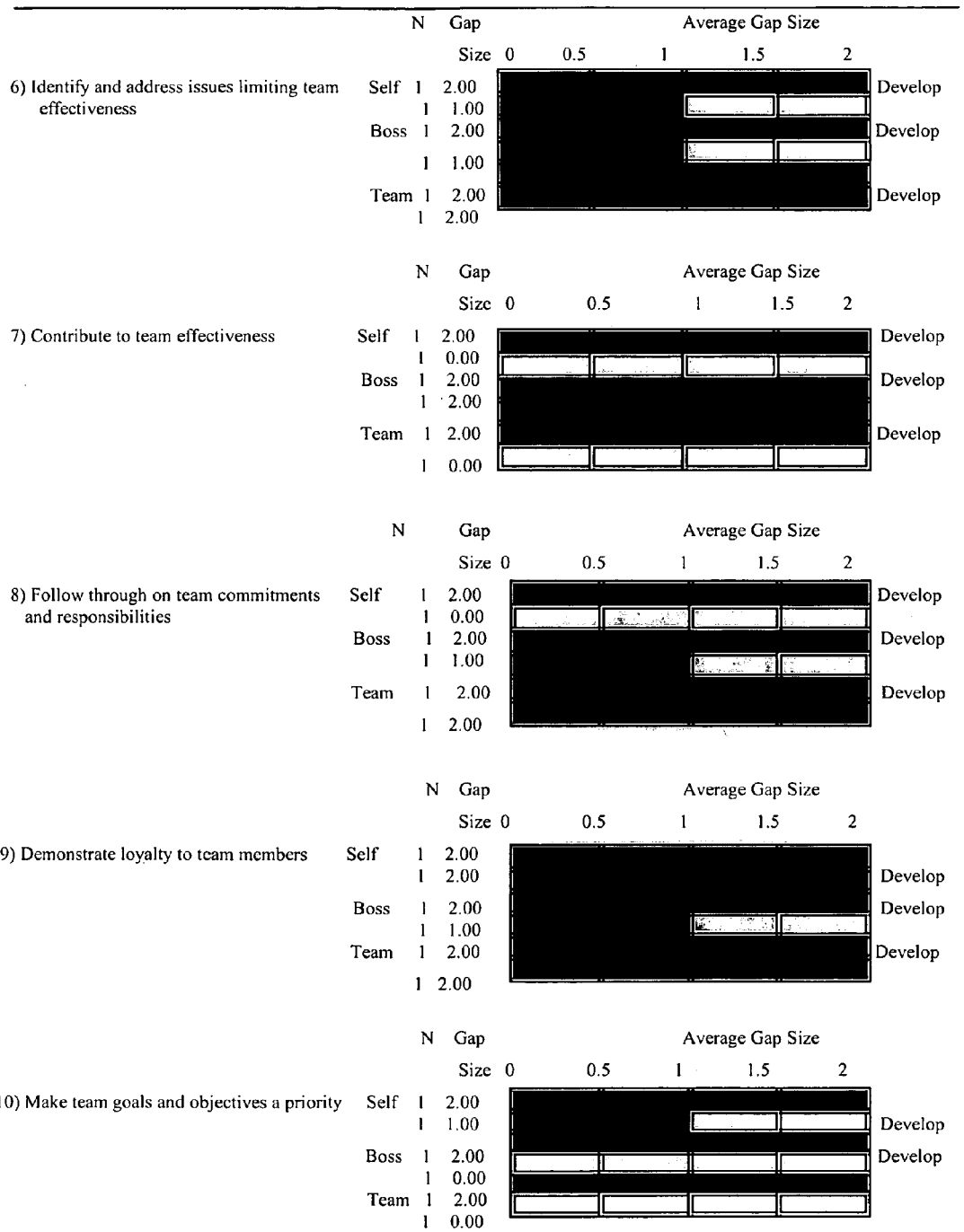

FIG. 11 is a flow chart for an optional procedure for validating a Position Report.

FIGS. 12A to 12K are an example of a Personal Competency Inventory that can be used with the method according to the invention, including indicia to assist in an understanding of a method of processing the Personal Competency Inventory.

FIG. 13 are tables used on processing of the Personal Competency Inventory.

FIGS. 14A and 14B are a hypothetical example of a Personal Competency Inventory Report.

FIG. 15 is an example of a Feedback Survey for a person performing the job.

FIG. 16 is an example of a Feedback Survey for the superior to the person performing the job.

FIG. 17 is an example of a Feedback Survey for peers, subordinates, or others relative to the person performing the job.

FIGS. 18A to 18I are a hypothetical example of a Feedback Report for a Feedback Survey of FIGS. 15–17.

FIGS. 19A to 19D are a hypothetical example of an additional Feedback Report for a Feedback Survey of FIGS. 15–17.

FIG. 20 is an example of a hypothetical Interview Record for a first job applicant that could be used with the invention.

FIG. 21 is an example of a hypothetical Interview Record for a second job applicant that could be used with the invention.

FIG. 22 is an example of a hypothetical Interview Record for a third job applicant that could be used with the invention.

FIG. 23 is an example of a hypothetical Interview Candidate Comparison used with FIGS. 20–22.

VI. DETAILED DESCRIPTION OF A PREFERRED EMBODIMENT

A. Overview

The preferred embodiment will be described with respect to analyzing a potential candidate for a position or job in a company. It is to be understood that the invention can be utilized for a variety of types of jobs or positions, indeed for most.

A set of observable behaviors, identified as being pertinent to most jobs is defined. This Set of Competencies is used to an analysis of the job or position in question. A questionnaire called a Position Survey (see FIG. 3) is created by this analysis using the Set of Competencies. The questionnaire is taken by people (subject mater experts) who know the job at issue.

Based upon the answers to the questions, which probe a variety of Competencies, a profile of the job is produced. By having these in hand, the company can interview applicants to find out which persons have not only the skills for the job, but also the behaviors, values/attitudes, and risk level for the company.

This allows a set of interview questions to be produced to pull out information from the interviewee to allow an unbiased assessment of whether the interviewee not only meets skills requirements but also most likely has the passion for the job. Stated differently, it is a way to characterize the job, not by technical competency alone, but also by what might be exciting and stimulating to certain types of people. It allows an almost automated way (bypassing interviewer biases) of identifying the right persons for the right job. Because the questionnaire of several high performers provides the blueprint for the right person for the job, when the person answers certain questions the right way during the interview, the interviewer basically just watches for those "right" answers, and when received is compelled to hire the person, even if the interviewers biases suggest otherwise.

U.S. Pat. No. 5,551,880 looked at behaviors and values based on what persons saw in themselves. The present invention profiles the job in more of a complete sense; i.e. not only behavior and values, but also skills needed and optionally, the intelligence and any hard skills. Still further, the point of reference of looking at these different areas is from the needs of the job, not from how people rate themselves about the job. It is relatively easy to match a person's skills with a job, but what about motivation? Does that person have the passion to do the best in the job? Applicants sometimes do not know their own competencies or are reluctant to disclose their weaknesses. The present invention bypasses these problems with traditional interviews by profiling the job for high performance, and then subtly, probing the interviewee both head-on (for skills) and obliquely (behavior traits, values/attitudes) to see if the person has the passion to highly perform in the job, even if demonstrating good skills and aptitude.

B. Environment

The embodiment described herein is used to either evaluate potential employees for a position in a company, to evaluate a current employee in a position within a company, or to evaluate a job or position in a company so that a more effective strategy of obtaining correct employees or more correctly planning the future of a company can be accomplished.

The described embodiment utilizes what is called in the art a "competency model". Such competency models have been widely discussed in the literature. For example, see Boyatzi, Richard, "The Competency Manager: A Mode For Effective Performance", John Wiley & Sons. (1982); and Spenser and Spenser, "Competence At Work", John Wiley & Sons (1993). As discussed previously herein, existing competency models do not agree with one another; and more importantly, focus on deriving competencies, no matter how defined, of a potential or existing employee.

The present invention starts with a definition of competencies that is based upon behaviors and values such as are defined in the co-owned, issued U.S. Pat. No. 5,551,880. Thus, the competencies are founded in the soft skills or more intangible aspects of a person's inherent make-up, as opposed to education, work experience, or technical ("hard") skills. Secondly, the methodology is based on first characterizing the job or position, as opposed to the person being evaluated for the job.

The invention can be useful in a number of ways. It will be first described with regard to evaluation of potential employees for a job.

C. Definitions

Some definitions will assist in an understanding of this description:

"Position" means a job in a given organization.

"Position Survey" means an initial questionnaire given to persons familiar with a position to derive competencies deemed required for superior performance in such a position.

"Position Report" means a description of required competencies for superior performance for a position based on the Position Survey(s), and can include discussion of approaches for identifying prospects for the position and interviewing such prospects.

"Personal Competency Inventory" means a survey intended for a potential employee for the purpose of evaluating the potential employee's competencies related to the position.

"Feedback Survey" means a survey intended for any or all of an existing employee, an employee's superior(s), that employees peer(s), that employee's subordinate(s), or others having some relationship with the position.

"Feedback Report" means a description of the results from one or more "Feedback Surveys".

"Interview Record" means a form useful for an interviewer relative to an interviewee.

"Interview Candidate Comparison," means a form for an interviewer to help compare a plurality of interview candidates.

"Competency", as used herein, means a behaviorally-related observable characteristic in the workplace relative to a particular job from the Set of Competencies defined herein.

"Set of Competencies", as used herein, means a specific family of Competencies.

D. Apparatus

Figure 1:
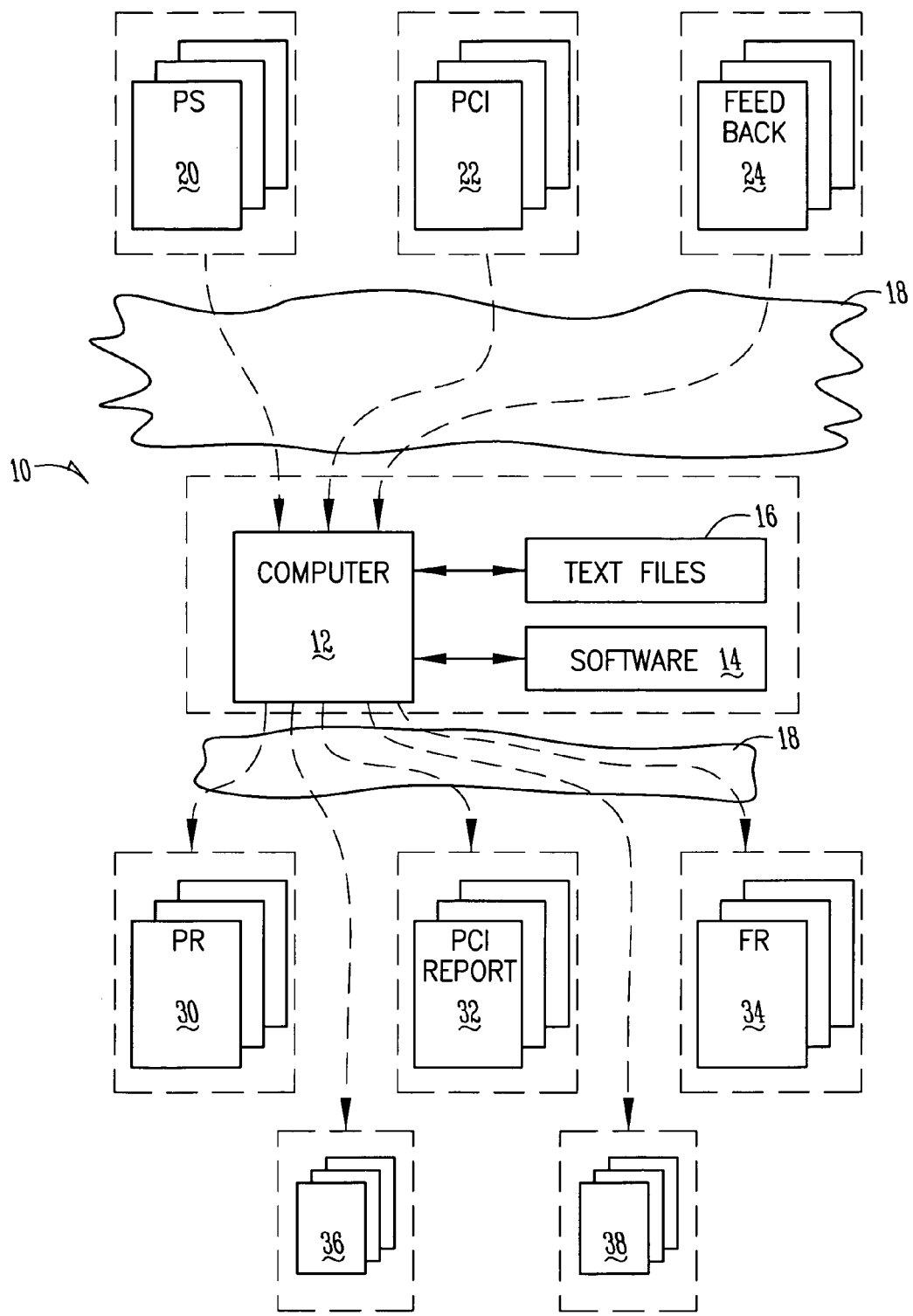
FIG. 1 is a diagrammatic view of a system according to an embodiment of the present invention.

FIG. 1 illustrates a basic apparatus for using the system 10 according to the invention. A computer 12 would include software 14 and text files 16 stored in a database. Computer 12 is capable of processing multiple Position Surveys 20, Personal Competency Inventories 22, and Feedback Surveys 24. Each of surveys 20, 22, and 24 can be in electronic form, accessible to a potential employee at a computer terminal, either near computer 12, or at a remote cite. A communications network 16 (modem, Worldwide Web, Intranet, etc.) can be used to communicate electronic versions of these surveys.

Computer 12 processes the surveys according software 14 and can produce several types of output reports.

A computer can be used to more efficiently process information according to the invention. Appropriate hardware is within the skill of those skilled in the art.

U.S. Pat. No. 5,551,880 discloses ways in which the system of the present invention could be practiced, including its computerization and the use of questionnaires, the coding and numerical characterization of the codings, and thus the ability to process the information with a computer, and provide an output report.

Software can be developed, as within the skill of those skilled in the art, by following this description.

As illustrated in FIG. 1, a Position Report 30 is possible, based on Position Survey 20. A Personal Competency Inventory report 32 can be produced based on Personal Competency Inventory 22. A Feedback Report 34 could be produced based on Feedback Survey 24. These are each described in more detail later.

Additional reports could be created such as a comparison of Position Survey 20 with Personal Competency Inventory 22 (see reference numeral 36). Similarly, comparison of Personal Competency Inventory 22 (see reference numeral 36). Similarly, comparison of Position Survey 20 with Feedback Survey 24 could be produced (see reference numeral 38). Still further, other types of reports can be created as will be appreciated.

A communication network 18 can also be used to electronically transmit such reports to a desired location. For example, e-mail, modem, Worldwide Web, Intranet, etc. could be used to electronically communicate any of the reports to a remote site for display on a computer or printing of a hardcopy.

Subject matter experts could take Position Survey 20 at a personal computer and submit to an employment agency in city A. Computer 12 could be located in city B. A potential employer could be located in city C. The potential employees, taking a Personal Competency Inventory 22 in city A could have it transmitted to computer 12 in city B. Computer 12 could issue a report and send it electronically to city C for use by employer, comparing potential employee to the Position Report.

E. Methodology

Behind the surveys and reports created to define the Competencies related to superior performance in a job the identification, definition and selection of a family of Competencies referred to herein as the Set of Competencies. As previously discussed, much has been written about "competencies". However, no agreement exists as to what is a competency.

A standardized set, the Set of Competencies, is established. The Set of Competencies have also been derived from studies of foundational work on competency, and on foundational work relating to behaviors and values/attitudes. This is described in U.S. Pat. No. 5,551,880.

Presently there are all sorts of definitions of what comprises a "competency" related to jobs or performance. As used herein, the Set of Competencies is selected as being almost universally relevant to most jobs or positions in the workplace. By relevant it is meant that across the universe of potential jobs and positions, these are usually possibly relevant, either as being very important to a job, somewhat important, or not important. It is to be understood that sometimes determining what is not important for good performance in a job, can be very valuable to accurately defining the job.

As can be appreciated, the Set of Competencies does not directly relate to resumes, education, technical experience, or prior job experience. They are "soft skills", or in other words, "demonstrable, observable behaviors".

(1) Set of Competencies

"Set of Competencies", for purposed herein, means the following Competencies with the following meanings:

1. Leadership/Management: Achieving goals and objectives through others.
2. Employee Development/Coaching: Facilitating and supporting the professional growth of others.
3. Team Work: Working effectively and productively with others.
4. Conflict Management: Addressing and resulting conflict constructively.
5. Inter-Personal Skills: Effectively communicating, building rapport and relating well to all kinds of people.
6. Problem Solving/Decision Making: Anticipating, analyzing, diagnosing and resolving problems.
7. Creativity/Innovation: Adapting traditional or devising new approaches, concepts, methods, models, designs, processes, technologies and systems.
8. Written Communication: Writing clearly, succinctly and understandably.
9. Customer Service: Anticipating, meeting or exceeding customer needs, wants and expectations.
10. Flexibility: Agility in adapting to change.
11. Goal Orientation: Energetically focusing efforts on meeting a goal, mission or objective.
12. Planning/Organizing: Utilizing logical, systematic and orderly procedures to meet objectives.
13. Diplomacy: Effectively handling difficult or sensitive issues by utilizing tact, diplomacy and an understanding of organizational culture, climate and/or politics.
14. Personal Effectiveness: Demonstrating initiative, self-confidence, resiliency and a willingness to take responsibility for personal actions.
15. Presenting: Communicating effectively to groups.
16. Negotiation: Facilitating agreements between two or more parties.
17. Persuasion: Convincing others to change the way they think, believe or behave.
18. Empathy: Identifying with and caring about others.
19. Continuous Learning: Taking initiative in learning and implementing new concepts, technologies and/or methods.
20. Futuristic Thinking: Imagining, envisioning, projecting and/or predicting what has not yet been realized.
21. Decision Making: Utilizing effective processes to make decisions.
22. Self Management: Demonstrating self-control and an ability to manage time and priorities.
23. Management: Achieving extraordinary results through effective manage of resources, systems, and processes.

Therefore, the Set of Competencies, here twenty-three of them, are specifically defined. As can be seen, each have a directly behaviorally- or attitude-related aspect.

The Set of Competencies is used in the system of surveys and reports to assist in defining the behaviorally and attitude related characteristics of a wide variety of jobs as follows.

(2) Position Survey

To provide a standardized system for first defining behaviorally-related Competencies for most jobs, a standardized Position Survey 20 is created. An example is shown at FIG. 3. It is constructed as follows.

An introductory page (FIG. 3B) is for administrative use, for example, calling for a job code, company name, title of the position, and nature of position. It also calls for information about the respondent, the person filling out the Position Survey, including identification of Respondent and a code. Coding of the position and the Respondent helps facilitate computer processing and tracking.

Instructions, both at an introductory page (FIG. 3C) and continued throughout the Position Survey, key the Respondent to answer based not on how they think they perform in the position, or how they would like to perform, or even how they think they or others should perform; but rather on what the position requires for superior performance.

Some non-behaviorally-related factors can be elicited in a first section (FIGS. 3D–E) of questions which surveys the type of authority, responsibility, accountability, consequences, and risks associated with the position. This information can be very helpful in evaluating or defining a position.

A second section (FIGS. 3F–L) is directed towards behavioral requirements for the position. The questions are specifically constructed to elicit from a Respondent the type of observable behavior(s) that are deemed important in the position, and more specifically, the questions are specifically constructed to elicit the type of Competencies, from the Set of Competencies, the Respondent feels are required for superior performance in such a position.

A third section (FIGS. 3M–3U) is directed at situational events for the position, but is specifically constructed to also elicit information from the Respondent about Competencies, from the Set of Competencies, required for superiors performance in such a position.

The way in which the Competencies are elicited from the survey is as follows. At least some of the queries of Sections 2 and 3 of the Position Survey 20 of FIG. 3 are pre-coded. This is indicated by the handwritten letter/number combination to the right of some of the answers to the questions of Sections 2 and 3 of Position Survey 20 (FIGS. 3F–U). The hand-written letter/number combination(s) do not appear on Position Surveys given to Respondents. The correlation of those codings are stored in computer 12, so that computer 12 knows which questions of Position Report 20 are related to which Competencies.

Therefore, the answer given by a respondent to any such question implicates such Competency(ies).

Position Survey 20 is preferably given to one or more persons that clearly understand the position at issue. Preferably, these persons are selected who are themselves high performers or perform at a superior level in the position.

FIG. 3 sets forth one such example of Position Survey 20. This is one example only and is by no way a limitation on what a Position Survey could contain or its format or content.

As also indicated by hand-written letters relative to certain questions in the Position Survey, the Position Survey can use the methodology of U.S. Pat. No. 5,551,880 to simultaneously probe the Respondent for behavior and value characteristics relative to the job. Hand-written letters to the left and below certain questions (D, I, S, or C) are the same as disclosed in U.S. Pat. No. 5,551,880 and reference can be taken to that patent for ways in which such can be processed. Computer 12 knows which questions from the Position Survey relate to which behaviorally-related factors from the methodology of U.S. Pat. No. 5,551,880.

Likewise, the handwritten letters (Identified with T, U, A, S, I, Tr), the attitude being measured, to the right and below certain questions in FIG. 3 sections 2 and 3 are the same or similar to the values coding set forth in U.S. Pat. No. 5,551,880. Computer 12 would be programmed accordingly.

Thus, Position Survey 20 is pre-designed to present a Respondent with queries, some of which directly relate to the Set of Competencies.

A Respondent goes through the Position Survey, and if he/she follows the directions, will answer the queries accordingly. The answers can be electronically recorded. However, it could be manually filled out.

(3) Processing the PS

The responses to Position Survey 20 are processed as follows.

The questions in the first section (FIGS. 3D–3E) are also pre-coded in computer 12 (shown by hand-written letter/number combinations (to the right of certain queries). FIG. 4A shows the scoring key for the first section. If a Respondent places a check in the blank next to a query that has B1, that element is rated by computer 12 as being "slight", that is, slightly relevant to the position. A check for a query coded B5 would be rated "major", of major relevancy to the position.

Similarly, codings P1 to P5 and A1–A5 are handled in a similar way. Queries coded to B1–B5 relate to the job element accounts for results. Queries coded P1–P5 are related to the job element results through people. Queries coded A1–A5 are related to the job element authority.

As shown in FIG. 4B, the answers of the Respondent to section 1 of the Position Survey can be combined into a rating for each of the job elements "Responsibility for Results", "Responsibility for Result Thorough People", "Authority", and "Organizational Risks". These ratings can complement Competency and/or behavior/values ratings in defining the job and assist in the selection process and performance management.

The second and third sections of a Position Survey of FIG. 3 are evaluated and processed as follows. First, the questions from those sections relate to each of 23 competencies from the Set of Competencies. This is indicated by the hand-written numbers placed to the left side underneath the questions of Sections 2 and 3. These numbers reflect the competency or competencies being evaluated by each questionnaire to the numbers in the list of the Set of Competencies previously given. Again, the hand-written numbers placed near the questions of sections 2 and 3 of the Position Survey of FIG. 3 are to allow an understanding of how different ones of the questions are coded relative to different Competencies. The hand-written numbers would not appear on the Position Survey, but would be stored in computer 12 and correlated to the relevant questions.

Each taker of Position Survey 20 will answer all the questions related to each of the 23 of the Set of Competencies. FIG. 5A illustrates an example of the distribution of the nine questions per each of the 23 Competencies throughout sections 2 and 3 of the Position Survey.

The Respondent would answer each of the questions of sections 2 and 3 by indicating a value between 1 and 5 (see FIGS. 3F to 3U). Depending on those answers, each of the 23 of the Set of Competencies will be ranked by the survey taker between a ranking of "essential" to "not necessary" in Section 2, in between a ranking of "extensive" to "very little" in Section 3. Points are assigned to each answer. For example, if the answer to question 1 is given as "essential", having a numerical value of "one" in Position Survey 20, a coding numerical value of "six" is given meaning that it has been given the most importance. If a "two" is circled, it is given a point rating of "five" and so on, so that if a "six" rating is circled, the numerical value is "one".

The most points available for a given competency would be 54 (nine questions times six possible points). The least value would be 9 (nine questions times one).

In this manner, software 14 of computer 12 can calculate which of the 23 competencies is ranked between "very important" and "not important" by the survey taker in the following manner.

If a Competency receives a score greater than 83% of the maximum score of 54 (that is, a score of 45 or more) is then ranked as "very important" for the job. Any Competency receiving a score of between 51% and 82% of possible 54 points (that is, a score of between 28 and 45) is rated as "important" for the job. Competencies scoring 50% or under of maximum possible score (under 28 points) are ranked as "not important" for the job.

It is also to be understood that many of the questions in Position Survey 20 are intentionally derived from behaviors or values/attitudes as described in detail in U.S. Pat. No. 5,551,880. Hand-written codes are set forth in FIG. 3, Sections 2 and 3, indicating correspondence of certain questions to behaviors and values (see FIG. 5B for summary of how behavior and values codings are distributed between sections 2 and 3 of the Position Survey of FIG. 3). Letters to the left below questions and Sections 2 and 3 indicate relationship to values coding (T, U, A, S, I, Tr) according to the U.S. Pat. No. 5,551,880. Letters to the right below questions and Sections 2 and 3 of FIG. 3 relate to values coding from U.S. Pat. No. 5,551,880. Thus, an interface between questions of Position Survey 20, and the Set of Competencies, and the behavior/values of the U.S. Pat. No. 5,551,880 are utilized. By this combination, we can determine fi the competency comes from nurture or nature.

Reference can be taken to U.S. Pat. No. 5,551,880 regarding how questions are coded, processed, and scored relative to behaviors and values.

Thus, a set of Respondents (one or more, preferably one to ten) who have knowledge about the position (preferably are high performers) take the Position Survey and define the job by the correlation of queries in the Position Survey to the 23 Competencies of the Set of Competencies.

(5) Position Reports

FIGS. 6–10 illustrate Position Reports 30. FIG. 6 will be called a Master Position Report because it contains basically a complete listing of all the possible text files that could be utilized for each of the 23 of the Set of Competencies. It also shows the basic format for Position Report 30.

The Position Report is created by computer 12 from the results it processes from the Position Survey. Computer 12 can process a Position Survey from one Respondent or integrate Position Surveys from a plurality of Respondents.

A description page (e.g. FIG. 6B) explains the Position Report.

Then, a hierarchy of competencies is set forth (FIG. 6C). This is simply based on which of the 23 of the Set of Competencies receives enough points to fit into the "very important" class, "important" class, or "not important" class. The viewer of Position Report 30 can then quickly see which competencies are deemed very important, important, or not important for the job.

Secondly, Position Report 30 can include a section called "Distribution of Competency Rankings" (FIG. 6E). Each respondent to Position Survey 20 would have a ranking in order of importance of the 23 competencies, which would be shown in this distribution. Discrepancies between different respondents could then be evaluated. It could point out certain competencies are indeed less important relative to others. It could also show a discrepancy that would assist in understanding of the position or create questions that could be evaluated to see if there is a reason for any inconsistencies.

Third, the report can contain "key characteristics of the position" (See FIG. 6F). This is related most directly to Section 1 of Position Survey 20, as previously explained with respect to FIG. 4B.

Thereafter, text files from text file 16 are available to construct a "Summary of Top Competencies" (FIGS. 6G to 6M). In FIG. 6, all text files for all of the 23 Competencies are set forth to show the different summaries for each Competency. In an actual Position Report, only a few of the Competencies would normally be reported. It is believed that five to seven of the highest ranked competencies is all that is required to give a good characterization of the position.

Finally, FIGS. 6O–6AB show the set of text files that are available to create behavioral interview questions. Such questions would give an interviewer the type of questions needed to find out or verify whether a job applicant fits the Competency model of the position defined by the Position Survey.

FIGS. 7, 8, 9, and 10 are hypothetical Position Reports 30 for four different jobs; namely, an automobile salesperson (FIG. 7), a vice president of marketing (FIG. 8), a computer programmer (FIG. 9), and a customer service representative (FIG. 10). As can be seen in comparing FIGS. 7–10, the hierarchy of competencies varies for each. For example, the automobile salesperson report 30 has only one "very important" competency common namely customer service. However, looking at the distribution of competency rankings, the two respondents to Position Survey 20 actually had four competencies ranked as "very important". This was interpreted as meaning that only customer service was truly "very important", because the competencies of "persuasion", "interpersonal skills", and "goal orientation" were never ranked at level 1 by either respondent. The summary of competencies reprinted text files regarding the top seven ranked competencies by the respondents.

In comparison, FIG. 8 had 19 "very important" competencies. However, again, only the top seven were summarized.

FIG. 9 also had one "very important" competency whereas FIG. 10 has three.

Note also that Position Report 30 can contain other information. As shown in FIGS. 8–10, work environment (behavioral related characteristics for the position) can be summarized as can attitude or values related characteristics.

In addition, specific interview questions can be generated from text files 16 relative to each of the competencies determined to be most important for the position.

It can therefore be seen that the Position Survey, probing respondents for behaviors and values related competencies from the selected Set of Competencies, allows a definition of the job to be created in a Position Report 30. The job thus quantified, is defined in terms of the type, the inherent behaviors of the person, and the attitudes or values of the person, that would provide superior performance for the job. This is different from evaluating a resume, or evaluating a person based just on interview. It is deriving a description of the job itself by listening to the behavioral and values traits that are articulated in the answers to the Position Survey by persons who do perform well in the job.

Once the most important competencies are identified for the job, a strategy for finding the correct and best candidates for the job can be created. Behavioral and attitude characteristics are summarized and listed in the Position Report. Interview questions are even created.

Figure 2:
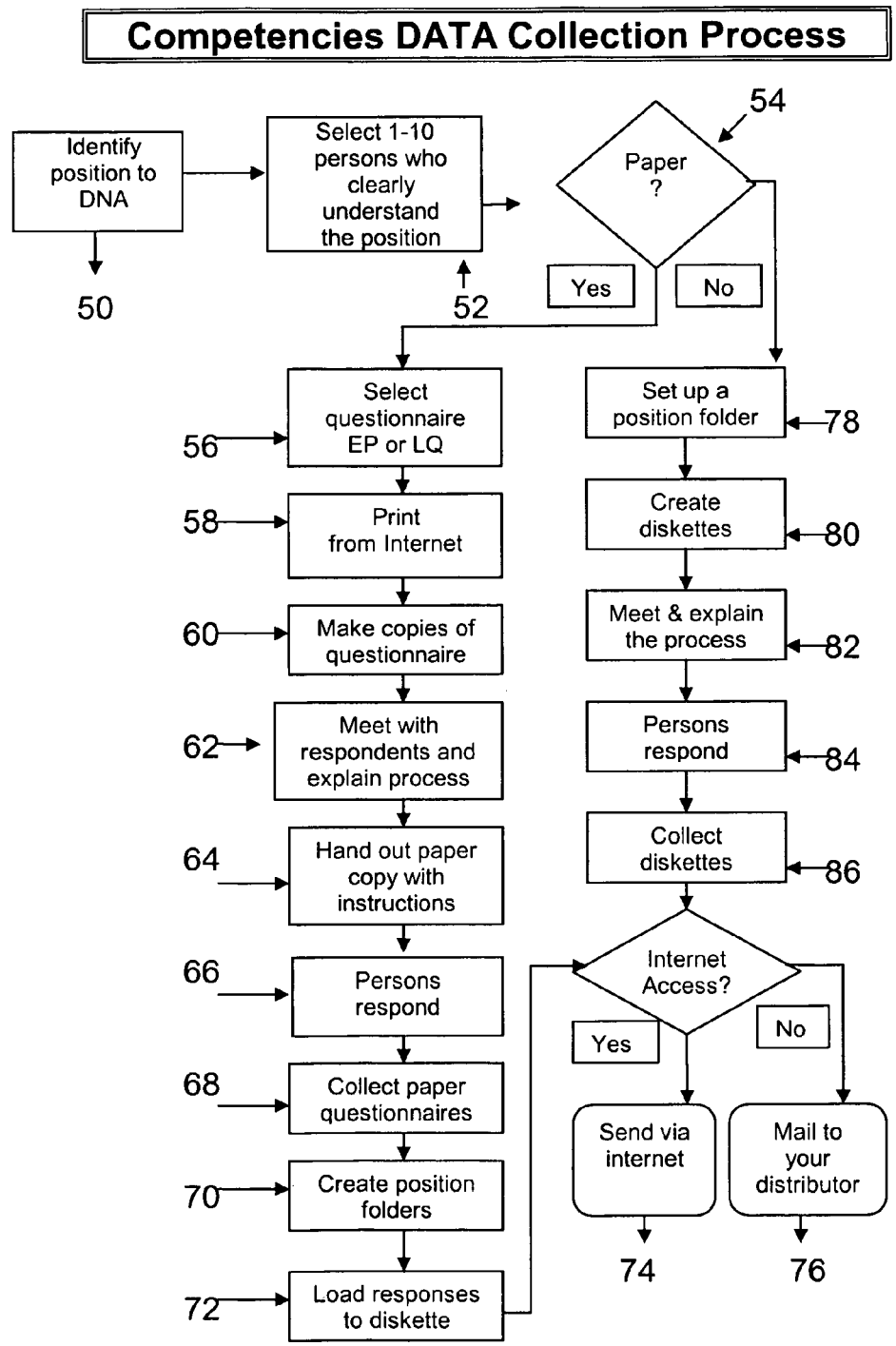
FIG. 2 is a flow chart of the method of using the system of FIG. 1 according to the invention.

FIG. 2 summarizes by flowchart for the previously described process. The actual position is first identified (50). Preferably, one to ten persons who clearly understand the position are selected to take Position Survey 20 (52).

If Position Survey 20 is available in hardcopy or a form that can be directly displayed to the respondents (54), the appropriate Position Survey 20 is selected (56), printed (possibly from an Internet site) (58), copies are made for the appropriate number of persons (60) and an orientation session is held (62).

Selected persons take the questionnaire (64, 66, and 68) and a "Position Folder" is created (70) to hold the questionnaires.

The responses of the respondents can be keyed into a computer (72) or stored on a storage medium such as a diskette. The responses in electronic form could be sent via Internet (74) or mailed (76) for processing.

Alternatively, the respondents could be given electronic versions of Position Survey 20 on diskette. They could electronically complete the survey, the diskettes could be collected, and either electronically or physically sent for processing by computer 12.

(6) Optional Debriefing

FIG. 11 illustrates how Position Report 30 can be handled. The entity interested in the Position Report 30 (for example the company) would receive report 30 (90) and review the report (92). If there is no disparity on respondents' rankings or if any disparity is not of concern (94) the end user or customer can use the report for job description (120), future planning (122) or interviewing (112).

Note, however, that it is contemplated that a customer may want to meet with respondents to Position Survey 20 after it has been completed (96), review the definitions of competencies (98) and get an agreement on the most important competencies for the position (100) before using Position Report 30 further.

As shown in FIG. 11, Position Report 30 could even be used to change the job description (114, 116, 118, 130). Still further, it can be used to weigh competencies (106) as will be described later.

If a disparity in rankings is of concern, a meeting with respondents can take place (124) and the process repeated (126) to try to get better consensus (128).

F. Alternatives, Features, Options

The included preferred embodiment is given by way of example only, and not by way of limitation to the invention, which is solely described by the claims herein. Variations obvious to one skilled in the art will be including within the invention defined by the claims.

For example, surveys regarding other competencies or hard skills could be added to Position Survey 20 and Position Report 30. This could also assist an interviewer, or help define a job.

Additionally, as stated previously, live discussion or debriefing of a Position Report with respondents or other parties could be conducted to fine-tune or alter a description of the job. It is not required.

Still further, after obtaining a definition of a job through use of a Position Survey, and then producing a Position Report, other actions related thereto could be taken, such as are discussed below.

(1) Personal Competency Inventory (PCI)

FIG. 12 sets forth a hypothetical Personal Competency Inventory. Such an inventory is focused upon gaining information from a potential employee.

A first section (FIG. 12 B) asks the person to characterize how he/she thinks others would describe his/her behaviors.

Second 2, FIGS. 12C–12H, probe the person's feelings or beliefs about different job related situations, while section 3 (FIGS. 12G–12K) directly probe the person's career accomplishments related to our competency model.

As shown in handwriting to the right of the questions in sections 2 and 3 of the PCI of FIG. 12, the relationship of certain questions to certain competencies from the Set of Competencies is set forth. The alpha-numeric pair coded next to question in Personal Competency Inventory 22 are pre-correlated to the twenty-three Competencies from the Set of Competencies, i.e. P20 relates to the twentieth listed Competency in the Set of Competencies listed earlier.

FIG. 13 illustrates the number of questions from PCI sections 2 and 3 that relate to which Competencies of the Set of Competencies. The PCI is utilized to try to gauge a potential employee's characterization of his or her own competencies (related to the Set of Competencies).

(2) Personal Competency Inventory Report

FIG. 14 illustrates the results of an evaluation of Personal Competency Inventory 22 of FIG. 12. The self-perceived competencies of the potential employee are ranked in order based on how the person answered the questions of sections 2 and 3 of the PCI.

From the Personal Competency Inventory Report 32, an employer can compare the same with a Position Report 30. The employer can select candidates for the position based on the highest correlation between report 30 and report 32. Report 30, if it includes interview questions, can then be used advantageously by the employer to further probe whether the selected candidates fit the competency requirements of Position Report 30.

Therefore, by utilizing both reports 30 and 32, an employer is given the tools to evaluate perspective employees based on the Set of Competencies related to behavior and values and the competencies deemed by incumbents in the position that perform at a high level, to be the most important such competencies.

(3) Feedback Survey

It can also be advantageous for a company to track the performance of an employee. System 10 allows this as follows. Periodically, an employee functioning in a position, as well as others such as a superior, one or more subordinates, or one or more peers, can take a Feedback Survey such as shown in FIGS. 15–17. The competencies previously described are used to evaluate present employees using the Feedback Survey.

(4) Feedback Report

The answers to Feedback Reports 24 of FIGS. 15–17 can then be compiled in a Feedback Report 34 such as shown in FIGS. 18 and 19. The views of others regarding the employee, as well as the employee's own use, are then quantified. Variations in those results can then be compared. This can be very helpful in assisting the employee develop the competencies most important for the job. It can also be used to determine whether a certain employee is not the correct fit for a job.

(6) Interview Candidate Record

FIGS. 20–22 illustrate forms that can be used by an interviewer while interviewing several different candidates for a position. FIGS. 20 and 21 are hypothetical examples for two different candidates for the same job. The top five competencies from the Position Report 30 are set forth in the Interview Candidate Record. Weighting of the importance of the competency to other competencies is set forth, as well as a ranking from the personal competency index taken by the employee.

A weighting result is achieved by multiplying the two. Summation of those products gives a total score for the candidate. The form also allows the interviewer to write notes regarding the rating for future reference. Finally, FIG. 23 illustrates a comparison chart of the top five competencies for each of the candidates to assist in a selection process for the position.

The invention claimed is:

1. A method of evaluating potential job performance of applicants or existing employees for a specific job, comprising:
    (a) defining a set of competencies relevant to performance in the specific job;
    (b) ranking the set of competencies in order of importance for the specific job to provide a set of defined job characteristics for the specific job;
    (c) surveying a set of high-performing individuals in the specific job to ascertain if they possess the competencies specified by the job to validate the set of competencies defined for the specific job;
    (d) preparing a report regarding ranking of the set of defined job characteristics;
    (e) providing a set of proposed interview questions related to the set of defined job characteristics to assist hiring authorities to plan structured selection interviews;
    (f) surveying an applicant or existing employee regarding said job to ascertain how said applicant or existing employee demonstrates said set of defined job characteristics; and
    (g) reporting a comparison of potential performance of the applicant or existing employee for specific job based upon the applicant's or existing employee's demonstration of said defined job characteristics.

2. The method of claim 1 wherein the set of high performing individuals comprises one or more persons.

3. The method of claim 1 further comprising surveying a potential applicant for said job to derive how said characteristics relate to said potential applicant.

4. The method of claim 3 further comprising comparing the surveying of the potential applicant with the surveying of the set of high performing individuals.

5. The method of claim 1 wherein the existing employees include the set comprising employees in said job, employees subordinate to said job, employees superior to said job, customers interfacing with said job, and peers to said job.

6. The method of claim 5 further comprising surveying a set of existing employees regarding said job to derive how said existing employees demonstrate said characteristics relative to said job.

7. The method of claim 5 further comprising providing feedback to a said existing employee in said job based on the surveying of existing employees.

8. A method of evaluating potential job performance of applicants or existing employees for a specific job, comprising:
    (a) defining a set of competencies relevant to performance in the specific job;

(b) ranking the set of competencies in order of importance for the specific job to provide a set of defined job characteristics for the specific job;
(c) surveying a set of high-performing individuals in the specific job to ascertain if they possess the competencies specified by the job to validate the set of competencies defined for the specific job;
(d) preparing a computerized report regarding ranking of the set of defined job characteristics;
(e) providing a set of proposed interview questions related to the set of defined job characteristics to assist hiring authorities to plan structured selection interviews;
(f) surveying an applicant or existing employee regarding said job to ascertain how said applicant or existing employee demonstrates said set of defined job characteristics; and
(g) reporting a computerized comparison of potential performance of the applicant or existing employee for specific job based upon demonstration of the applicant's or existing employee's said defined job characteristics.

* * * * *